United States Patent [19]
Anim-Appiah et al.

[11] Patent Number: 5,336,997
[45] Date of Patent: Aug. 9, 1994

[54] NON-SYMMETRICAL INDUCTIVE SENSORS HAVING FERRITE COIL GEOMETRIES WITH DIFFERENT TOP AND BASE GEOMETRIES

[75] Inventors: Kofi D. Anim-Appiah, Milwaukee, Wis.; Sedki M. Riad; Shinzo Onishi, both of Blacksburg, Va.

[73] Assignee: Virginia Tech Intellectual Properties, Inc., Blacksburg, Va.

[21] Appl. No.: 947,101

[22] Filed: Sep. 21, 1992

[51] Int. Cl.⁵ .................. G01B 7/14; G01R 33/00; H01F 17/04; G01N 27/72
[52] U.S. Cl. .................. 324/207.16; 324/207.13; 336/221
[58] Field of Search ............... 324/219, 220, 221, 226, 324/225, 234, 236, 237, 238, 239, 240, 207.12, 207.13, 207.15, 207.16, 207.26; 336/83, 221, 233

[56] References Cited

U.S. PATENT DOCUMENTS 3,510,858  5/1970  Flanagan ............ 324/207.18
3,952,315  4/1976  Cecco .................... 324/220

*Primary Examiner*—Walter E. Snow
*Attorney, Agent, or Firm*—Mason, Fenwick & Lawrence

[57] ABSTRACT

New core geometries to increase the sensing range of proximity transducers in general, and eddy current killed oscillator mode sensors, in particular. A theoretical analysis yields electromagnetic parameters that facilitate prediction of the sensing capability of any ferrite core geometry. The results of this analysis is applied to a multitude of Finite Element Analysis models to study changes in maximum sensing distance due to ferrite core geometry modifications. This yielded preferred embodiments for shielded and unshielded sensors.

12 Claims, 35 Drawing Sheets

FERRITE CORE SIMULATION GEOMETRY

THICKNESS OF TOP DISC = 3.0mm
L = 1129 $\mu$H
SDF = 1.66

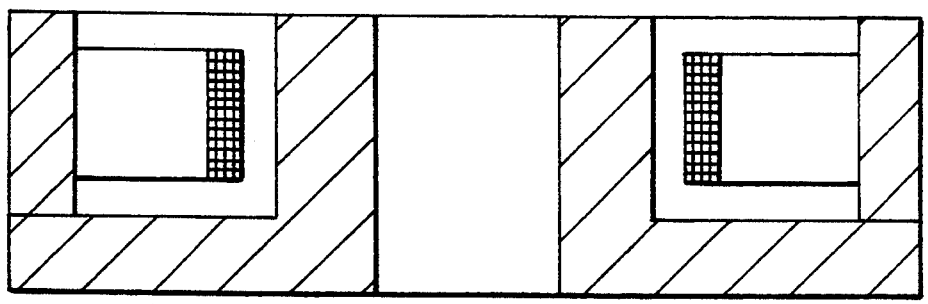
FERRITE CORE SIMULATION GEOMETRY
REFERENCE CORE
L = 183 μH
SDF = 1.00
FIG. 2A
FIG. 2B
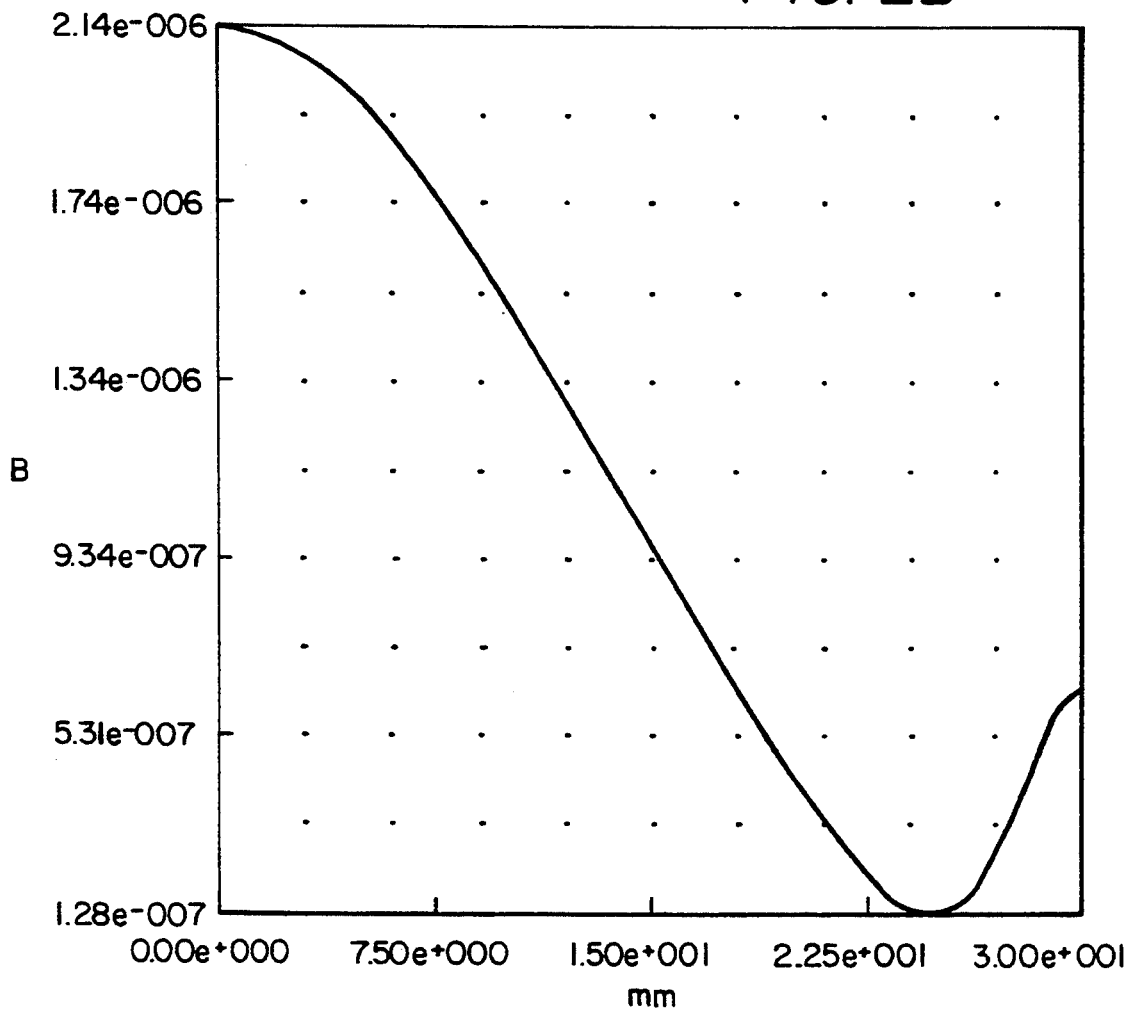

FERRITE CORE SIMULATION GEOMETRY

SIDEWALL HEIGHT = 4mm
L = 183μH
SDF = 1.04

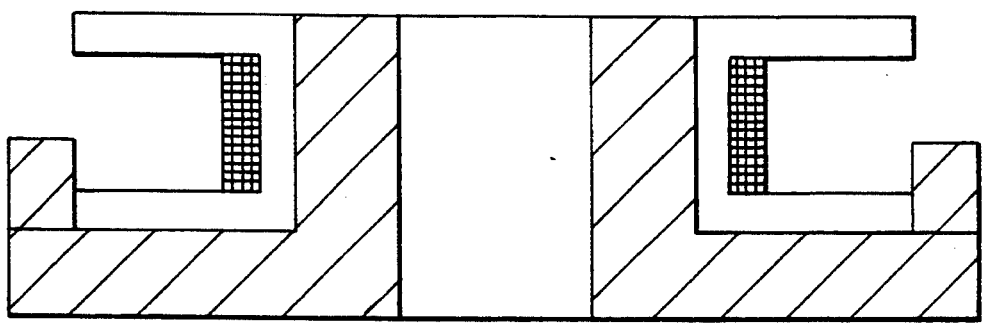
FERRITE CORE SIMULATION GEOMETRY
SIDEWALL HEIGHT = 2mm
L = 169μH
SDF = 1.12
FIG. 3C
FIG. 3D
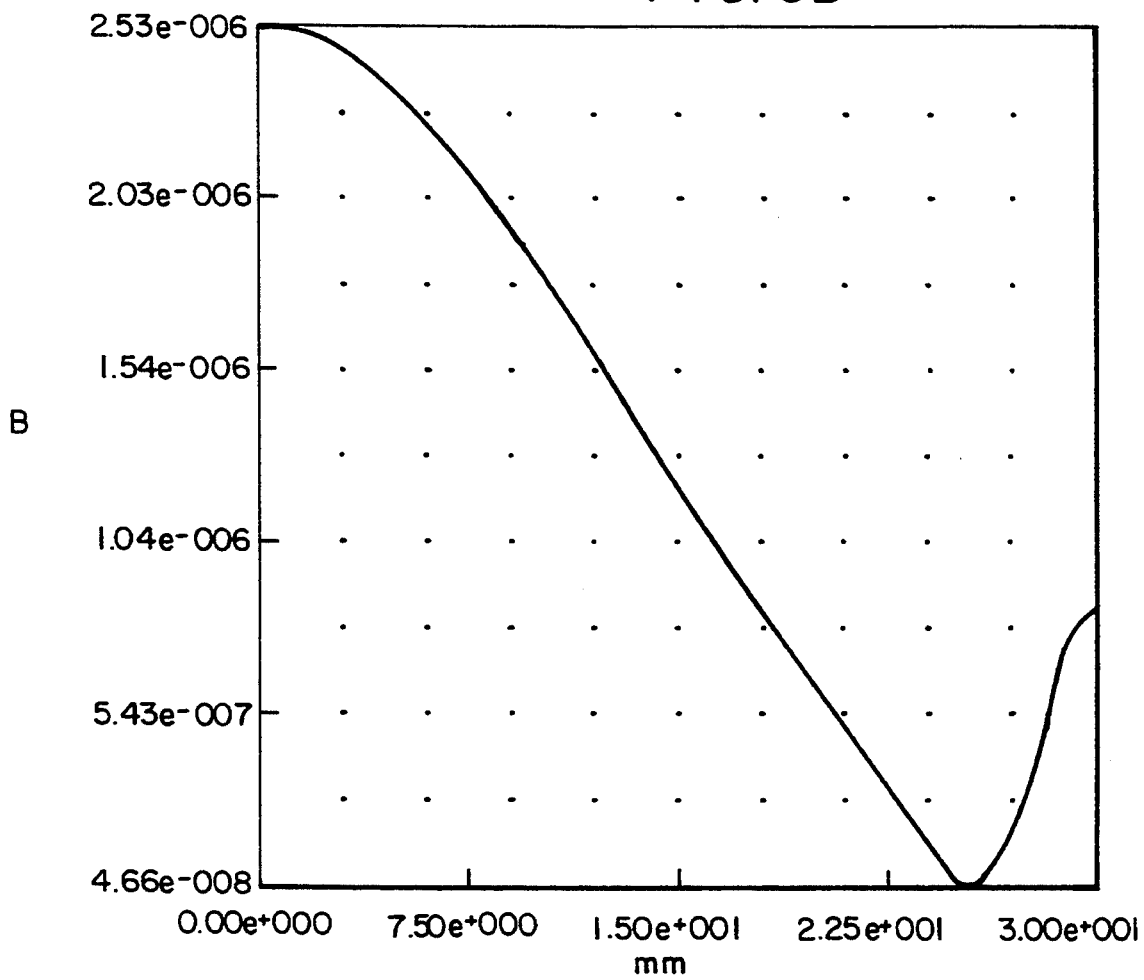

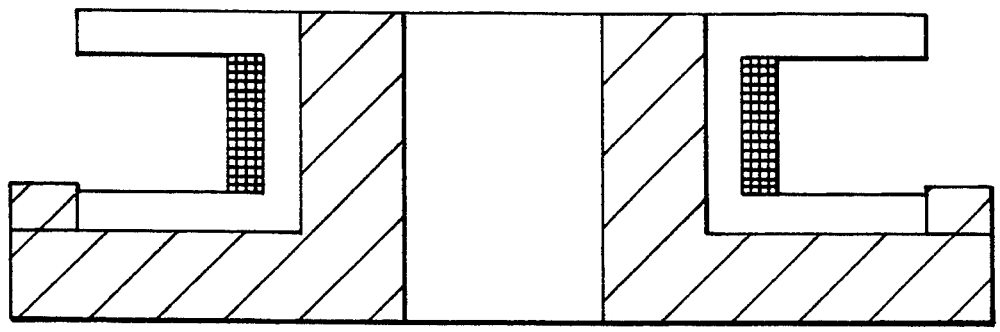
FERRITE CORE SIMULATION GEOMETRY
SIDEWALL HEIGHT = 1mm
L = 162μH
SDF = 1.14
FIG. 3E
FIG. 3F
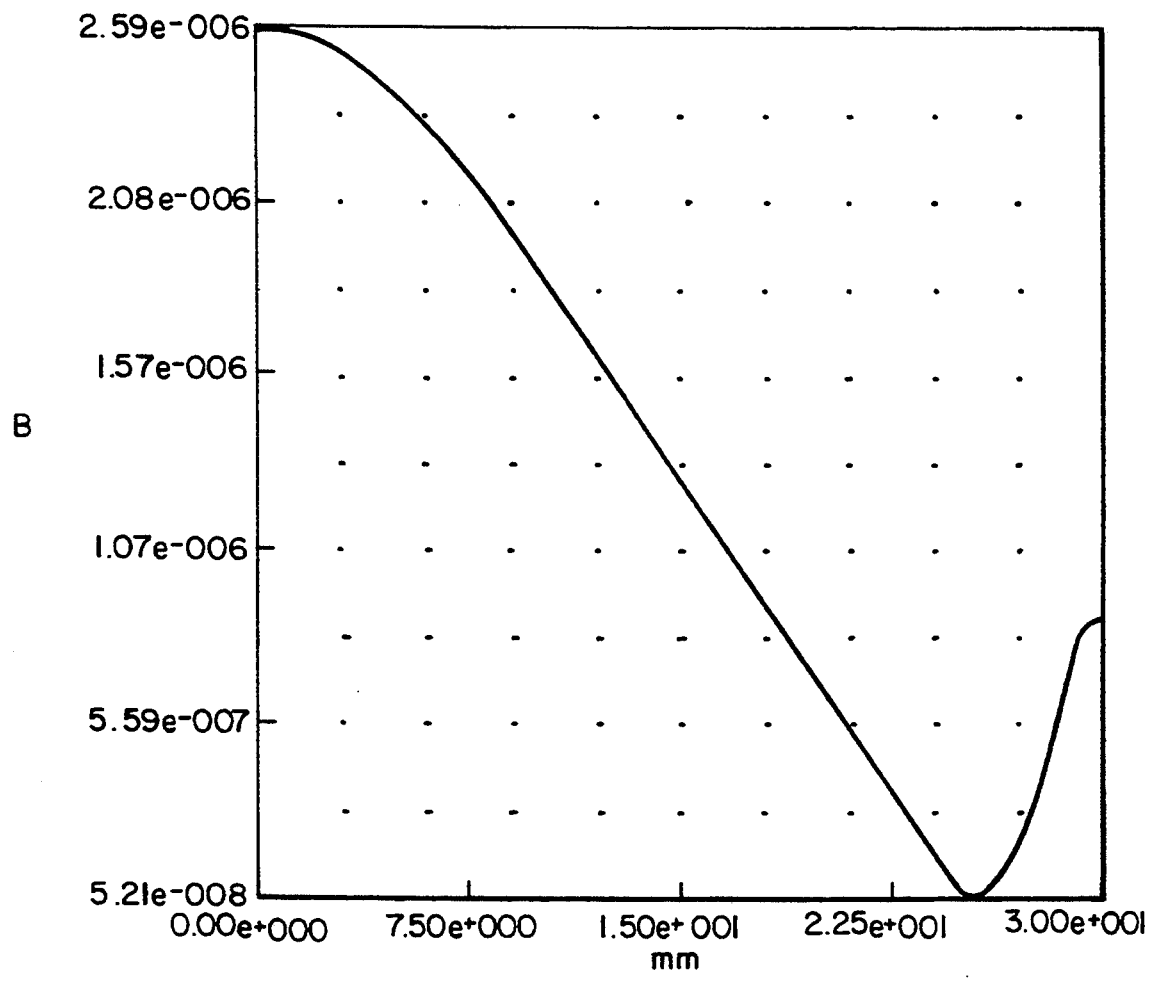

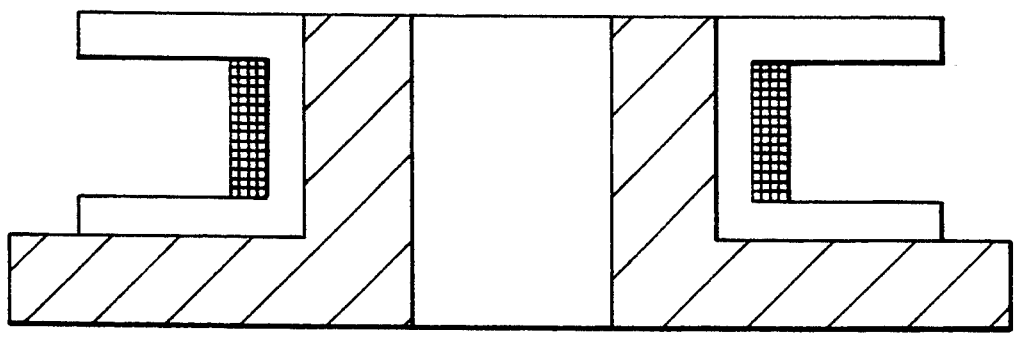
FERRITE CORE SIMULATION GEOMETRY
SIDEWALL HEIGHT = 0mm
L = 160 H
SDF = 1.14
*FIG. 3G*
*FIG. 3H*
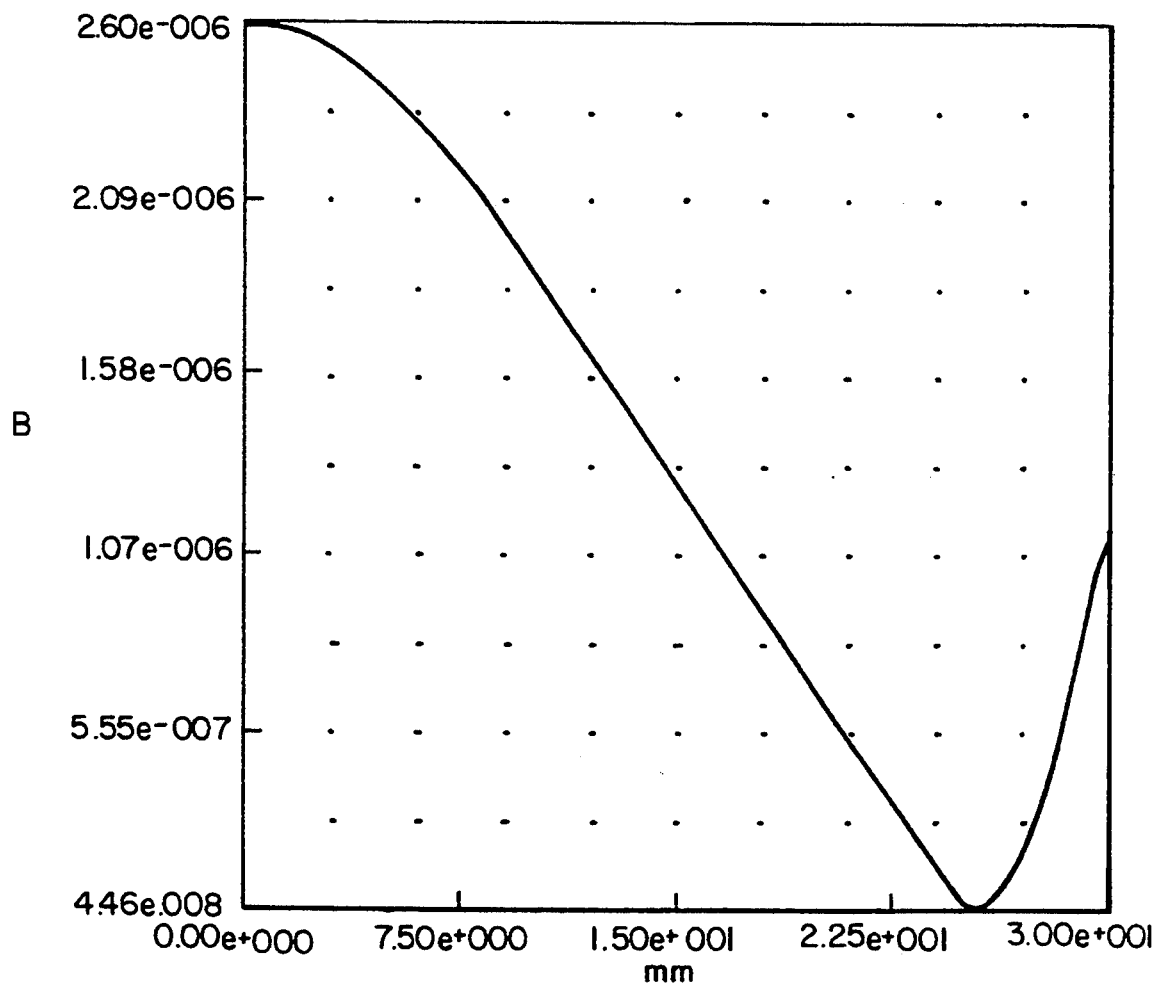

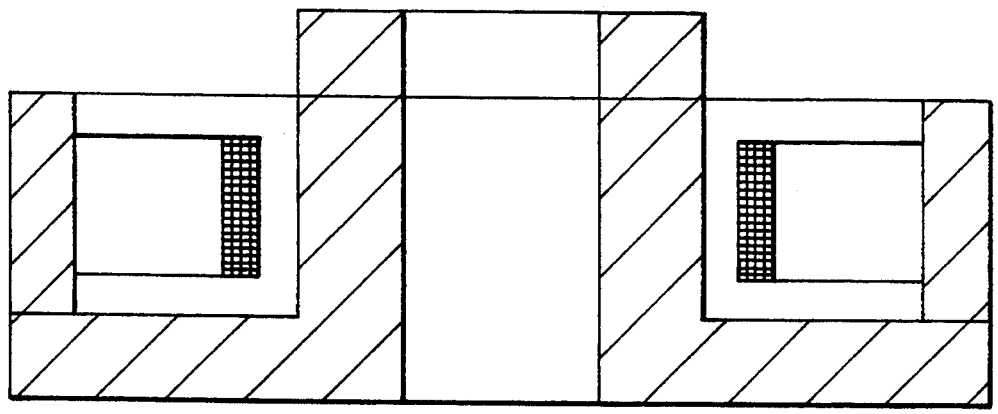
FERRITE CORE SIMULATION GEOMETRY
RADIUS OF TOP DISC = 4.5mm
L = 229μH
SDF = 1.13
*FIG. 4A*
*FIG. 4B*
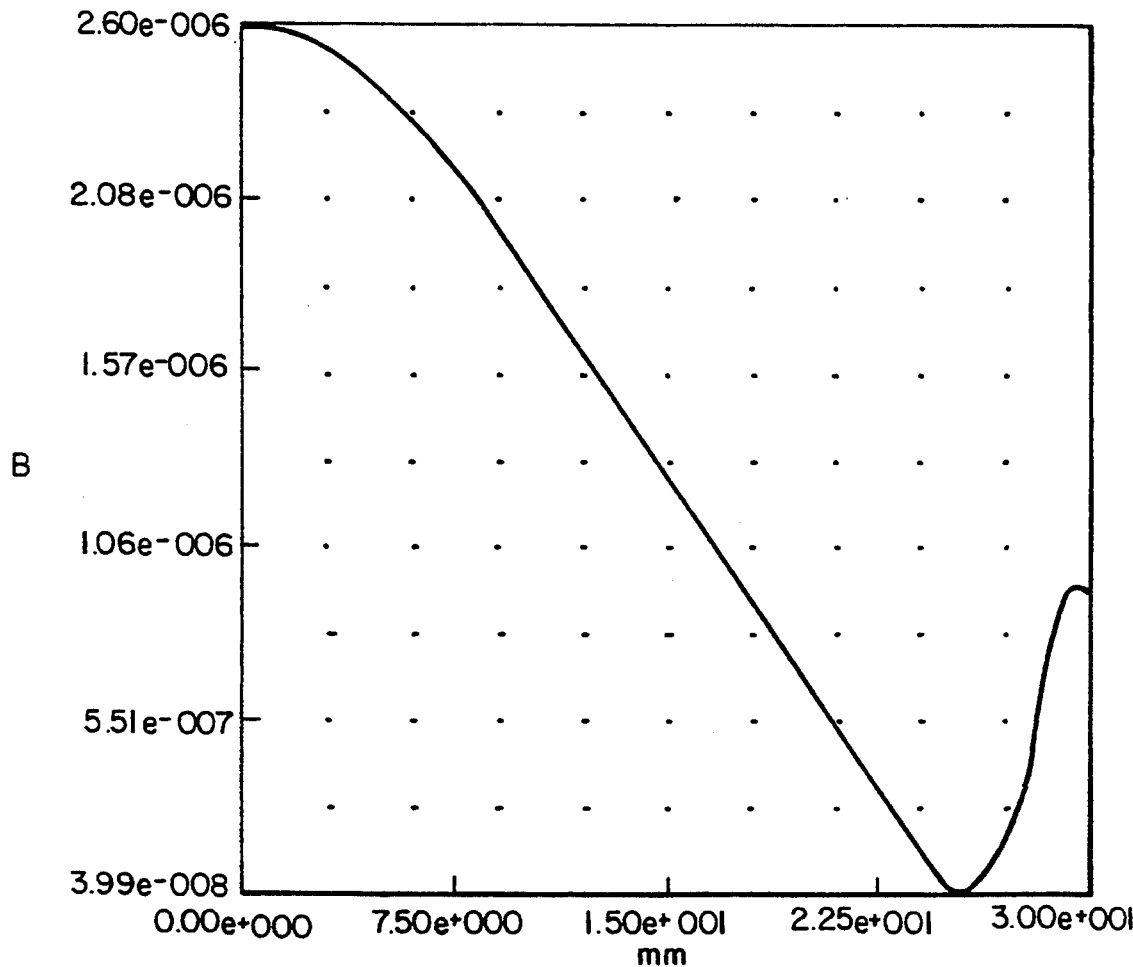

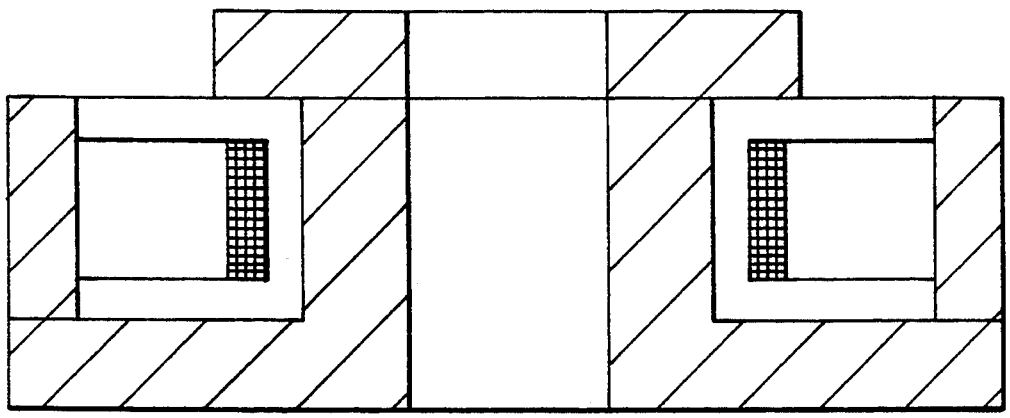
FERRITE CORE SIMULATION GEOMETRY
RADIUS OF TOP DISC = 6.5mm
L = 400μH
SDF = 1.35
*FIG. 4C*
*FIG. 4D*
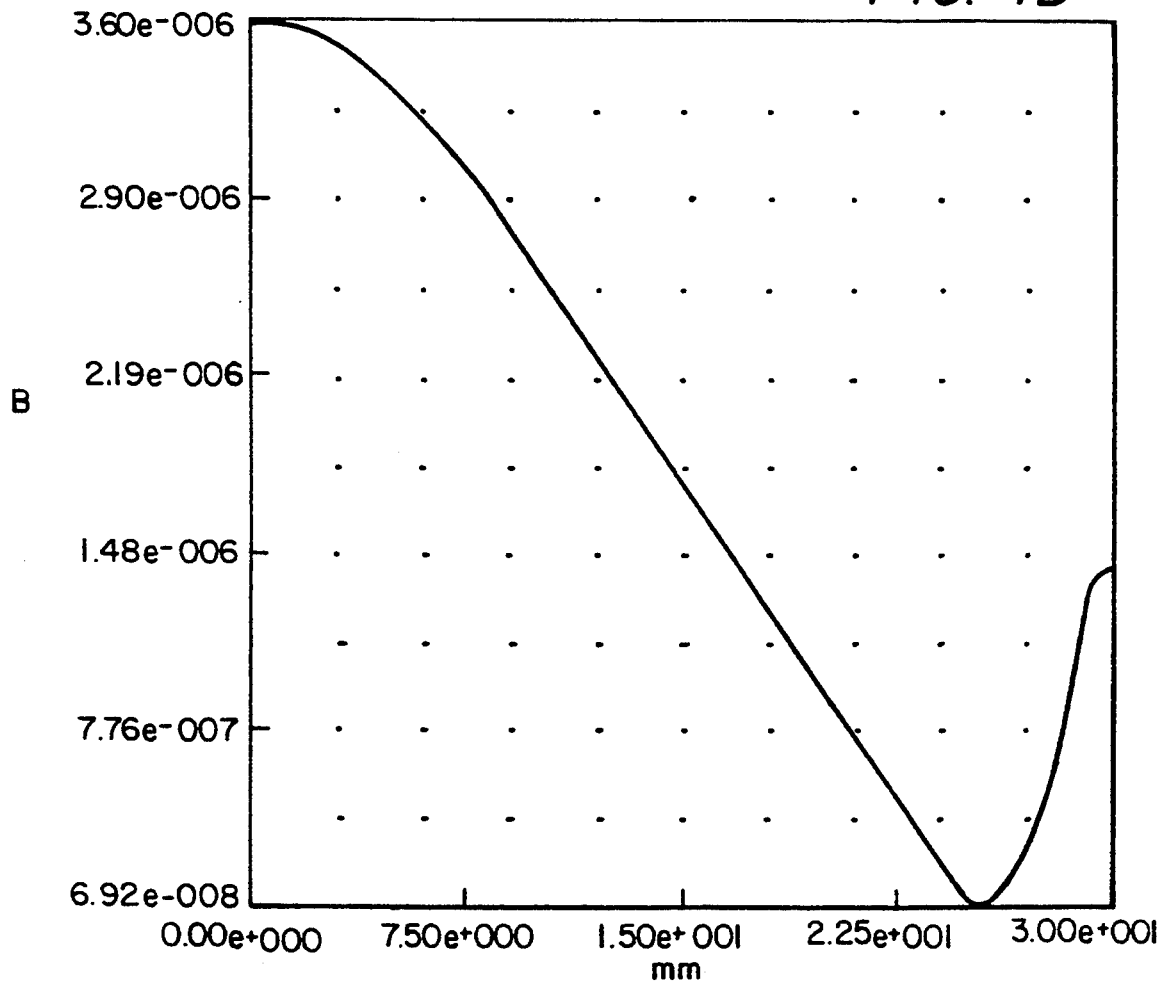

FERRITE CORE SIMULATION GEOMETRY

RADIUS OF TOP DISC = 9.4mm
L = 948μH
SDF = 1.55

FERRITE CORE SIMULATION GEOMETRY

RADIUS OF TOP DISC = 10.5mm
L = 1040µH
SDF = 0.88

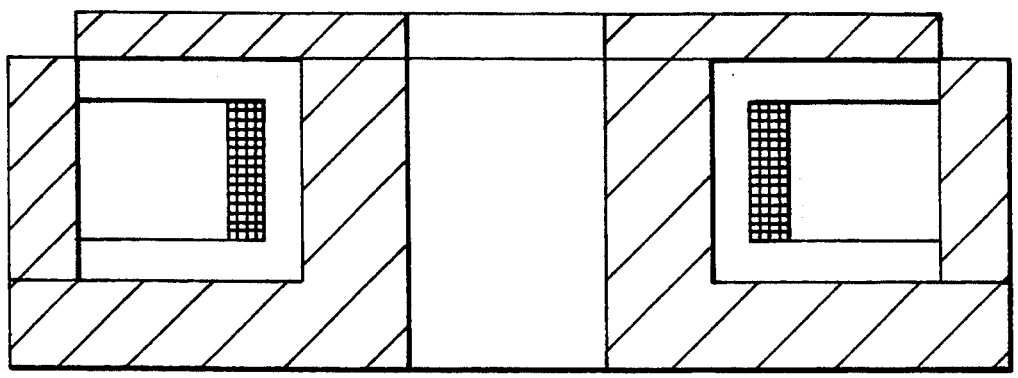
FERRITE CORE SIMULATION GEOMETRY
THICKNESS OF TOP DISC = 1.0mm
L = 944μH
SDF = 1.48
*FIG. 5A*
*FIG. 5B*
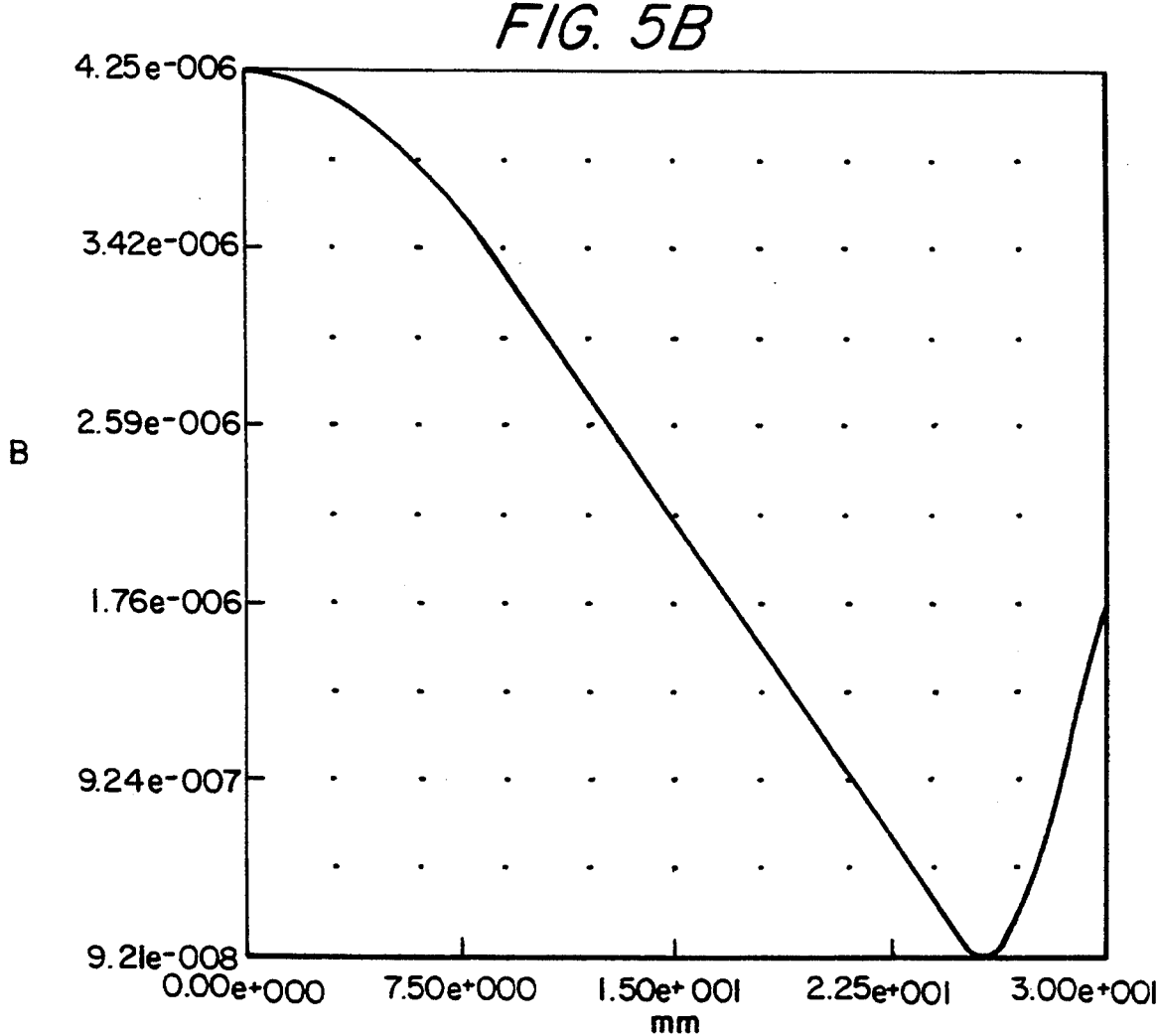

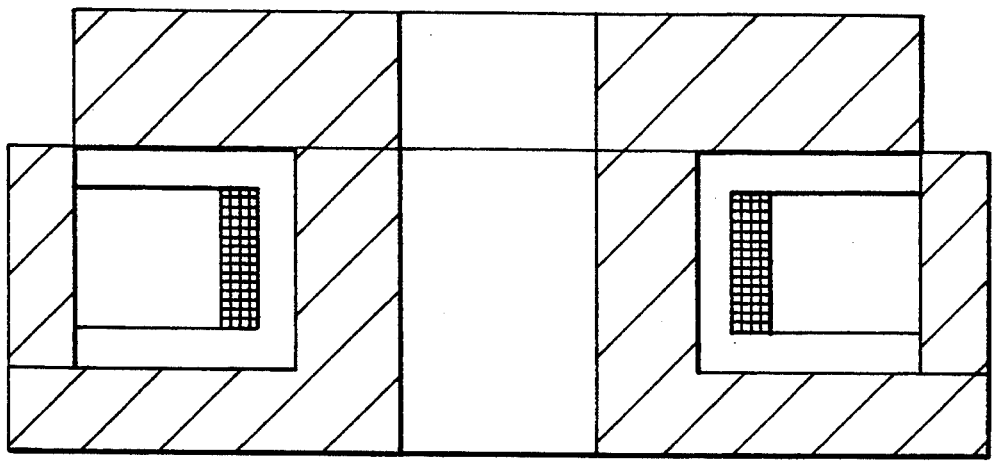
FERRITE CORE SIMULATION GEOMETRY
THICKNESS OF TOP DISC = 3.0mm
L = 1129μH
SDF = 1.66
*FIG. 5C*
*FIG. 5D*
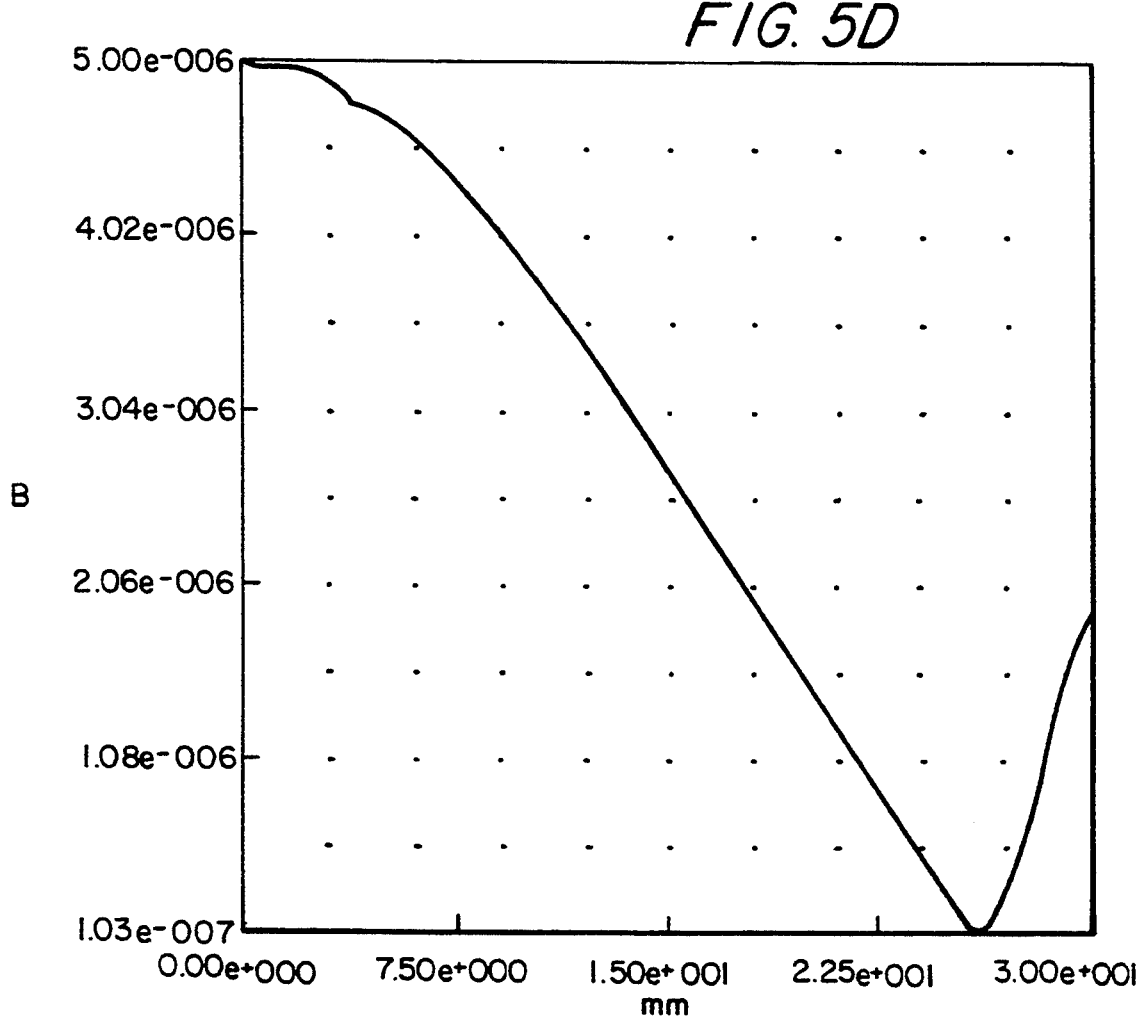

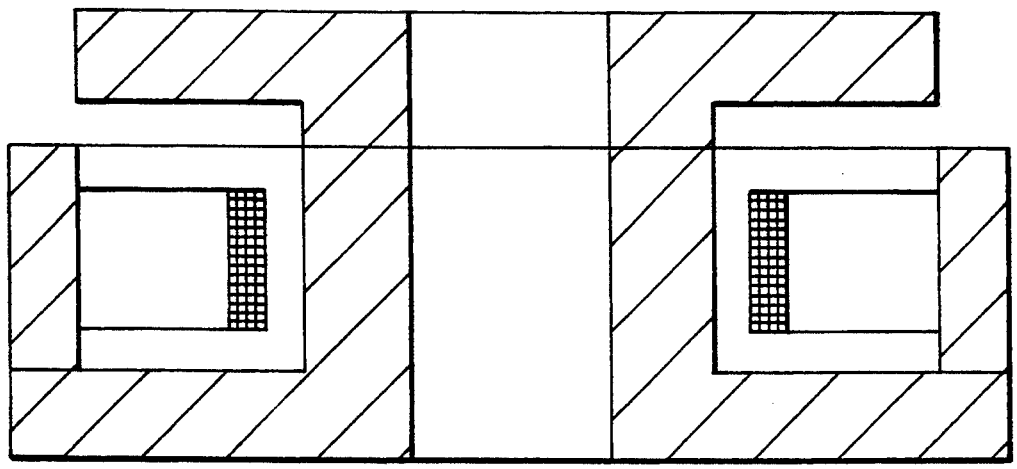
FERRITE CORE SIMULATION GEOMETRY
DISPLACEMENT OF TOP DISC = 1.0 mm
L = 743 μH
SDF = 1.67
*FIG. 6A*
*FIG. 6B*
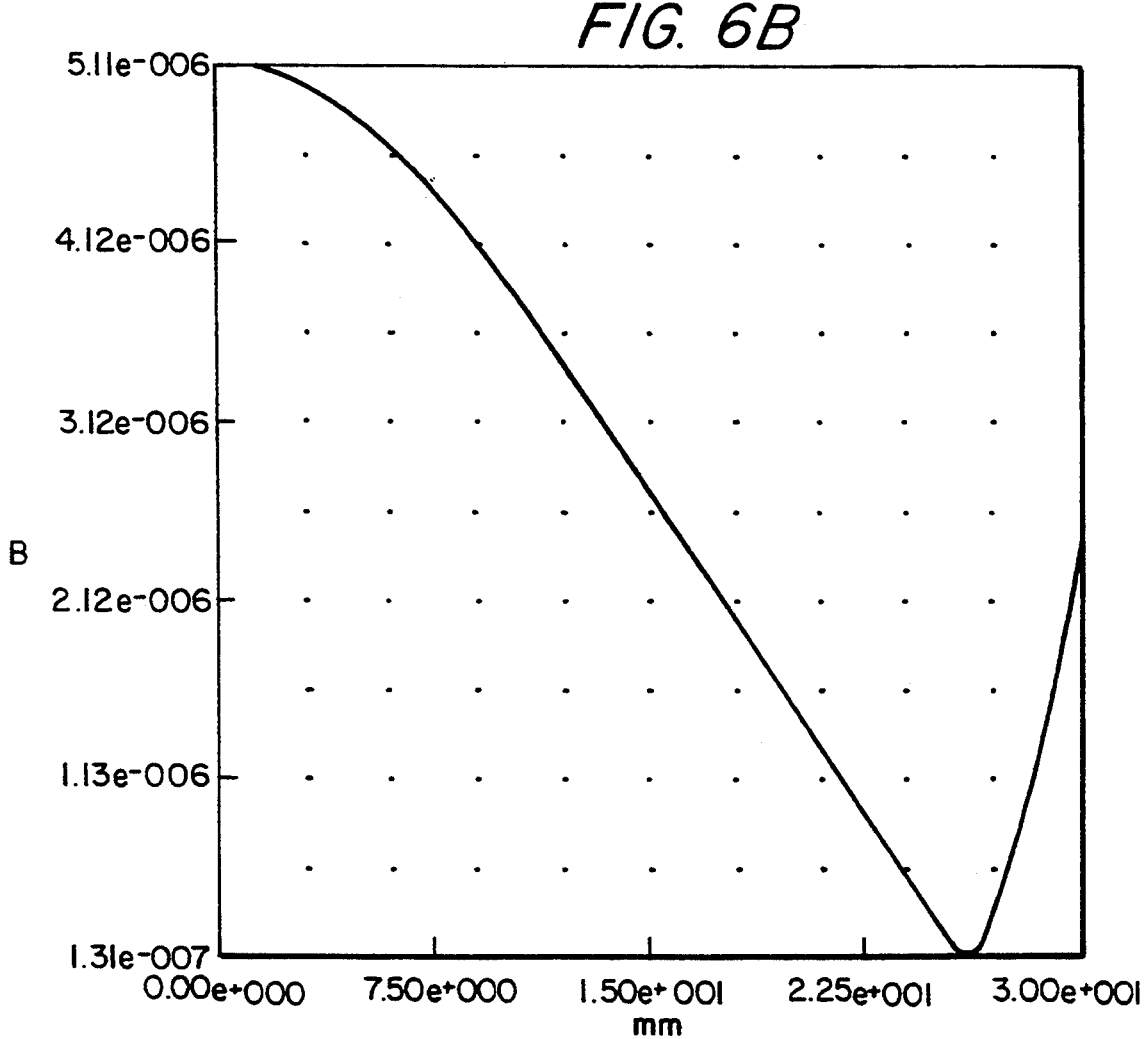

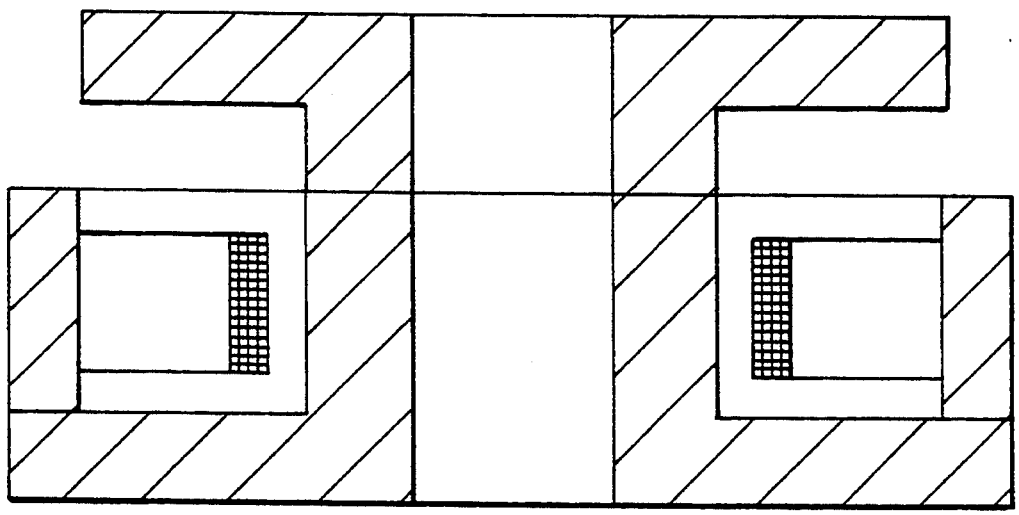
FERRITE CORE SIMULATION GEOMETRY
DISPLACEMENT OF TOP DISC = 2.0 mm
L = 616 μH
SDF = 1.70
FIG. 6C
FIG. 6D
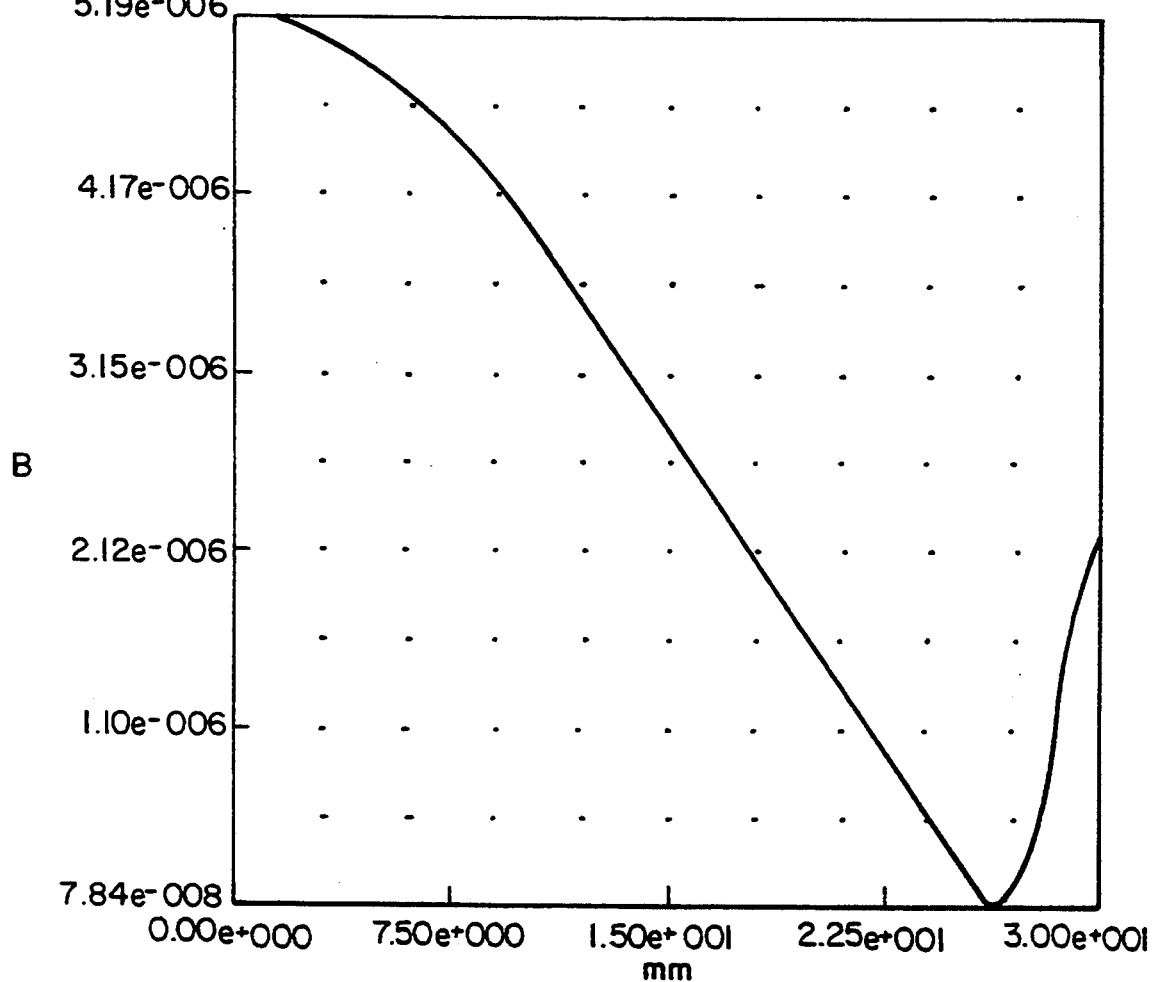

FERRITE CORE SIMULATION GEOMETRY

DISPLACEMENT OF TOP DISC = 4.0mm
L = 490μH
SDF = 1.71

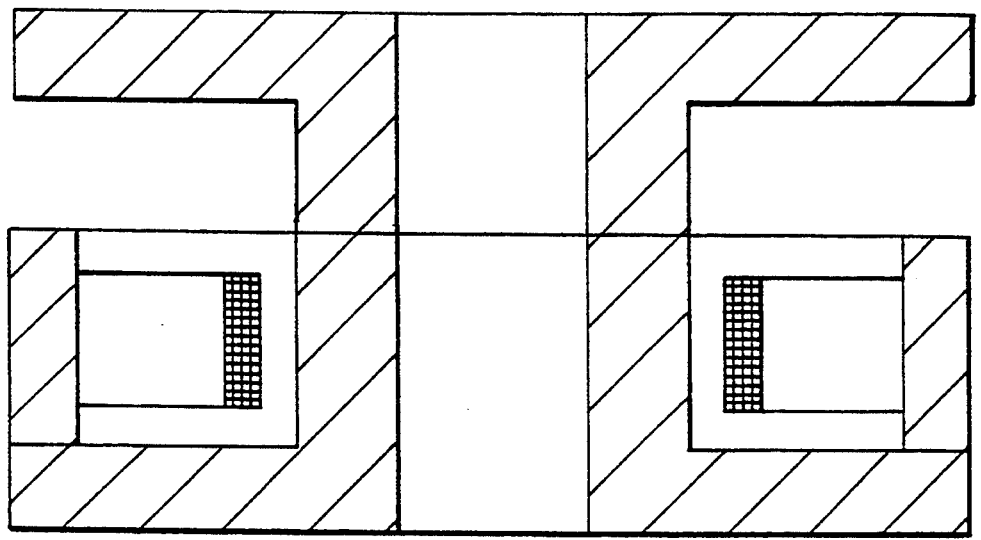
FERRITE CORE SIMULATION GEOMETRY
DISPLACEMENT OF TOP DISC = 3.0mm
L = 636μH
SDF = 1.78
*FIG. 6G*
*FIG. 6H*
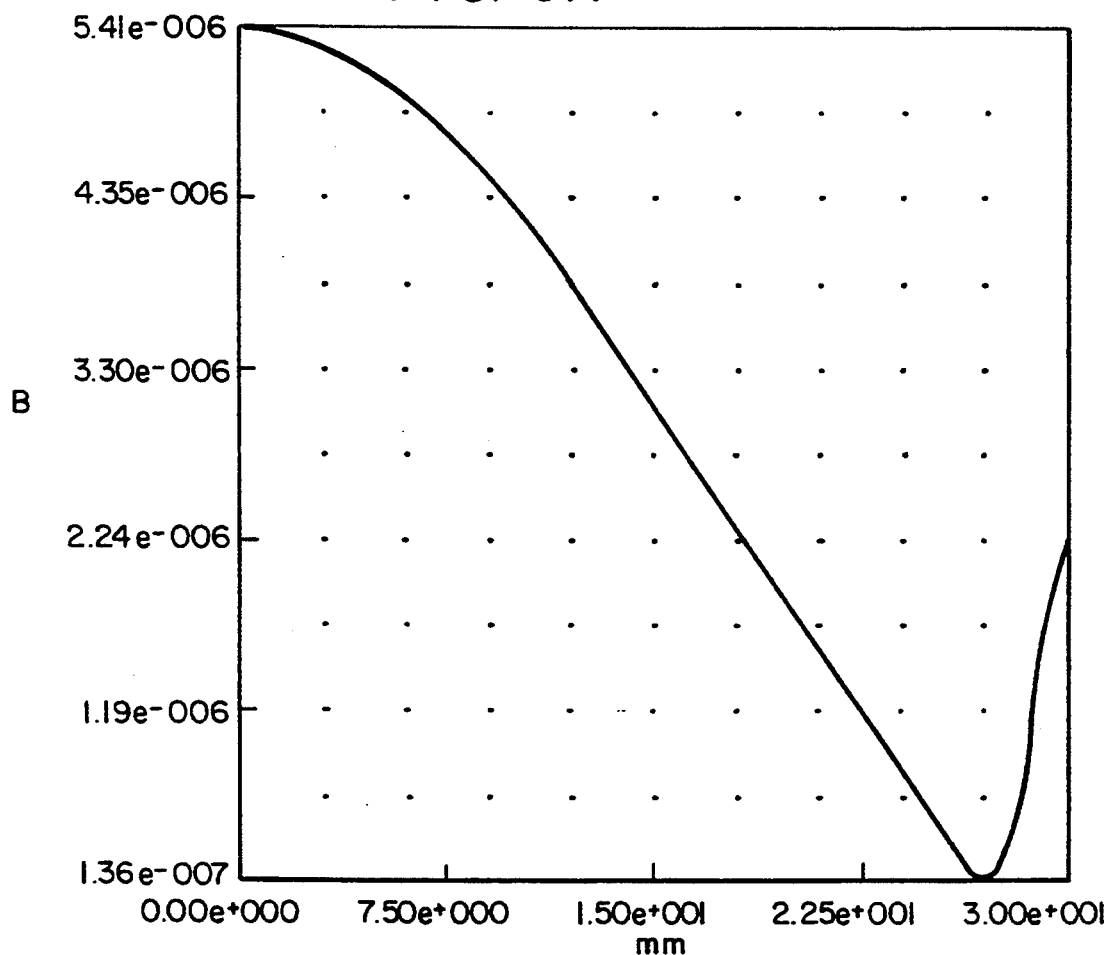

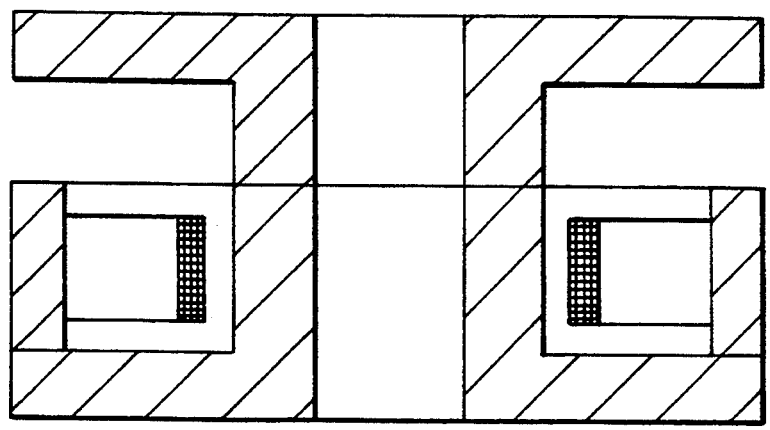
FERRITE CORE SIMULATION GEOMETRY
FIG. 6G SCALED BY 0.567 VERTICALLY ONLY
L = 783 μH
SDF = 1.69
FIG. 7A
FIG. 7B
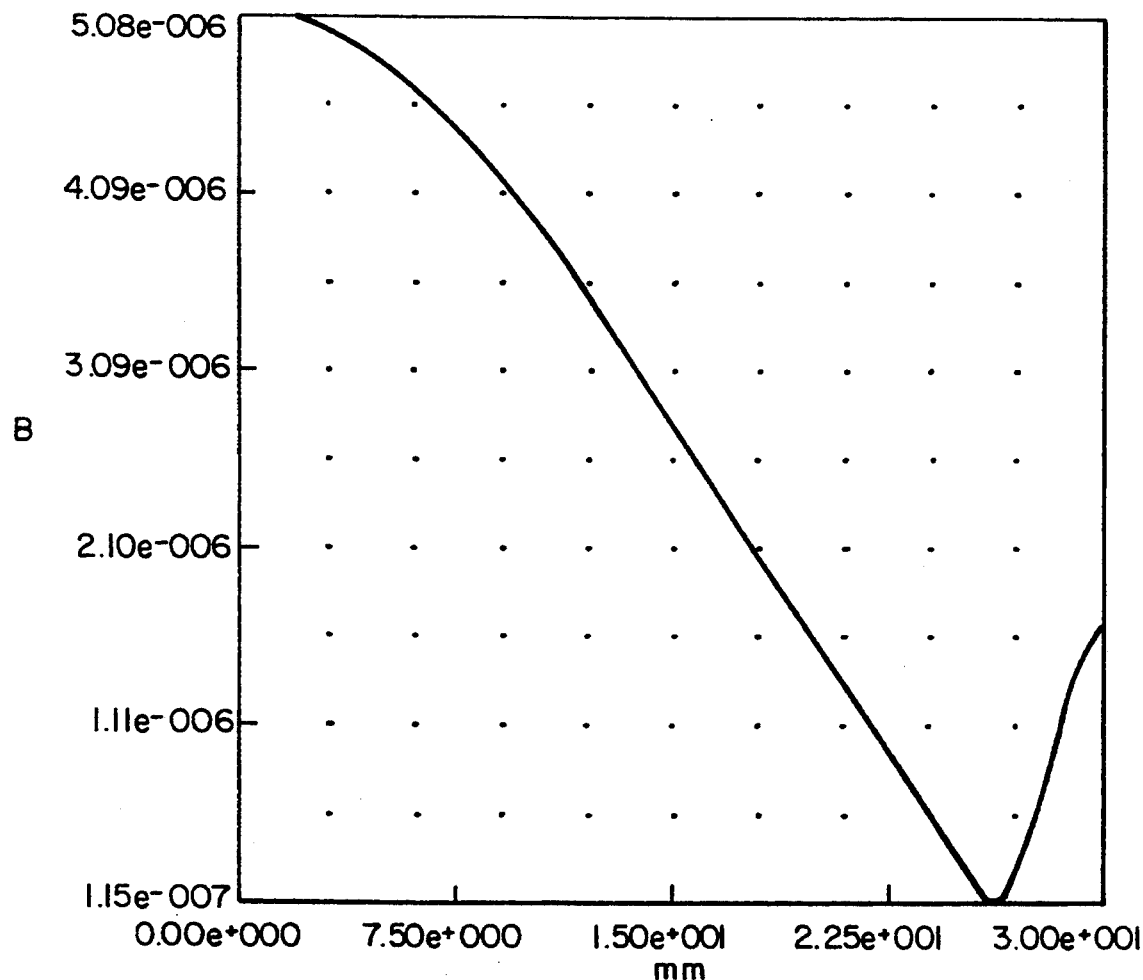

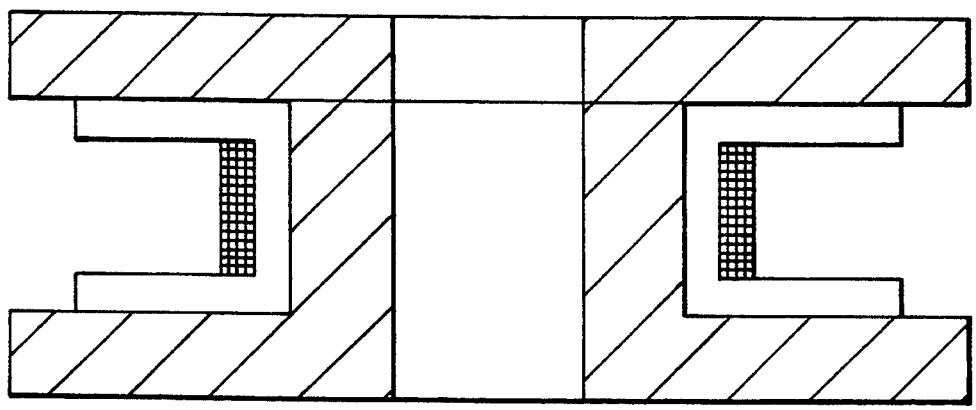
FERRITE CORE SIMULATION GEOMETRY
HEIGHT OF SIDEWALLS = 0mm
L = 502μH
SDF = 1.69
FIG. 8A
FIG. 8B
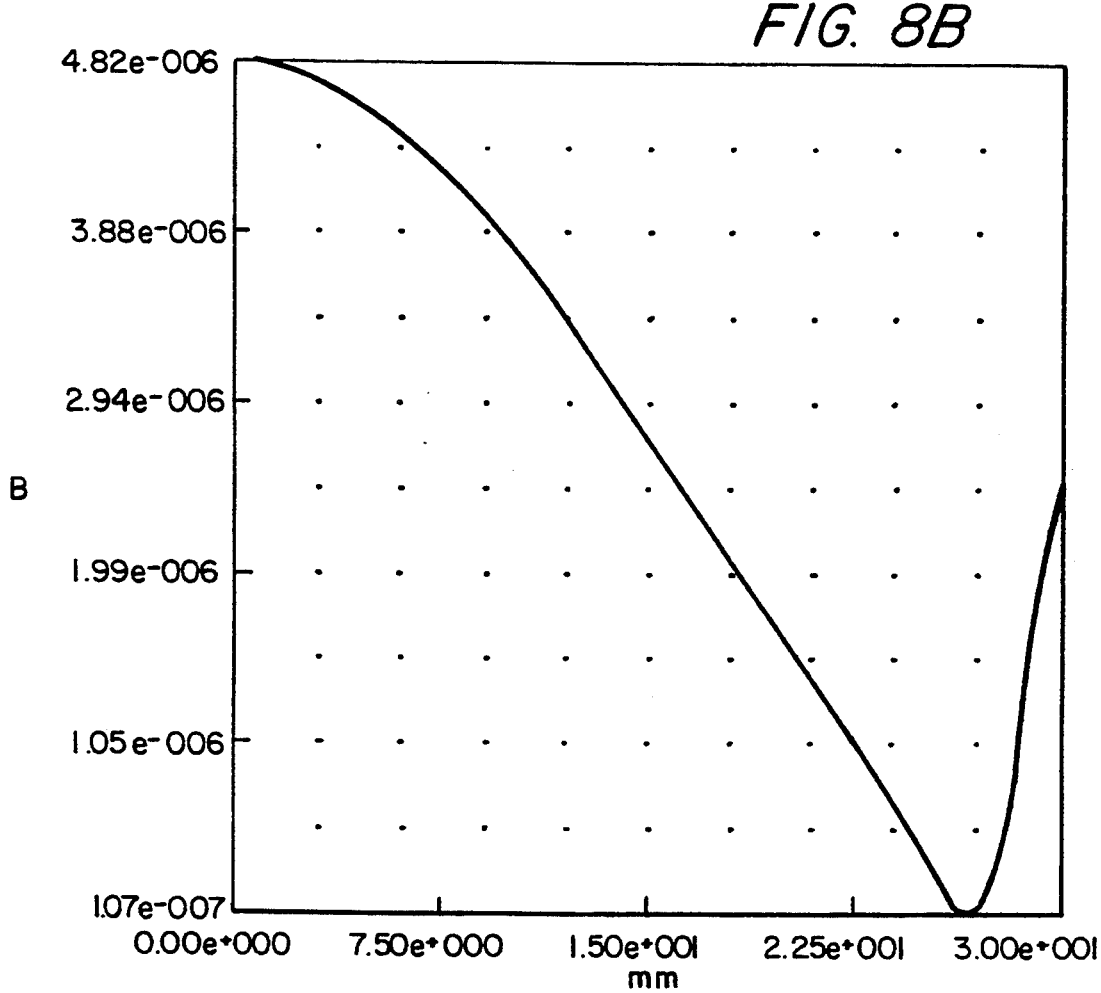

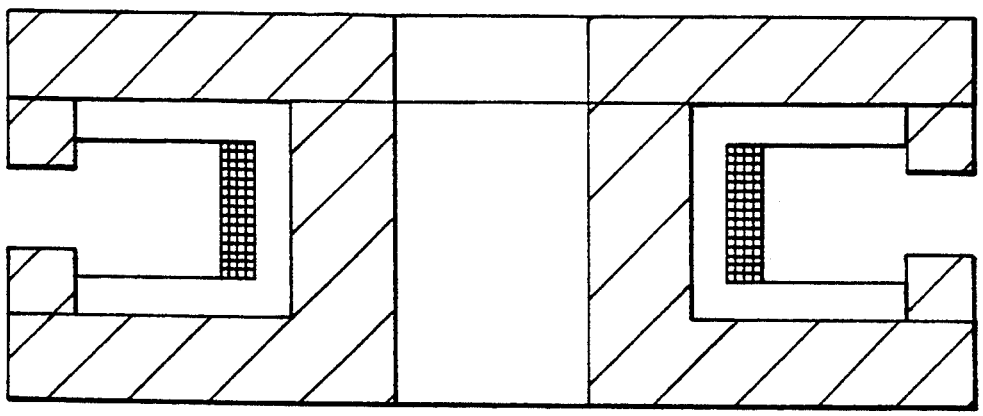
FERRITE CORE SIMULATION GEOMETRY
HEIGHT OF SIDEWALLS = 1.4mm
L = 677μH
SDF = 1.66
*FIG. 8C*
*FIG. 8D*
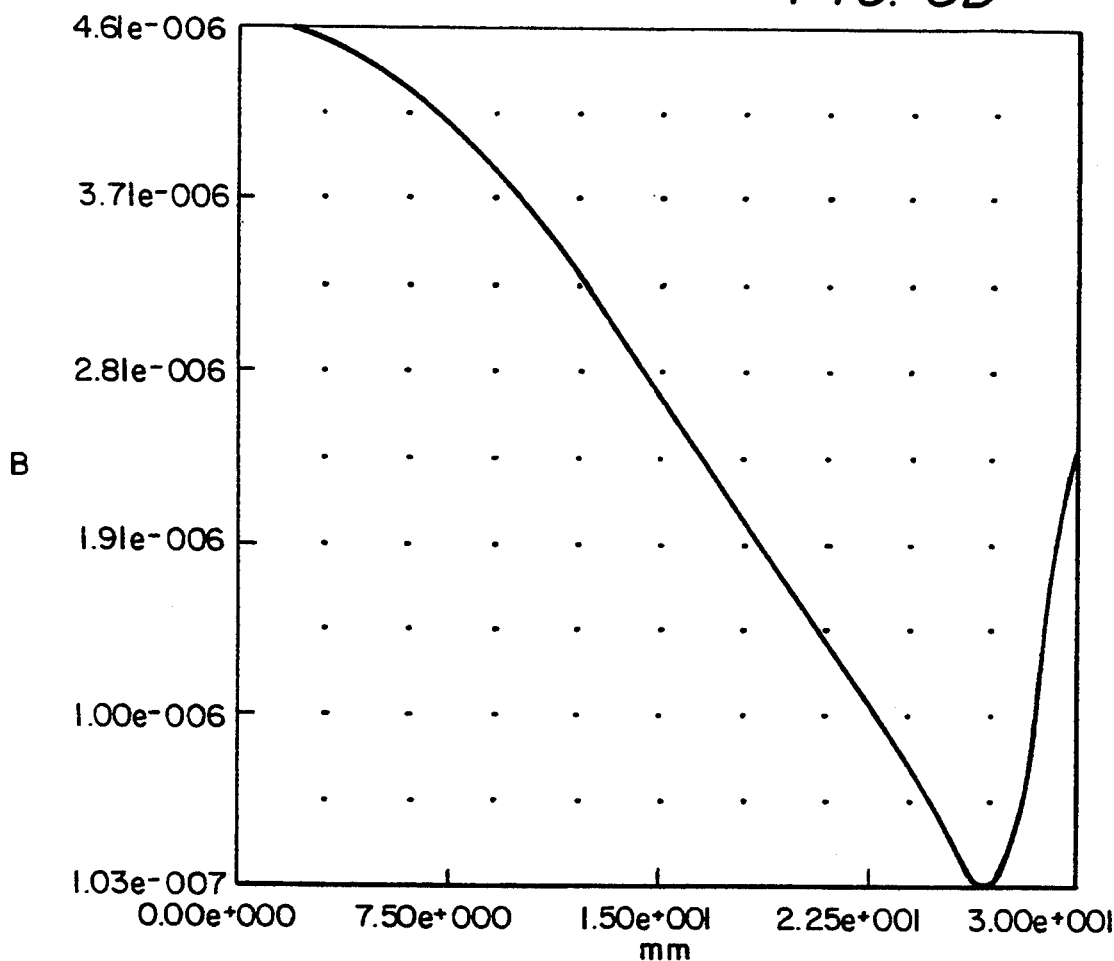

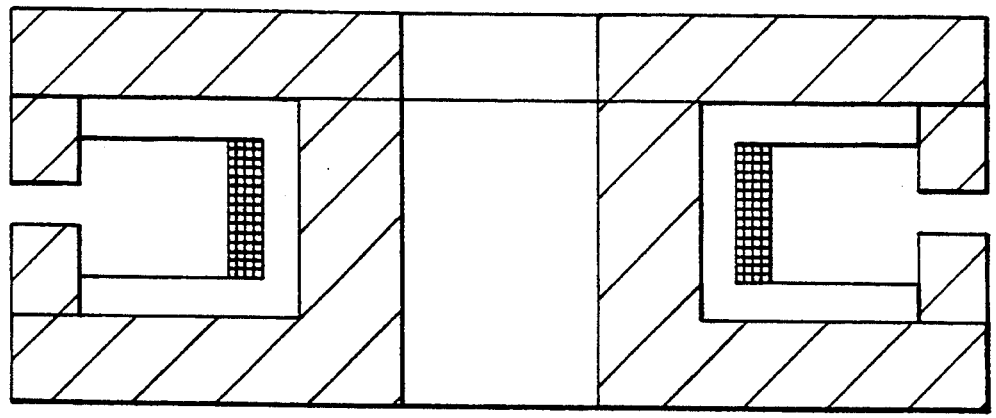
FERRITE CORE SIMULATION GEOMETRY
HEIGHT OF SIDEWALLS = 1.9mm
L = 912μH
SDF = 1.63
FIG. 8E
FIG. 8F
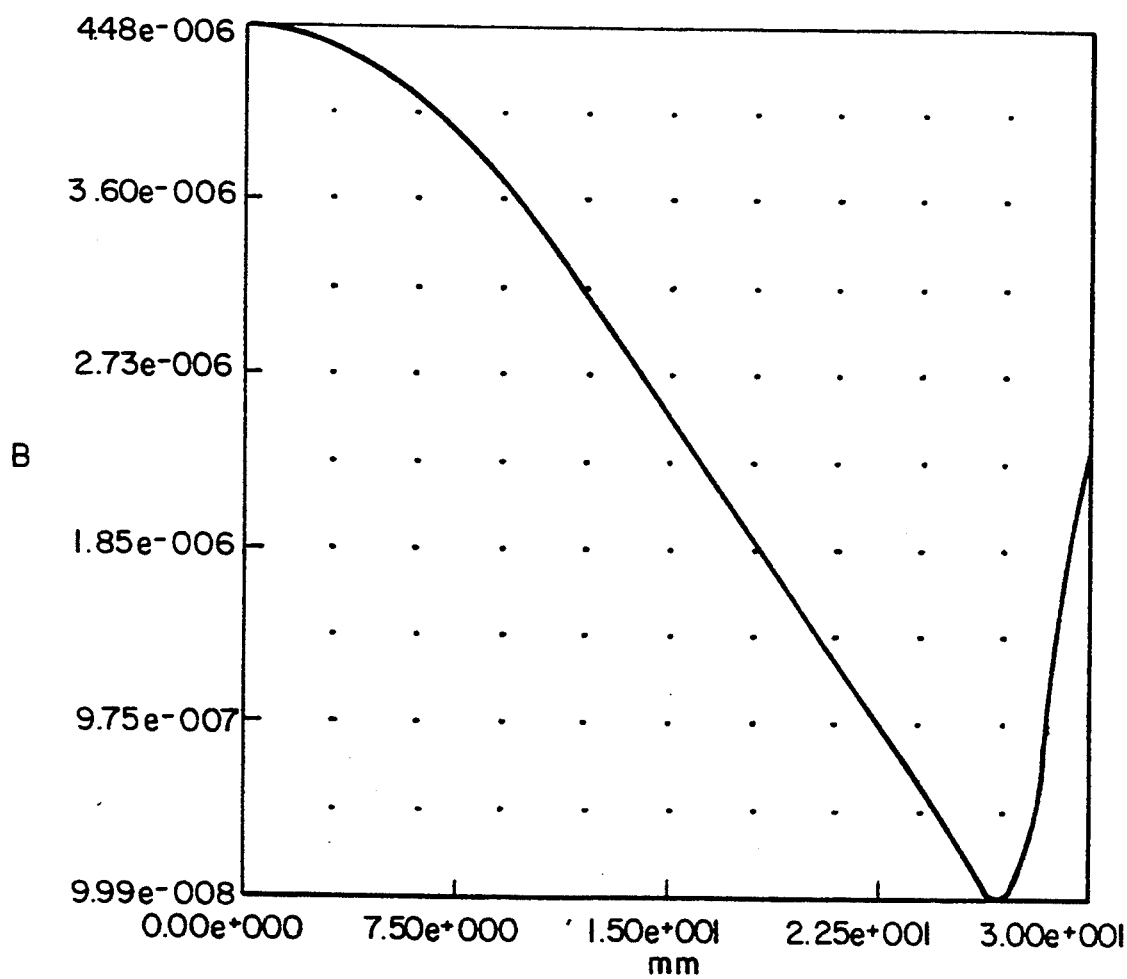

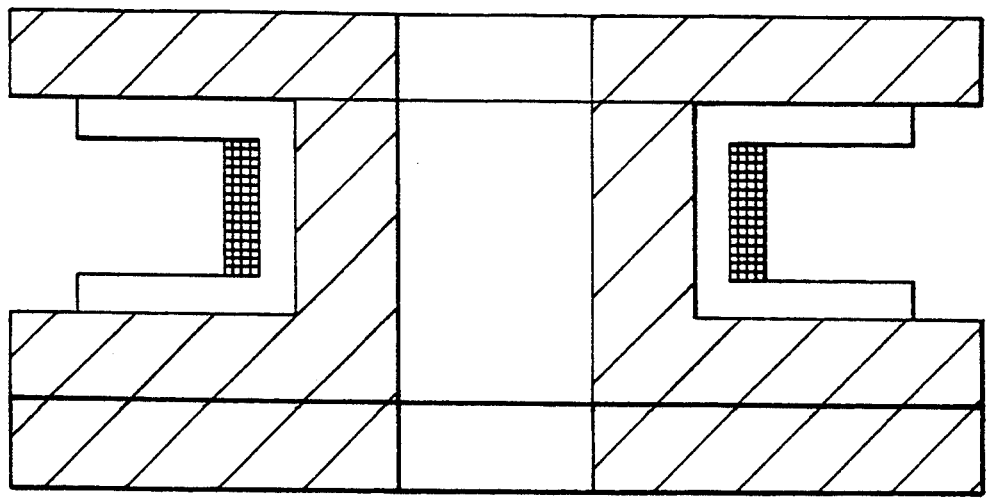
FERRITE CORE SIMULATION GEOMETRY
BOTTOM FERRITE THICKNESS = 1.9mm
L = 522μH
SDF = 1.78
*FIG. 9A*
*FIG. 9B*
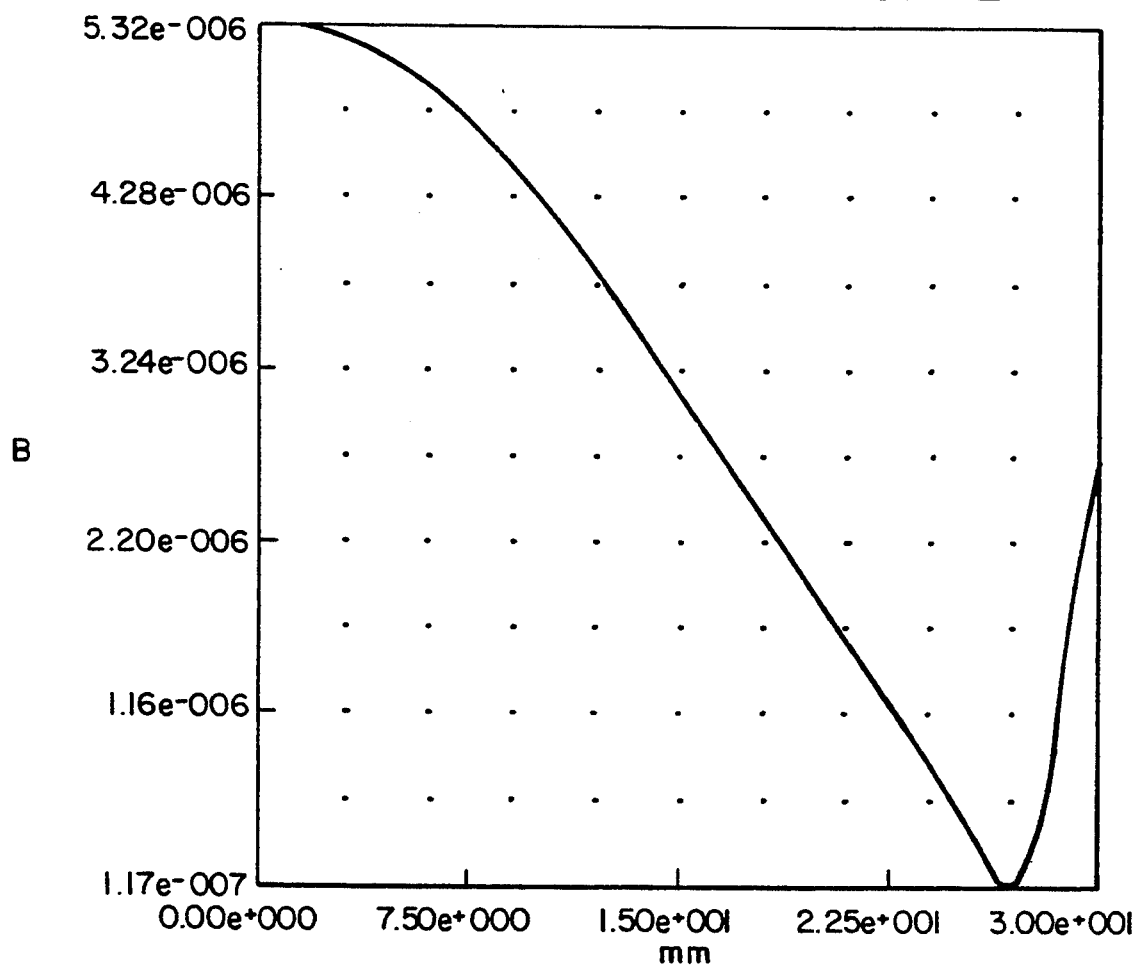

FERRITE CORE SIMULATION GEOMETRY
BOTTOM FERRITE THICKNESS = 3.8mm
L = 541μH
SDF = 1.85

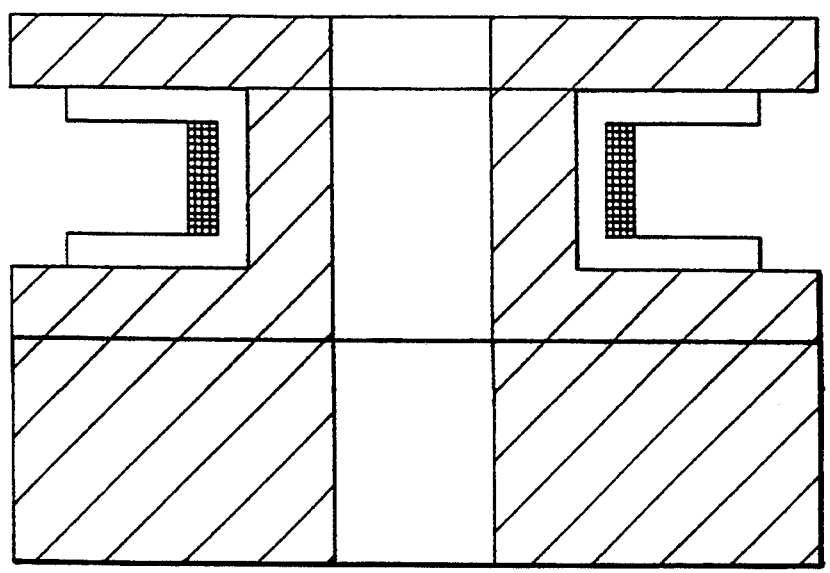
FERRITE CORE SIMULATION GEOMETRY
BOTTOM FERRITE THICKNESS = 5.7mm
L = 549μH
SDF = 1.90
FIG. 9E
FIG. 9F
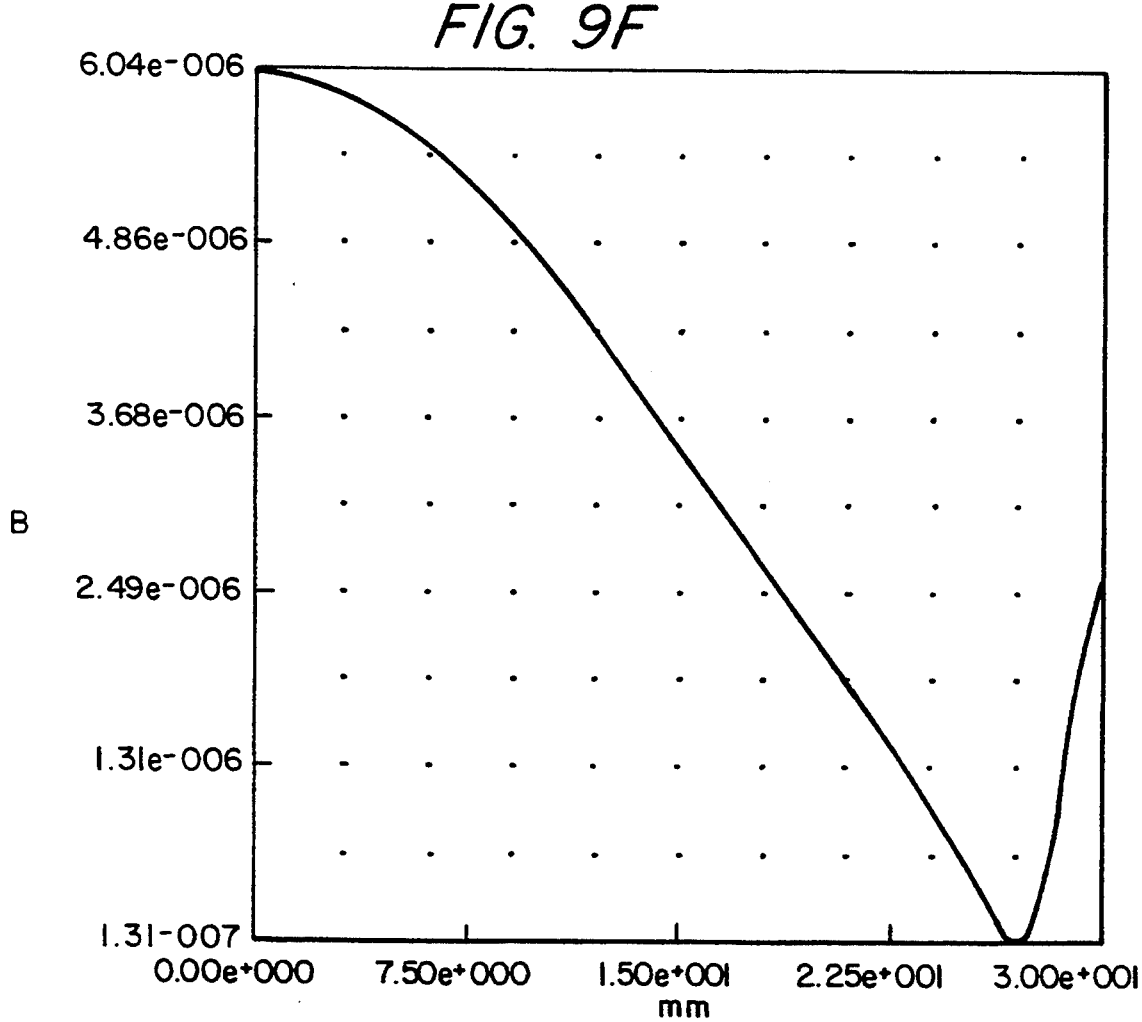

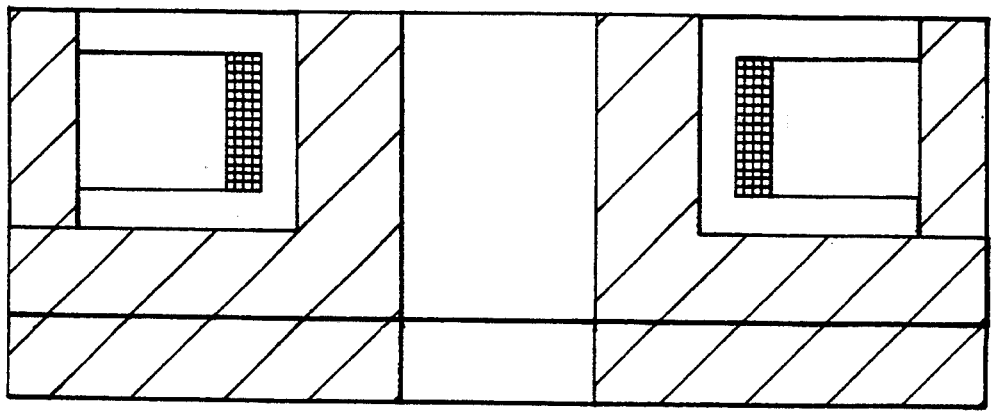
FERRITE CORE SIMULATION GEOMETRY
BOTTOM FERRITE THICKNESS = 1.9mm
L = 185µH
SDF = 1.03
*FIG. 10A*
*FIG. 10B*
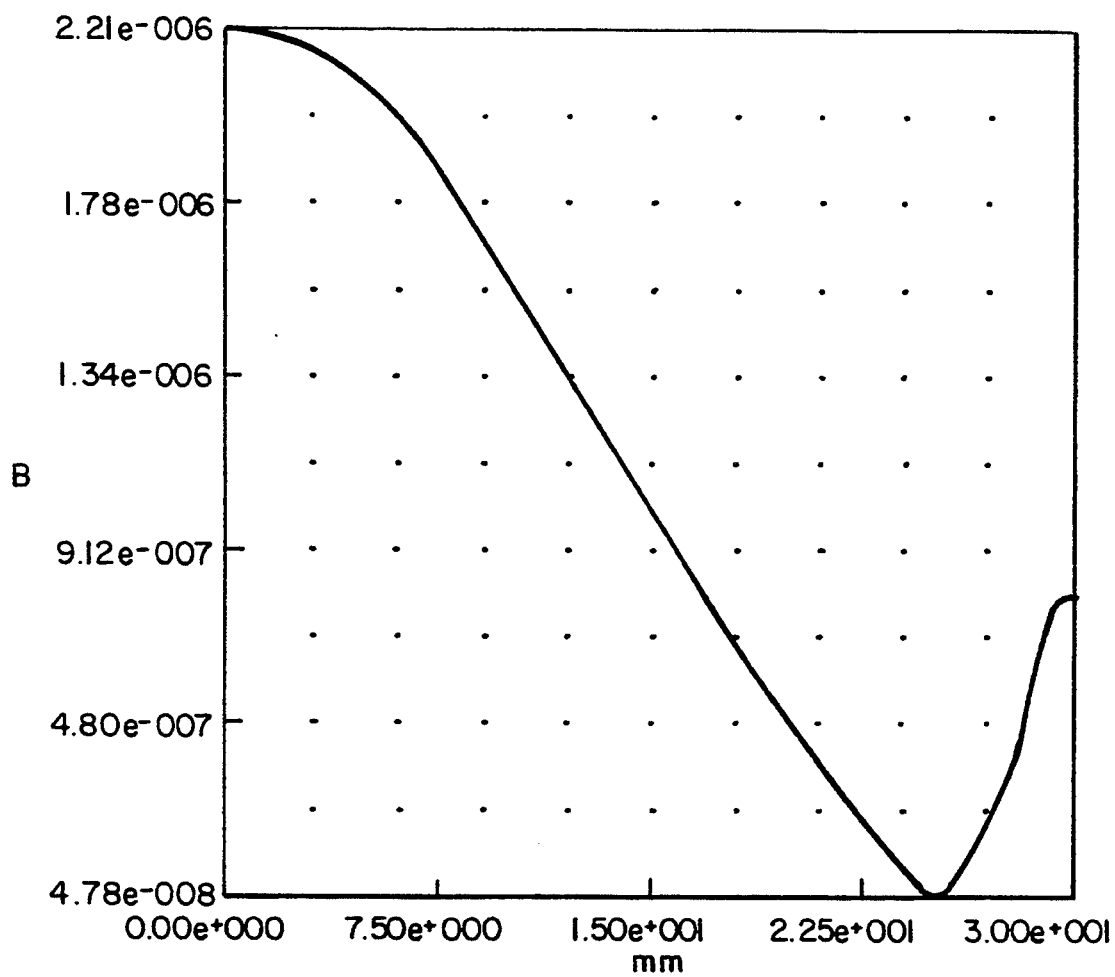

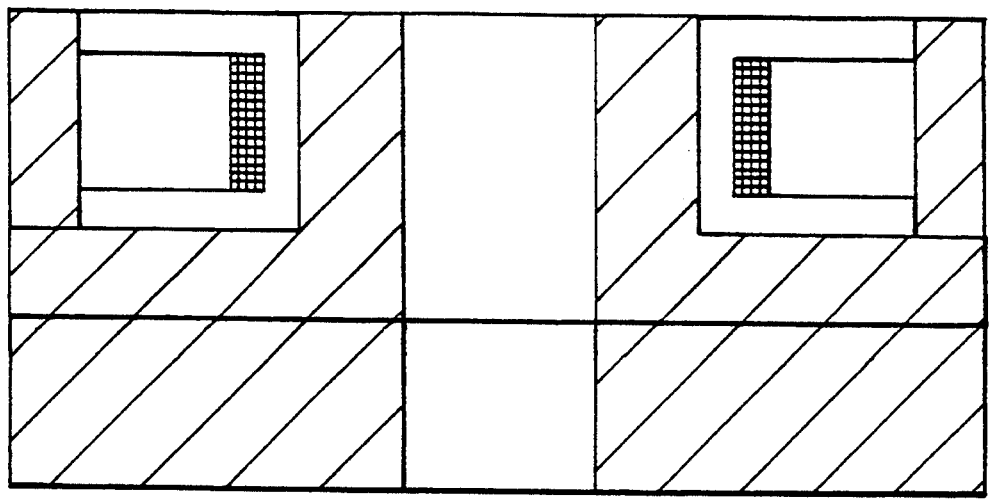
FERRITE CORE SIMULATION GEOMETRY
BOTTOM FERRITE THICKNESS = 3.8mm
L = 188μH
SDF = 1.03
FIG. 10C
FIG. 10D
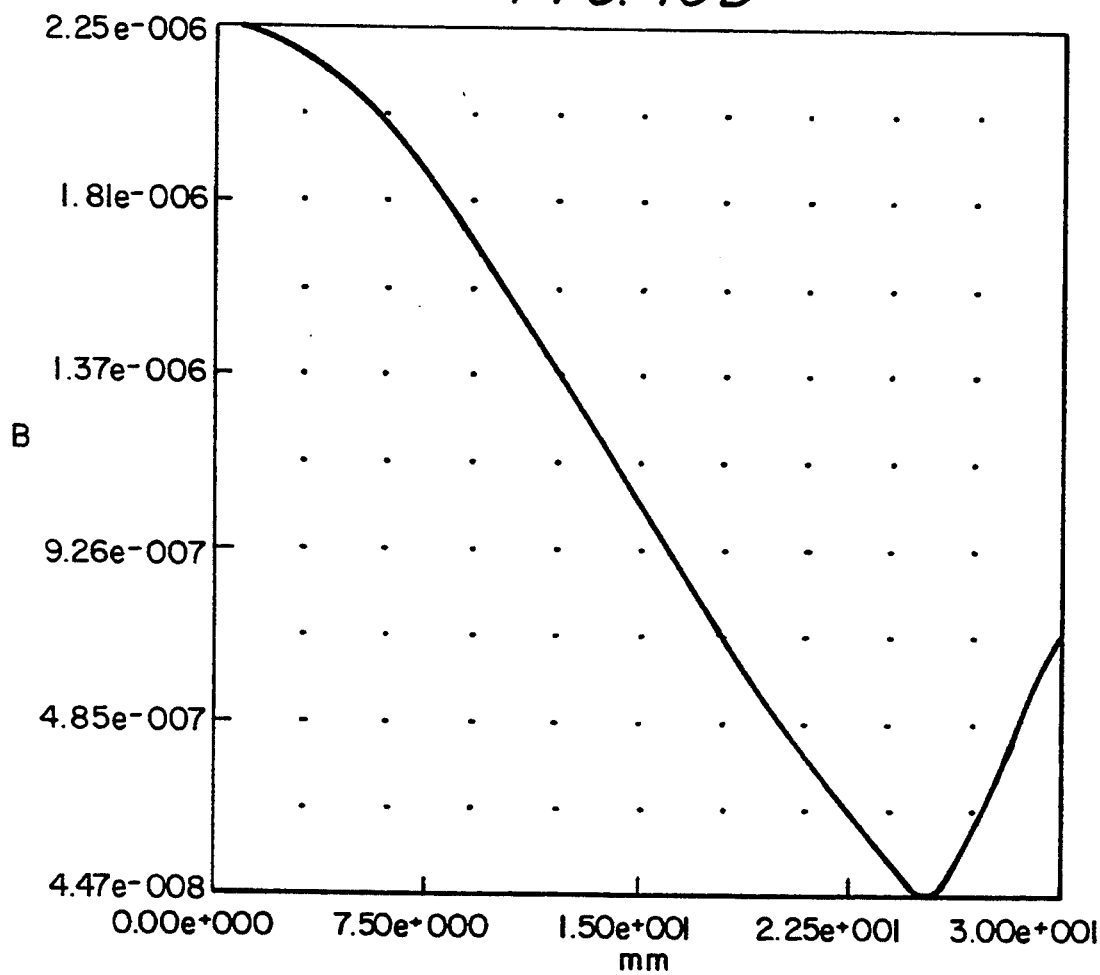

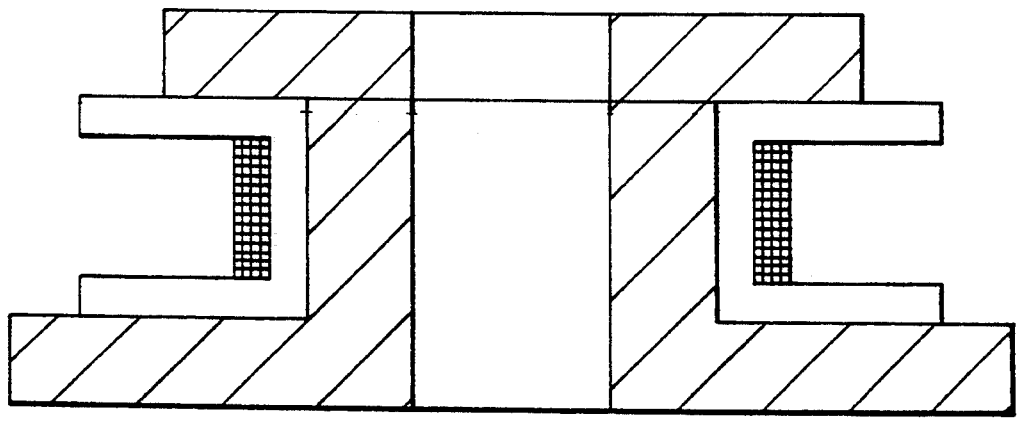
FERRITE CORE SIMULATION GEOMETRY
SAMPLE I
L = 338μH
SDF = 1.53
FIG. 11A
FIG. 11B
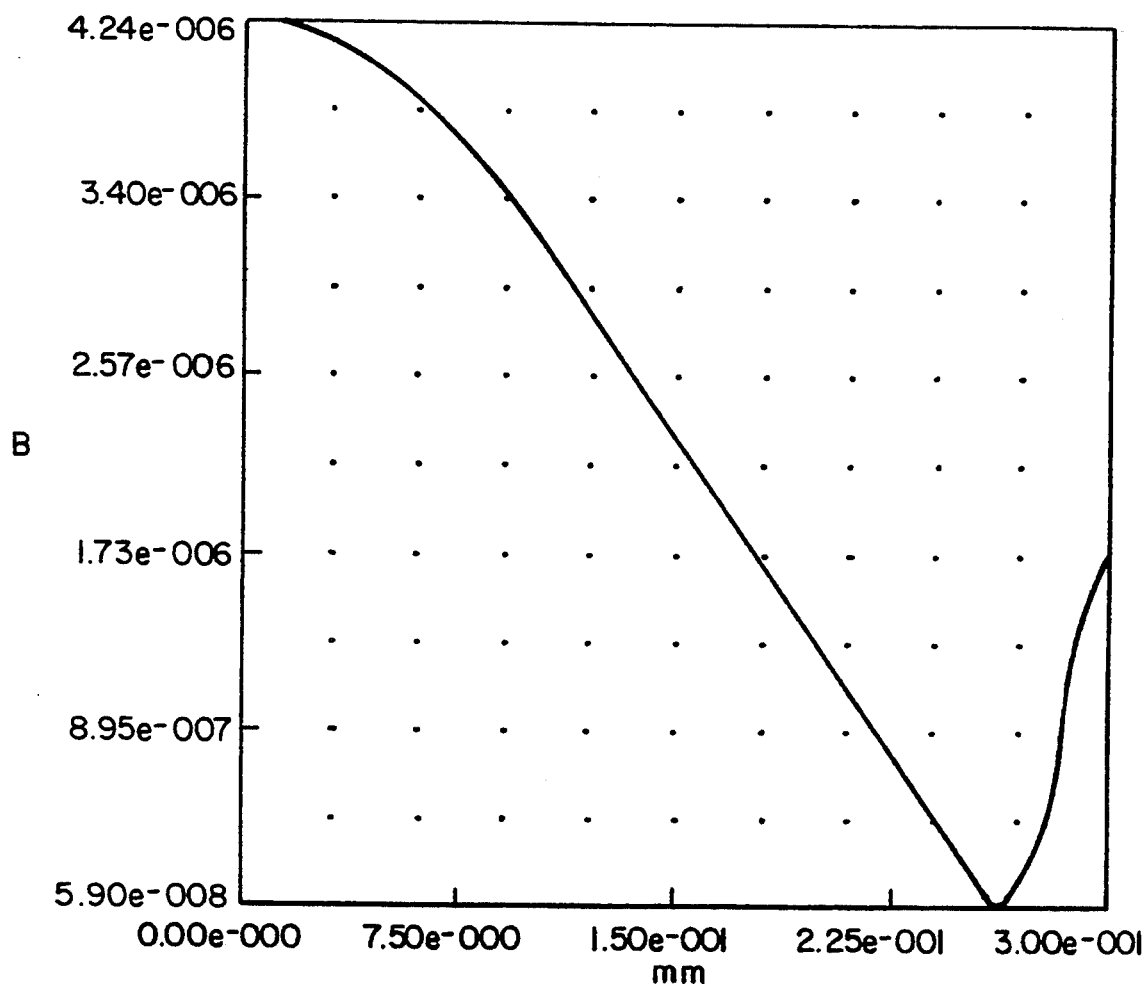

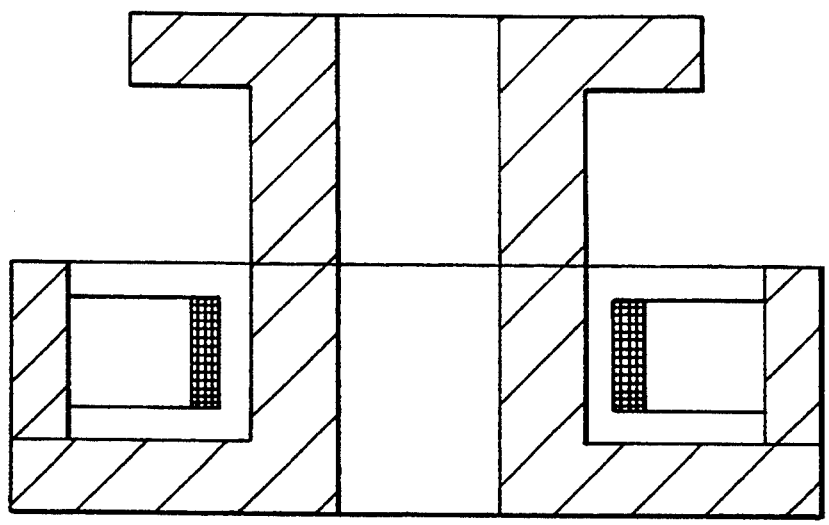
FERRITE CORE SIMULATION GEOMETRY
SAMPLE 2
L = 430 H
SDF = 1.65
FIG. 12A
FIG. 12B
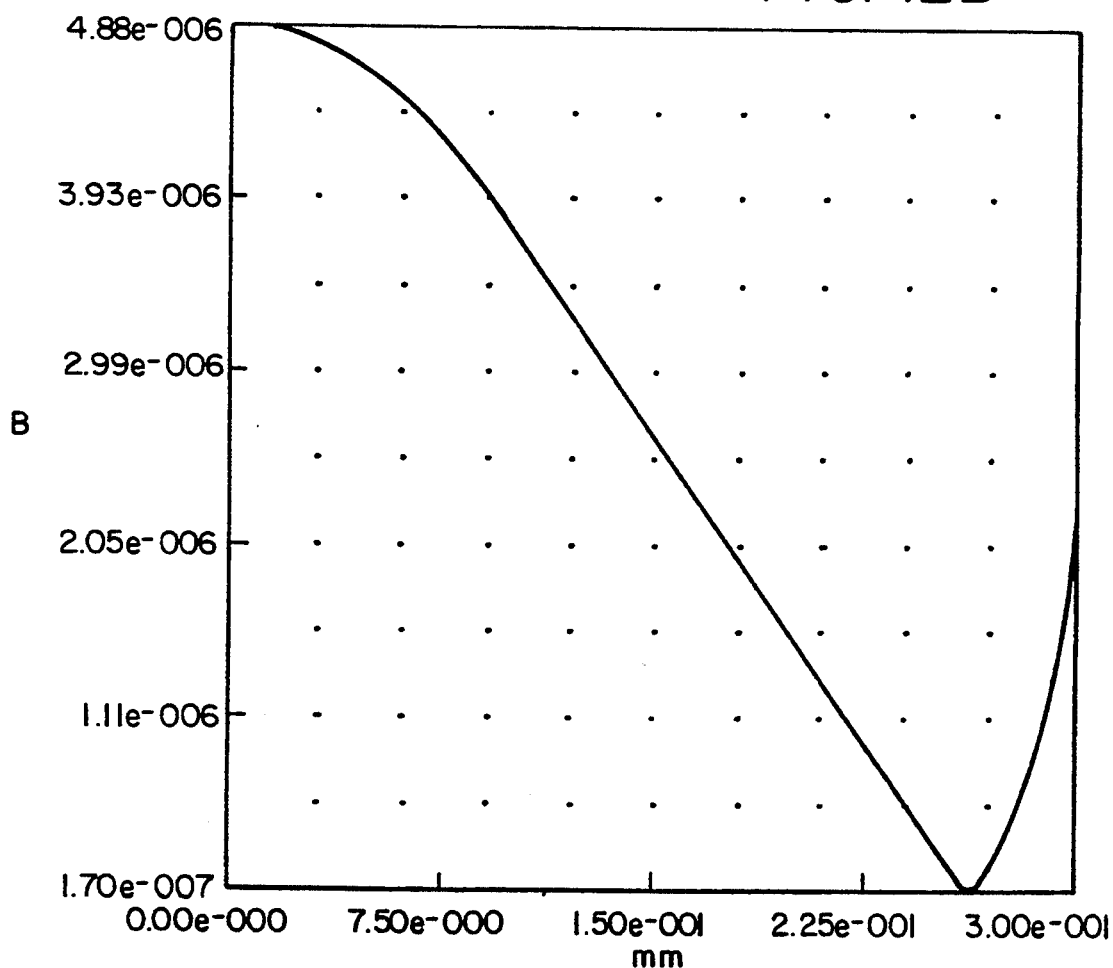

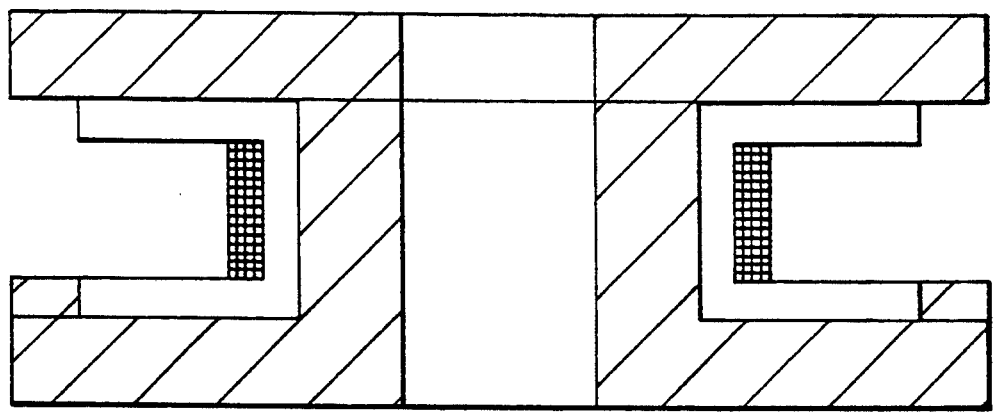
FERRITE CORE SIMULATION GEOMETRY
SAMPLE 3
L = 527μH
SDF = 1.67
*FIG. 13A*
*FIG. 13B*
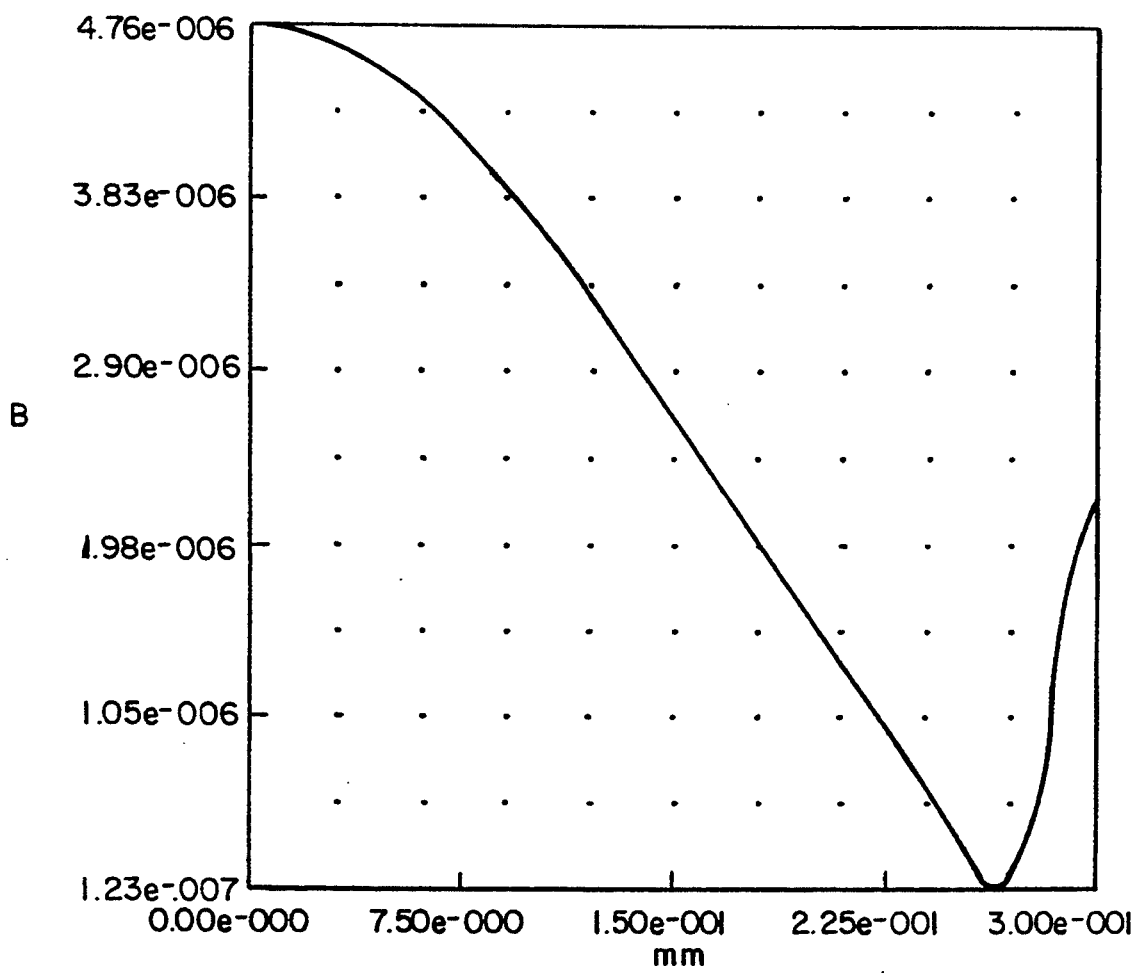

NON-SYMMETRICAL INDUCTIVE SENSORS HAVING FERRITE COIL GEOMETRIES WITH DIFFERENT TOP AND BASE GEOMETRIES

BACKGROUND OF THE INVENTION

1. Field of the Invention

The present invention relates to the design of ferrite cores for inductive proximity sensors of the ECKO type.

The purpose of the ferrite core in these sensors is to concentrate and focus the alternating magnetic field produced by a current-carrying winding. The magnetic flux is specifically aimed at the sensor's metal target, and since the sensing operation is dependent on the generation of eddy currents within the metal target, the range at which the target can be detected is a direct function of how optimally the magnetic flux is cut by the target. In a preferred embodiment the target is a circular disk, just as is used in industry for standardization procedures.

2. Description of Related Art

Proximity sensors are devices used to detect and register the presence of specific objects depending on their variety or principle of operation. They may be based on a number of principles; capacitance, eddy current, photoelectricity, or even the Hall effect. Depending on the principle of operation, each class of sensor will detect a certain class of objects (targets) only.

In particular, inductive proximity sensors operate on the principle of eddy currents. In view of this, they are capable of detecting and registering the presence of metals only. They are used extensively in industry for a very wide variety of non-contact sensing operations; from controlling the movement of individual parts of complex robots to other operations like counting metal cans on a conveyor belt.

Inductive proximity sensors consist of a coil wire supporting high frequency current. This high frequency current gives rise to a magnetic field oscillating at the same frequency. The oscillating magnetic field induces eddy currents in the metal target which causes damping of the oscillator circuit feeding the sensor's winding. The damped oscillation is detected by associated electronics—a Schmitt trigger circuit and additional chatter-prevention electronics. Because of this mode of operation, inductive proximity sensor technology has acquired the term ECKO technology, which stands for Eddy Current Killed Oscillator.

The following is a brief overview of different techniques that have been implemented in one form or another in the design of proximity sensors of the inductive type. It must be made clear that the design of all proximity sensors is a twofold problem; first, the specific principle on which the transducer operates must be decided upon. Secondly, the means by which the detector acquires and processes the information gathered by the transducer must also be conceived.

In what follows, various transducers and their associated detectors operating on the inductive principle are reviewed.

By far, the most widely used method of inductive sensing is the ECKO variation. As indicated earlier, this abbreviation stands for Eddy Current Killed Oscillator. The principle on which this operates is discussed in detail later. Sensors based on this mode of operation have a sensing range of up to about 50 mm for a standard 30 mm diameter size with the average sensing distance for ferrous metals being in the neighborhood of 15 mm.

One method, the inductance divider sensor, consists of a sensor inductor connected in series with an identical reference inductor between input and ground to form an inductive divider network. The sensor inductor is positioned so that its inductance can be varied in response to the proximity of a target while the inductance of the reference inductor remains constant. Voltage pulses are periodically applied to the divider network from a source and divide across the reference and sensor inductors in the ratio of their respective inductances. A detector monitors the output of the divider and provides information on the proximity of the target. It should be understood that this method of detection is suitable for metallic targets only since non-metallic targets are incapable of altering flux linkage (and hence inductance).

Another scheme for detecting the spatial proximity of a ferrous object is the magnetic bridge proximity sensor. This configuration comprises a magnetic reluctance bridge formed from a combination of high and low permeability sections. There is a ring core flux gate magnetometer positioned to form the center reluctance path of the bridge in order to sense flux when the bridge is unbalanced. A direct current magnetic field generator is positioned along a line of symmetry of the bridge to provide magnetic flux within the bridge. When a ferrous object appears within sufficient proximity of one of the low permeability sections it unbalances the bridge and causes flux to be detected by the flux gate magnetometer. Additional circuitry is provided for generating a triggering signal when the magnetometer detects sufficient flux.

Yet another variation of proximity sensor operates by having a field-creating coil arrangement which produces a field having a field strength minimum. It also has a sensing coil positioned at that field strength minimum which is responsive to changes in position of that minimum. When a target is brought close enough to the field-creating coil arrangement, the position of the field strength minimum moves. The sensing coil registers this displacement of the minimum and thus information concerning the proximity of the target is ascertained.

A fourth method of implementing target detection is based on the alteration of the magnetic flux pattern of a permanent magnet by the presence of a ferrous target. A permanent magnet is positioned within a chassis so that the axis and poles of the flux field are substantially normal to the front of the chassis. A switch is also positioned along the front of the chassis near the magnet. This switch has contacts operable by the magnetic flux field of the permanent magnet. Therefore the contacts of the switch operate in a fashion directly related to the proximity of the target and thus, information about its proximity is obtained. The flux pattern produced by the permanent magnet is further focussed by a ferrite core.

It is clear from the examples briefly presented that the vast majority of inductive sensors are capable of detecting only ferromagnetic targets. There are not very many metals that are ferromagnetic and this is the primary reason for the widespread use of the ECKO principle; it is capable of detecting non ferrous objects. It has, however, the additional requirement that the target be able to support eddy currents, i.e., that the target be an electrical conductor. Of course, it is most responsive to ferrous metals.

There is thus a need for new ferrite core geometries for inductive proximity sensors where such geometries yield increased sensing ranges. The present invention is directed toward filling that need.

SUMMARY OF THE INVENTION

One of the most important factors dictating the maximum range available from inductive proximity sensors operating in the eddy current killed oscillator (ECKO) mode is the ferrite core in the inductive coil/core transducer. The present invention relates to the provision of new core geometries to increase the sensing range of such transducers.

A theoretical analysis discussed in detail hereinafter was performed to yield electromagnetic parameters that could facilitate direct prediction of the sensing capability of any ferrite core geometry. The results of this analysis were then applied to a multitude of Finite Element Analysis models to study changes in maximum sensing distance due to ferrite core geometry modifications.

To facilitate this study, a reference core geometry was vital. The ubiquitous pot core halves in present industrial use provided just that. This enabled the extraction of a ratio, the Sensing Distance Factor (SDF), from the finite element models that would directly indicate core-geometry sensing distance "gain" compared to an arbitrarily assigned value of 1.00 for the reference pot core half.

The study was done for cores that are used in 30 mm sensors (22 mmm in diameter) and the SDF's were applied to this core size only. They may be higher or lower for other core sizes (12 and 8 mm for example). It is believed that similar shapes for other cores sizes will show roughly identical trends in SDF.

The SDF applies for ferrite cores in free space (or surrounded by non-metallic, non-magnetic media). It is important to be aware of the fact that the SDF's will not hold if the cores are inserted into any sort of metallic housing for flush-mount applications; they apply strictly to non-flush mounting with sufficient clearance from any metallic housing in which they are mounted (e.g., tubular housing). Therefore, the "shielded" or "unshielded" nature of a particular core geometry is an indication of the extent to which it "side-senses" (all cores do, including the reference) and not its suitability for design of flush mount sensors. A high performance core geometry exhibits side sensing which may or may not be objectionable (close to 50% of the on-axis distance).

The SDF is independent of frequency and will hold over a wide range of frequencies from the low KHz up into the low MHz. An engineering concern is the fact that very significant changes in inductances accompany many of the core geometries. It will therefore be necessary to keep this in mind when attempting to design with a particular core; operating frequency as well as wire gauge and number of turns will have to be altered accordingly for each core.

Thus, it is an object of the present invention to identify several ferrite core geometries that have the highest performance in terms of a proximity sensor's ability.

It is a further object of the present invention to seek core geometry optimizations that will enhance the performance of the sensor.

These and other objects and advantages will become apparent when considering the following description and drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 2A is a schematic illustration of a prior art core geometry constituting a reference pot core.

FIG. 2B is a graph showing B vs. radial distance for the core geometry of FIG. 2A.

FIG. 3C is a schematic illustration of a ferrite core geometry with an outer wall lower than in FIG. 3A.

FIG. 3D is a graph showing B vs. radial distance for the core geometry of FIG. 3C.

FIG. 3E is a schematic illustration of a ferrite core geometry with an outer wall lower than in FIG. 3C.

FIG. 3F is a graph showing B vs. radial distance for the core geometry of FIG. 3E.

FIG. 3G. is a schematic illustration of a ferrite core geometry with an outer wall fully removed.

FIG. 3H is a graph showing B vs. radial distance for the core geometry of FIG. 3G.

FIG. 4A is a schematic illustration of a ferrite core geometry with a top disc.

FIG. 4B is a graph showing B vs. radial distance for the core geometry of FIG. 4A.

FIG. 4C is a schematic illustration of a ferrite core geometry with a top disc with a larger radius than in FIG. 4A.

FIG. 4D is a graph showing B vs. radial distance for the core geometry of FIG. 4C.

FIG. 5A is a schematic illustration of a ferrite core geometry with a top disc of a thickness approximately equal to 1.0 mm.

FIG. 5B is a graph showing B vs. radial distance for the core geometry of FIG. 5A.

FIG. 5C is a schematic illustration of a ferrite core geometry with a top disc of a thickness three times greater than in FIG. 5A.

FIG. 5D is a graph showing B vs. radial distance for the core geometry of FIG. 5C.

FIG. 6A is a schematic illustration of a ferrite core geometry with a top disc of a having a vertical displacement.

FIG. 6B is a graph showing B vs. radial distance for the core geometry of FIG. 6A.

FIG. 6C is a schematic illustration of a ferrite core geometry with a top disc of greater vertical displacement than in FIG. 6A.

FIG. 6D is a graph showing B vs. radial distance for the core geometry of FIG. 6C.

FIG. 6G is a schematic illustration of a ferrite core geometry with a top disc of greater displacement than in FIG. 6C but less than that of FIG. 6E.

FIG. 6H is a graph showing B vs. radial distance for the core geometry of FIG. 6G.

FIG. 7A is a schematic illustration of the ferrite core geometry of FIG. 6H vertically scaled.

FIG. 7B is a graph showing B vs. radial distance for the core geometry of FIG. 7A.

FIG. 8A is a schematic illustration of a ferrite core geometry with the side walls fully removed.

FIG. 8B is a graph showing B vs. radial distance for the core geometry of FIG. 8A.

FIG. 8C is a schematic illustration of a ferrite core geometry with opposed side walls.

FIG. 8D is a graph showing B vs. radial distance for the core geometry of FIG. 8C.

FIG. 8E is a schematic illustration of a ferrite core geometry with side walls of greater height than in FIG. 8C.

FIG. 8F is a graph showing B vs. radial distance for the core geometry of FIG. 8E.

FIG. 9A is a schematic illustration of a ferrite core geometry with a bottom thickness approximately twice that of conventional thickness.

FIG. 9B is a graph showing B vs. radial distance for the core geometry of FIG. 9A.

FIG. 9E is a schematic illustration of a ferrite core geometry with a bottom thickness three times that of FIG. 9A.

FIG. 9F is graph showing B vs. radial distance for the core geometry of FIG. 9E.

FIG. 10A is a schematic illustration of a ferrite core geometry with a bottom thickness of that in FIG. 9A and no top disc.

FIG. 10B is a graph showing B vs. radial distance for the core geometry of FIG. 10A.

FIG. 10C is a schematic illustration of a ferrite core geometry with a bottom thickness of that in FIG. 9C and no top disc.

FIG. 10D is a graph showing B vs. radial distance for the core geometry of FIG. 10C.

FIG. 11A is a schematic illustration of a ferrite core geometry with a top disc and no side wall.

FIG. 11B is a graph showing B. vs. radial distance for the core geometry of FIG. 11A.

FIG. 12A is a schematic illustration of a modification of the ferrite core geometry FIG. 11A to provide a raised top disc.

FIG. 12B is a graph showing B vs. radial distance for the core geometry of FIG. 12A.

FIG. 13A is a schematic illustration of a ferrite core geometry with a top disc and minimal lower side wall.

FIG. 13B is a graph showing B vs. radial distance for the core geometry of FIG. 13A.

DETAILED DESCRIPTION OF THE PREFERRED EMBODIMENTS

Figure 1:
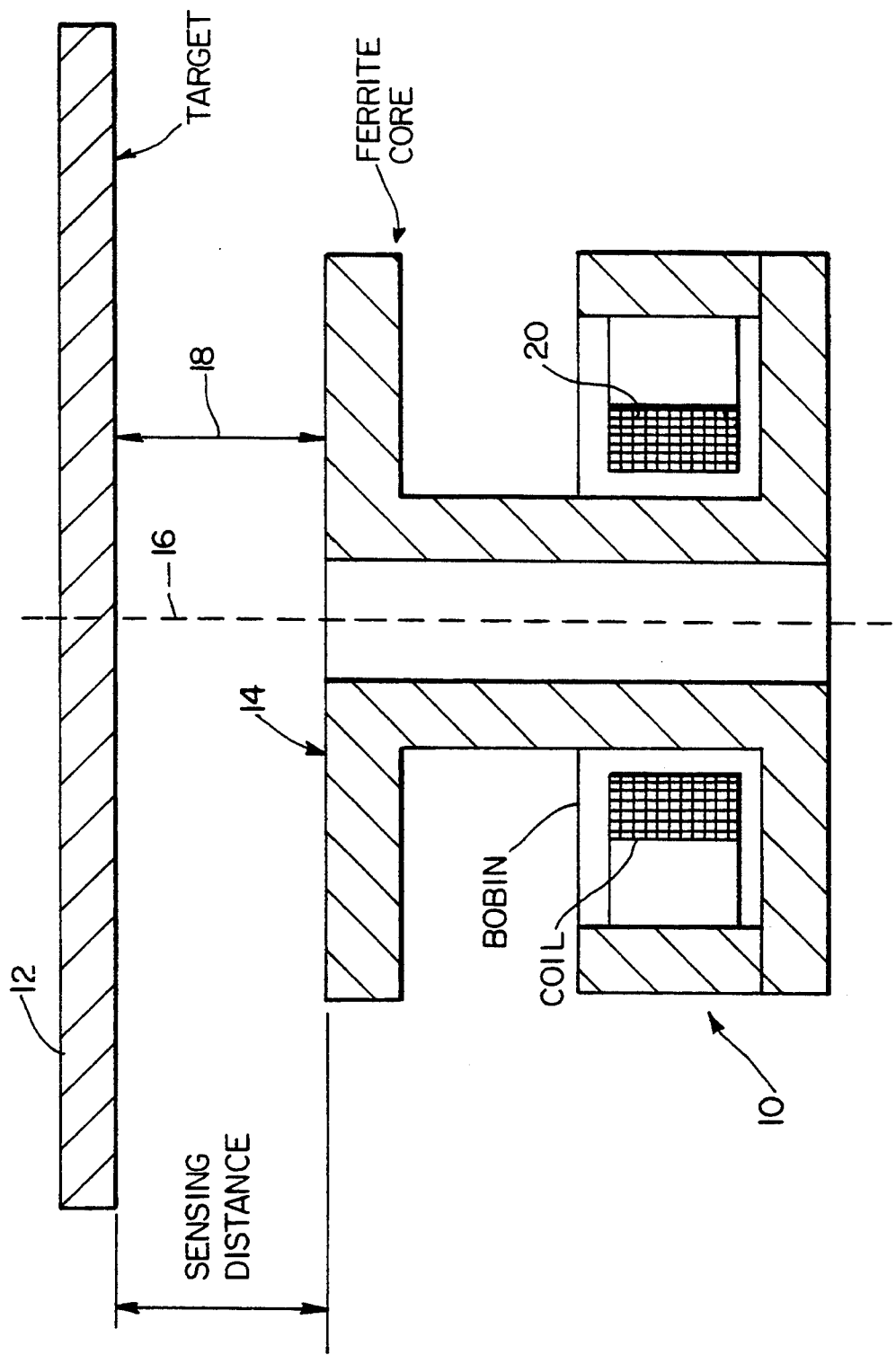
FIG. 1 is a schematic illustration of an ECKO proximity sensor with target.
Figure 3A:
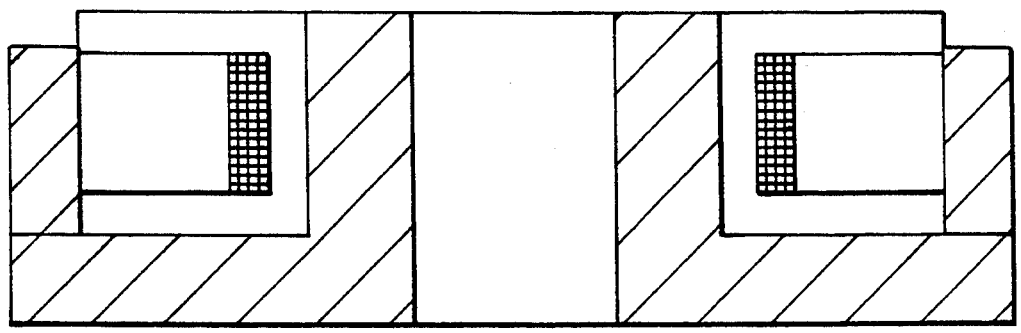
FIG. 3A is a schematic illustration of a ferrite core geometry with an outer wall of full height.
Figure 3B:
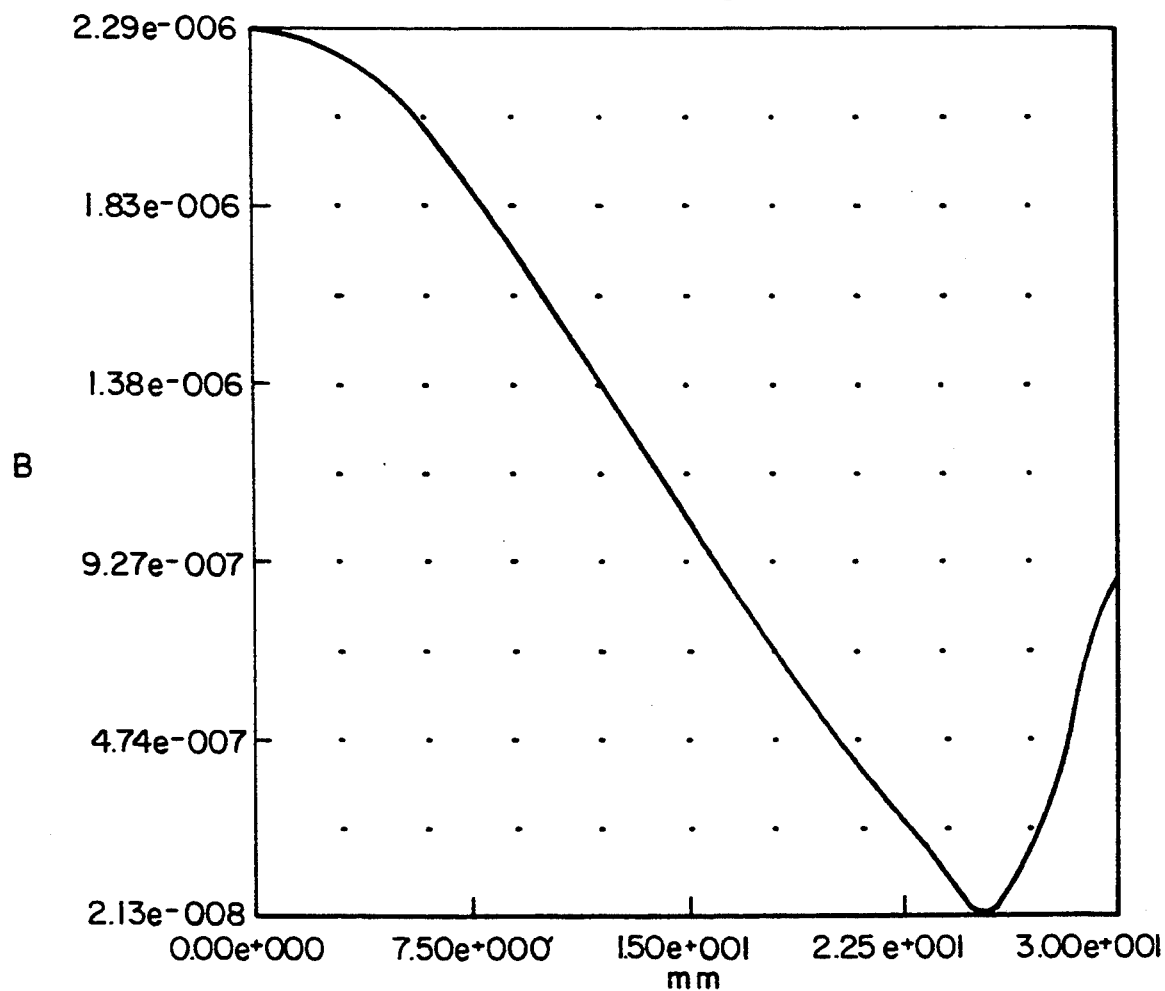
FIG. 3B is a graph showing B vs. radial lower than in FIG. 3A.
Figure 4E:
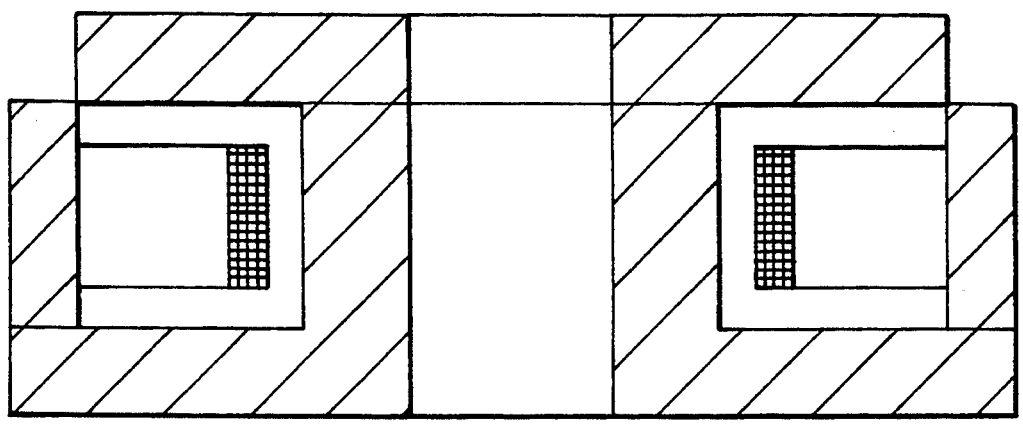
FIG. 4E is a schematic illustration of a ferrite core geometry with a top disc with a larger radius than in FIG. 4C.
Figure 4F:
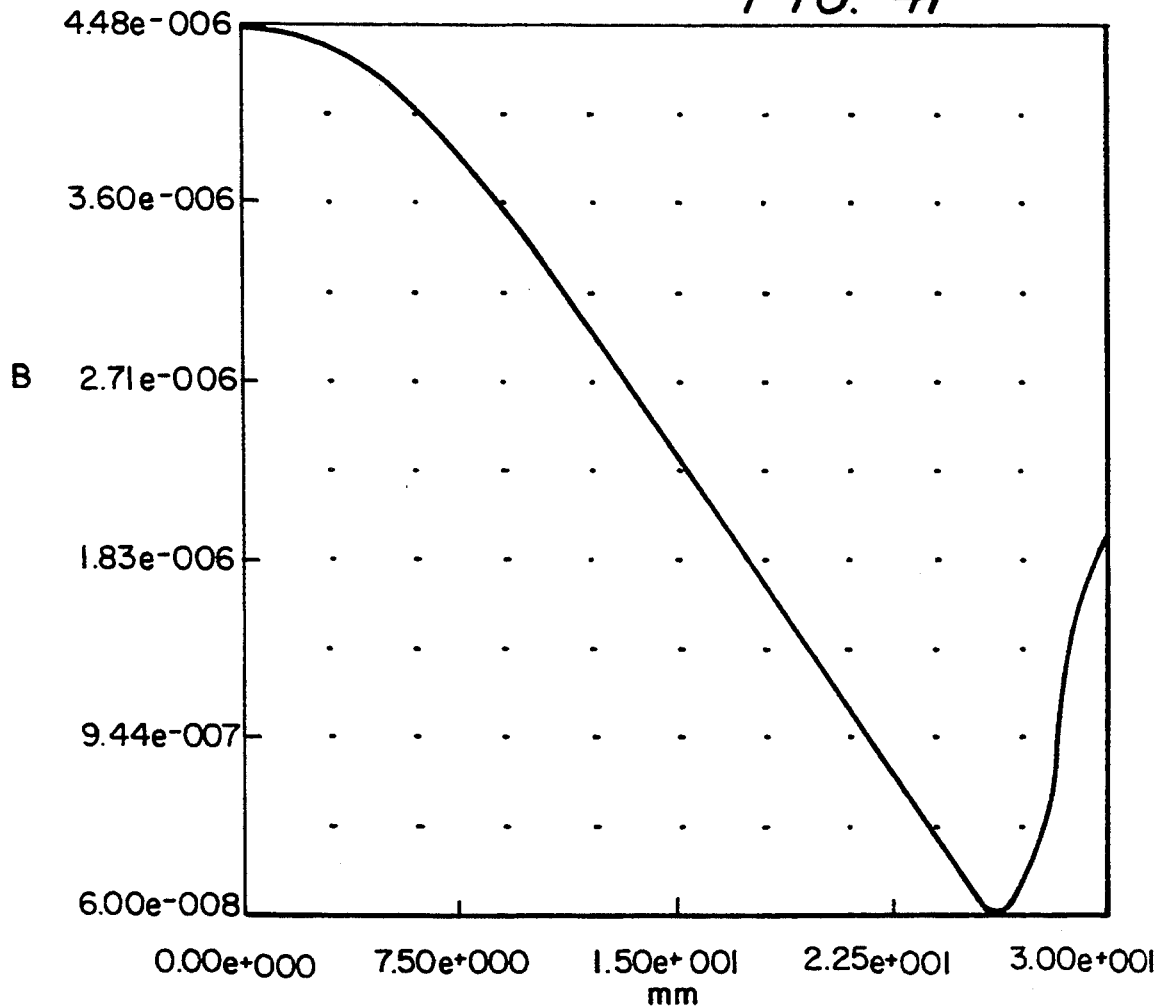
FIG. 4F is a graph showing B vs. radial distance for the core geometry of FIG. 4E.
Figure 4G:
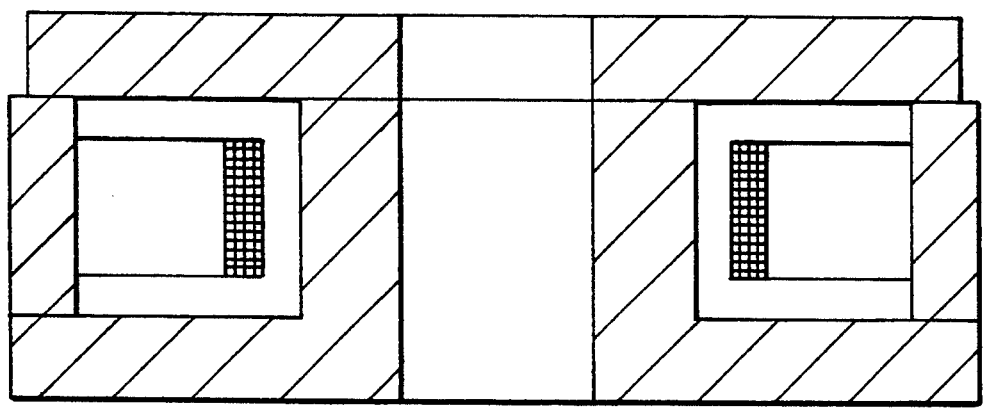
FIG. 4G is a schematic illustration of a ferrite core geometry with a top disc having a radius almost equal to the radius of the base of the ferrite core.
Figure 4H:
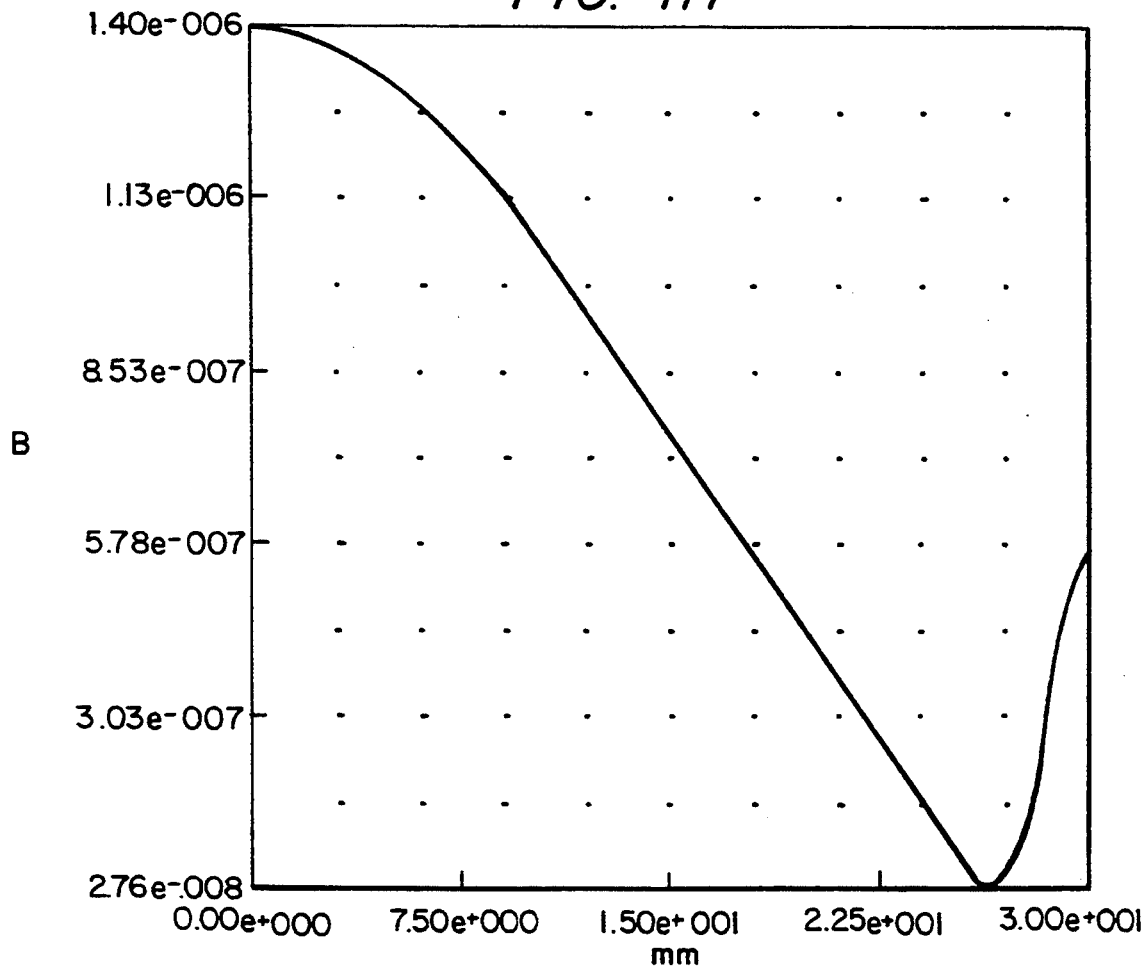
FIG. 4H is a graph showing B vs. radial distance for the core geometry of FIG. 4G.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

The present invention relates to a new class of ferrite core geometries for inductive proximity sensors. These new geometries exhibit increased sensing range. The proximity sensors in which the new ferrite core geometries will be used are employed widely in manufacturing industries such as automobile, machinery, and food and beverage.

Before discussing specific ferrite core geometries, a discussion is presented of the relevant electromagnetic theory important to the sensing operation. From this is obtained the pertinent quantities instrumental in judging the performance of different coil/core geometries. These quantities are then sought for different geometries to facilitate comparison with one another.

An oscillator resonates at the natural frequency of a parallel LC circuit. This serves as a frequency source feeding the windings of the sensor, which doubles as the inductor in the aforementioned parallel LC circuit. This alternating current flowing in the windings of the inductor results in a magnetic field in the neighborhood of the sensor which is oscillating at the same frequency. If an electrical conductor is placed well inside this alternating magnetic field, the level of the oscillating current in the sensor is reduced due to the generation of induced currents in the conductor. These generated eddy currents are responsible for the apparent reduction of the oscillator level, or the "loading" of the oscillator. This reduction in level is detected by electronic circuitry and the presence of the target is registered.

Current-carrying conductors produce characteristic magnetic-field patterns. That for a solenoid is one of the better-known ones. Even though the core geometries of the present invention are not strictly solenoidal, the electromagnetic theory will be discussed in the context of solenoidal geometries. This is because there is still sufficient similarity between the two geometries; in addition, the results derived for a solenoid are sufficiently general to be used in this context as well.

Certain useful quantities will now be addressed. Magnetic-field intensity, H, is given by $$H = nI \quad (A/m) \tag{1}$$

where n is the number of turns per unit length and I is the current flowing. In Equation (1) above, H is used to represent the magnitude of the vector quantity H. This M-field is related to the magnetic flux density, B, by the constitutive relation $$B = \mu H \quad (T) \tag{2}$$

In Teslas and $\mu$ the magnetic permeability of the region in question. For a solenoid of length $l$ and N turns, n may be defined (in conjunction with Equation (1) above) as:

$$n = N/l \tag{3}$$

Then by combining Equations (1) through (3), the expression $$B = \mu n I / l \quad (T) \tag{4}$$

is obtained. The total magnetic flux intercepted by a surface perpendicular to the flux lines is given, generally, by $$\Phi = \int\!\!\!\int_{surf} B \cdot dS \quad (Wb) \tag{5}$$

With primary interest in only the axial component of B, this component is represented simply by B then the integral in Equation (5) above simplifies BS, where S(m²) is the total area intercepting the flux perpendicularly. The error associated with ignoring the radial component of B is not significant, especially since interest lies at a relatively distant location on the sensor's axis. At any rate, at any location on the sensor's axis, the axial component of B almost completely dominates in representing B.

The self-inductance L, is defined as the ratio of the flux linkage $\lambda$, to the current producing it. In this case, the current in question flows through the solenoid (previously designated I) and the entire flux $\Phi$ links the solenoid N times. Therefore $$\lambda = N\Phi \quad (Wb-t) \tag{6}$$

and Equation (6), in conjunction with Equations (4) and (5), is alternatively expressed as $$\lambda = \mu N^2 I S / l \quad (Wb-t) \tag{7}$$

The self-inductance is then obtained from $$L = \lambda/I \quad (H) \tag{8a}$$

$$L = \mu N^2 S / l \quad (H) \tag{8b}$$

Inductance may alternatively be calculated from energystorage concepts. The instantaneous energy stored in the magnetic field of an inductor, L, supporting I amperes of current is given by $$E = \tfrac{1}{2} L I^2 \quad (J) \tag{9a}$$

and also by $$E = \tfrac{1}{2} \int_{vol} dV B \cdot H \quad (J) \tag{9b}$$

The volume over which the integration is performed is the entire volume surrounding the inductor in which its B and H fields have presence. Equating Equations (9a) and (9b) yields $$L = \frac{1}{I^2} \int_{vol} dV B \cdot H \tag{10}$$

It is advantageous to introduce, at this point, the quantity known as reluctance, $\mathfrak{R}$. This quantity, which may be thought of as the magnetic equivalent of electrical resistance, is defined such that $$L = N^2 / \mathfrak{R} \quad (H) \tag{11}$$

Comparing Equation (10) with Equation (8b) immediately makes it clear that $$\mathfrak{R} = l/\mu S \quad (H^{-1}). \tag{12}$$

Thus reluctance is inversely proportional to selfinductance, and therefore low reluctance (short magnetic path, large area and high relative permeability $\mu_r = \mu/\mu_o$) favors high inductance. For simple geometries such as a solenoid with some sort of magnetic core, it is obvious that the inductance is directly proportional to the relative permeability of the core. However, for less simplistic shapes this is not generally true; the reluctance becomes a much stronger function of geometry and depends less on $\mu_r$. Also worth mentioning is the fact that as the relative permeability is increased past a certain value, the flux linkage tends to a maximum, i.e., the inductance does not increase any further. Thus for example, a solenoid with a core of $\mu_r$ equal to 1000 may possibly have the same inductance as one with a core of $\mu_r$ equal to 500. It must however be emphasized that these results are necessarily approximate since they apply exactly only for an infinitely long solenoid (or one for which the length is much greater than the diameter). Nevertheless the results are still useful, instructive and a good estimate.

If an electrical conductor (a target) is placed within reach of the magnetic field of the solenoid it will intercept a portion of the B-field. If this field is produced by alternating current excitation, then secondary currents (eddy currents) will be induced in the conductor. This is in accordance with Faraday's law of induction coupled with Lenz's law, and is expressed mathematically by Maxwell's curl E equation:

$$\nabla \times E = -\delta B / \delta t. \tag{13a}$$

or for harmonic excitation and employing phaser notation, $$\nabla \times E = -j\omega B. \tag{13b}$$

From Equations (13) it is clear that the eddy currents generated within the target are 90° (temporally) out of phase with the source current. These eddy currents in turn do two things; they dissipate energy as heat within the conductor and themselves generate a magnetic field. The eddy current density J within the target is related to the electric filed strength E (Equations (13) above) by, $$J = \sigma E \ (A/m^2) \tag{14}$$

where $\sigma$ is the electrical conductivity of the conductor in S/m. Equation (14) is actually Ohm's law for electromagnetic field theory. The total power dissipated within the conductor as heat is given by $$P_{eddy} = 1/2 \int \int_{vol} \int dV J \cdot J^* 1/\sigma, \ (W) \tag{15}$$

where the symbol * represents the complex conjugate operation and the volume in question is that of the target.

It can be seen by studying Equations (13) through (15) that the eddy current power loss is proportional to the square of the magnetic flux density at the target location, and thus to the total flux intercepted (granted that the target area and its proximity to the sensor are kept invariant). The same square law relationship exists between the eddy power loss and the operating frequency, i.e, $P_{eddy} \alpha f^2$.

The magnetic field generated by the eddy currents within the target opposes the source field in the following manner; the eddy-current-produced magnetic field induces further currents back in the source windings, the mechanism of which is again governed by Equations (13). Thus there appear within the windings, tertiary currents which are 180° temporally out of phase with (i.e., directly opposing) the source current. This is the result obtained by applying Equations (13) twice; the curl operator on the left-hand side (LHS) is simply a combination of directional (spatial) derivatives with no significant bearing on the results in which we have interest, at least under this discussion. It is these tertiary currents that are directly responsible for the apparent increase in resistance of the source winding when a target is placed close to the sensor. It is now possible to visualize the increase in resistance; it is manifest as a decrease in current or alternatively, a decrease in the sensor's terminal voltage. It is clear, from Ohm's law, that either of the latter two phenomena is equivalent to an increase in resistance (with the correct factor held constant).

It now remains to make the appropriate connection to sensing distance. In order for the sensor to register the presence of a target certain factors must be considered. First, eddy currents must be generated within the target. The quantities that favor this are:

i) A strong B field at the target location. The eddy current density within the target is directly proportional to the magnitude of B at the target location (Equations (13) and (14)). The strength of B anywhere in the magnetic path is inversely proportional to the reluctance of the entire magnetic circuit, i.e., the sensor, the target and the medium between them.

ii) Low reluctance $\mathfrak{R}$. The factors associated with low reluctance have previously been mentioned in conjunction with Equation (12) and are briefly reiterated here; a large area presented to the magnetic flux, short magnetic path and high permeability in as much of the circuit as possible (with a keen eye on the lookout to avoid magnetic short circuits). Very rarely is any one of these three factors by itself capable of effecting marked differences; a synergistic combination of all three is usually required to achieve low reluctance. It should be clear from what has just been mentioned that a magnetic target will lead to lower total reluctance than a non-magnetic one. By token of this, therefore, eddy current levels will be increased by way of higher levels of magnetic flux density within the target (both being metals, of course). Also quite obviously, increasing the proximity of the target to the sensor will have precisely the same effect; there is no place for this in the ensuing endeavor, however, since it is meaningless in striving for increased sensing distance. A good understanding of the nature of magnetic reluctance is invaluable in executing judgment of this nature. The salient point here, though, is that at a particular frequency and for a particular target the eddy current levels in the target are directly proportional to the magnitude, and depend on the distribution of B at the target location. We therefore have as an intermediate step $$J_{eddy} \alpha \int_{surf} dS \ B \ (A/m^2), \tag{16}$$

where the integration is being done over the surface of the target; again, this surface area is assumed invariant.

The eddy currents above are responsible for the tertiary currents in the source winding which are responsible for the "loading" of the sensor as mentioned before. These tertiary currents are produced by a mechanism precisely identical to that just described above, therefore the same dependencies (and hence identical equations) hold. It is understood that the proximity of the target from the sensor is fixed (this is of paramount importance and cannot be over emphasized), then $$J_t \alpha \left( \int_{surf} dS \ B \right)^{\frac{1}{2}} \tag{17}$$

with $J_t$ representing the tertiary currents responsible for the loading. The square root follows from the two-way transit involved with the fixed distance. It is important to realize that B above (Equations (16) and (17)) is that produced at the target position by the source currents I in the sensor. I and the current represented by $J_t$ are mutually opposing (180° out of phase) by two successive applications of Equations (13).

The practice of evaluating sensing distances is based on the experimental generation of a curve which reflects resistance increases versus target proximity (properly known as Q versus distance curve; Q, quality factor, is briefly discussed later). This curve, while not globally linear, may be approximated as a piecewise linear one. In what follows, the assumption is made that excursions along this curve are sufficiently conservative to ratify the piecewise-linear approximation; in other words, an approximately linear portion of the curve. In actuality the amount of stringency attached to this approximation is variable, depending on the extent of linearity of the Q versus sensing distance curve; the more linear the curve is the greater the permissible exclusion over which linearity is valid. Obviously the need for this approximation would be obviated by a globally linear Q versus sensing distance curve. Nevertheless this approximation permits sufficiently small changes in equivalent resistance of the sensor winding to be linearly related to changes in target proximity. By reason of previously rendered arguments then, the sensing distance is proportional to $J_t$.

$$D_s \alpha \left( \int_{surf} dS\, B \right)^{\frac{1}{2}} \quad (18)$$

where $D_s$ is the sensing distance. Again, it must be stressed that Equation (18) has buried in it the assumption that the target is at a fixed location. Referring back to Equation (15), we note that $$J_{eddy} J^*_{eddy} = |J_{eddy}|^2, \quad (19)$$

and therefore that $$P_{eddy} \alpha J_{eddy}^2. \quad (20)$$

In view of Equations (20) and (16), we see that $$\int_{surf} dS\, B \alpha\, (P_{eddy})^{\frac{1}{2}} \quad (21)$$

and therefore that $$D_s \alpha (P_{eddy})^{\frac{1}{4}} \quad (22)$$

It remains to make a further simplification concerning the integral of B over the surface of the conductor. Along the axis of the sensor the total B field magnitude is dominated by its axial component. If the radial variation of B at the target location is identical for any two sensors then the integrals of B over the target area in the equations above may simply be replaced by either the on-axis total B magnitude ($B_o$), or the on-axis axial B magnitude, i.e., $$D_s \alpha < B_o. \quad (23)$$

This is equivalent to saying that the ratio of total magnetic flux is then almost equal to the ratio of magnetic flux density at a particular radial displacement at the target location; this displacement is being chosen to be zero, i.e., the axis of the sensor.

Thus the sensing distance $D_s$ has been shown to be proportional to either the fourth root of the target eddy current power loss or the square root of the magnitude of the on-axis magnetic flux density, both of these at a fixed distance from the sensor face. It should be clarified that Equation (18) together with Equation (22) are the preferred expressions to use in comparing sensing distances since they are more accurate. However, Equation (23) is acceptably reasonable under the conditions just mentioned.

There is an important point that needs to be made in connection with the foregoing development and the interpretation of Equations (22) and (23). It might appear at first sight that merely increasing the source current would return an increase in sensing distance since both $B_o$ and $P_{eddy}$ would increase. This is true, they would both increase, together with $J_t$. However, this would be offset by $J_t$ having to be of a correspondingly greater magnitude to reduce the total current level in the sensor winding to the point at which a detection is made. This explanation is based on the premise (mentioned earlier) that the increase in resistance is actually the manifestation of reduced current in the sensor. This occurs because the current represented by $J_t$ adds to the source current in the sensor. This occurs before the current represented by $J_t$ adds to the source current but at 180° out of phase with it. Thus there is no net realizable increase in sensing distance by doing this. Alternatively put, target detection by the signal-processing-electronics is made by determining when the equivalent resistance of the sensor coil has been driven up to an absolute value, therefore increasing the source current simply necessitates a larger value of $J_t$ to drive down the total current in the sensor winding to the detection threshold.

It is now desirable to discuss the factors that will lead to increased target detection in light of the theory presented. Larger on-axis B-field magnitude at the sensor location and slow decay along the radial component are the most important factors. Further discussion is in order.

i) A larger target area to intercept more magnetic flux. The effect of this is to increase the term on the RHS of Equation (18). This is however only important if the target area is small compared to the cross-sectional area of the sensor. While this condition holds (i.e., relatively small target) a quick glance at Equation (18) will reveal that the sensing distance would increase in proportion to the square root of the target area, or equivalently for a circular target (as is used in the simulation), the sensing distance would increase in proportion to the fourth root of the radius of the target. Once the target area attains a certain size (perhaps of diameter of the order of a few times that of the sensor's), there is no additional benefit to be derived since the majority of the flux Φ has been intercepted. The reason for this is that for the sort of geometries under study, B decays rather rapidly along the radial coordinate from its maximum on the sensor's axis. Perhaps more significant is the fact that the target used for evaluating sensing distance is of a standard size.

ii) The presence of higher values of B is encourages by low reluctance. This explains why magnetic targets can be detected at greater distances—they reduce the reluctance of the magnetic circuit and this causes the value of B at the target location (as well as at other locations in the magnetic path) to increase with concomitant increases in the generated eddy current density within the target. Since the areas around the sensor are part of the magnetic path a reduction in reluctance may be achieved by judiciously increasing the quantity of ferrite around the sensor. This is not supposed to be as simple as it sounds since other factors may more than negate the effects of increased ferrite; the obvious one being the formation of magnetic short circuits as far as directing B ahead of the sensor is concerned. Incidentally, adding more ferrite is usually accompanied by an increase in inductance (see Equation (11)). Low reluctance is also favored by high values of $\mu_r$ in the magnetic path, however, the incremental reductions in $\Re$ become negligible once $\mu_r$, for the ferrite exceeds a few hundred. The explanation for this is identical to that furnished to explain why inductance is not continuously proportional to magnetic permeability despite Equation (10b). Thus, indeed, reluctance is inversely proportional to magnetic permeability but in a terminal fashion.

iii) The area over which the B-field is radiated is proportional to the cross-sectional area of the sensor face. If it were possible to court this line of action, a true solenoid geometry would be expected to exhibit sensing distances that increased approximately in proportion, again, to the square root of the sensor's cross-sectional area or to the fourth root of its diameter. It is much more difficult to make any such prediction for geometries resembling the sort under simulation here due to their rather complex cross-section. However, as mentioned earlier, increasing the diameter of the sensor is not an acceptable option.

iv) Brief discussion on frequency of operation is of interest. As stated before, the eddy current power loss is proportional to the square of the eddy current density J within the target (Equation 20)). J in turn is proportional to E (Equation (14)) which, for harmonic excitation, is directly proportional to frequency by Equation (13b). Hence by combination, the eddy current power loss is proportional to the square of the operating frequency. But despite the fact that we are able to increase the eddy current power loss by simply increasing the operating frequency we have not really gained anything since this action has absolutely no return effect on the source coil that aids sensing ability. The only effect of raising the frequency is additional heat dissipation in both the target and the source coil; while this may sound encouraging in the target it is of absolutely no help in the source coil where things ultimately matter. Practically, of course, there will always be negative returns associated with operating at a frequency which is not sufficiently high (or which is too high), but these concerns are relevant only from a materials standpoint.

Before terminating this discussion one last important quantity needs to be addressed. Reference has previously been made to quality factor, Q, which is a well-used quantity in discussions concerning these matters. Q is defined in accordance with Equation (24);

$$Q = \frac{2\pi \times \text{maximum instantaneous energy stored}}{\text{energy dissipated per cycle}} \quad (24)$$

In the case of an inductor modeled with a series of resistor $R_s$ the current I (this is the peak value of a sinusoidally varying current) is common to both elements. The only energy-storage component here is the inductor, therefore the numerator of Equation (24) becomes $2\pi \times (\frac{1}{2})LI^2$ while the 10 numerator, account of the series resistor only, assumes the expression $(I^2R_s)/(2f)$. On division, the simplified expression $$Q = 2\pi fL/R_s \quad (25)$$

is obtained (with 72 representing the frequency). Obviously then, the Q may also be increased by lowering the value of (as well as by increasing the inductance). More will be said on quality factor later.

This concludes the discussion on the relevant theory for the development of an evaluation and comparison basis for sensor. The aim of this section of the specification was to examine those quantities which theoretically affect sensing distance. The theory discussed in this section facilitates the analysis and design of different ferrite geometries for sensors.

From the foregoing discussion of theory, the following points are important in designing core geometries:

i) High Q is desirable. This is equivalent to high inductance. It should be borne in mind that in almost all cases the ferrite core is the only thing being altered, therefore increased inductance is the only way to theoretically increase Q.

ii) High values of B are needed. It is necessary also for as much as possible of this B to be directed ahead of the sensor and to decay slowly in the radial direction. This is the most important factor.

iii) It is important to remember that increasing the source current to increase B does not increase sensing distance (see discussion following Equation 23). Therefore the only other practical choice is to aim for low reluctance while trying to satisfy, simultaneously, point (ii) above.

iv) In view of (iii) above it must be understood that, by far, most of the reluctance associated with the entire magnetic circuit is provided by the air between the sensor and the target. If it is recalled that the target location is fixed with respect to the sensor's face, the difficulty entailed in trying to reduce the overall reluctance should be reasonably tangible.

v) It also follows from point (iii) above that, quite often, high inductance (or high Q) will lead towards high values of B.

Micro Switch, a division of Honeywell, Freeport, Illinois, manufactures a wide variety of inductive proximity sensors that differ chiefly in size and somewhat in geometry depending on intended use. For a particular size of sensor there is the further division into "shielded" and "unshielded" geometries, respectively. This differentiation is based on whether or not the sensor is capable of detecting targets approaching it sideways. This is in addition to its more usual ability to detect such targets as they approach it headon. The "unshielded" variety are capable of both modes of detection while the "shielded" type will only respond to the head-on approach. The aforementioned "target" is some manner of either magnetic or non-magnetic material; however, in standardizing procedures it takes the form of a 2-inch square, 40-mils thick piece of iron (magnetic).

Initially, ferrite core geometries were designed around the 30 mm type shielded sensor since it is representative of the shape most commonly employed for all sizes of sensor. This is the shape whose cross-section is shown in FIG. 2. In a preferred embodiment, the inventive cores are capable of being housed in the casing for a 30 mm sample, i.e., it should be at least exactly the same diameter. This enabled the extraction of a ratio, the Sensing Distance Factor (SDF), from the finite element models that would directly indicate core-geometry sensing distance "gain" compared to an arbitrarily assigned value of 1.00 for the reference port core half of FIG. 2A.

With reference to FIG. 1, in magnetic simulation, the following conditions are held constant unless otherwise indicated:

a) The target 12 takes the form of a circular disc, 60 mm in diameter and 1 mm in thickness. Its relative permeability $\mu_r$, is held at 700 and its conductivity $\sigma$ at $2 \times 10^7$ S/m.

b) The target is placed parallel to the face 14 of the sensor 10 and centered on its axis 16. The separation 18 is set at 30 mm.

c) The real relative permeability for the ferrite is specified at 1200; the imaginary part $\mu_T''$ is set equal to 0.

d) The number of turns of copper wire in the coil 20 on the former is kept at 60.

e) The current through the windings is maintained at 15 mA. This current level was actually measured with one of the entire proximity sensors (coil/core assembly plus electronics—HoneFell ECKO IV modified). It is of no consequence however, since the results are independent of the current level used as long as it is kept constant from design to design. In other words, linearity is being assumed to hold all saturable materials (the ferrite and iron). This is justifiable in even a practical sensor since the maximum value of H (at 15 mA) produced by the coil is a mere 100 A/m, significantly less than the saturation point for the ferrite material being used. Furthermore, a generator and pickup coil arrangement was used to investigate and verify linearity (constant $\mu$) up to at least 300 A/m.

f) As stated before, the maximum diameter of the sensor is unalterable from design to design.

The simulations proceed from here. The simulations were carried out using a numerical electromagnetics solver software package called Maxwell ™ from AN-SOFT Corporation. To begin with, a reference had to be set. This was chosen to be the standard 30 mm type shielded core shown in FIG. 2A. All successive shapes were compared to this reference. For each one, the following quantities were obtained;

1) the total inductance, L (Equation 10),
2) the power dissipated in the target by eddy currents, $P_{eddy}$ (Equation 15)
3) a plot of the magnitude and distribution of the total B-field at the target location (i.e., at its surface) (FIG. 2B).

It should be mentioned that for almost every case, even though not included, the Q of the sensor is directly related to its inductance by Equation (25). These simulation runs are the cases for which the coil is exactly the same in terms of number of turns, total length and orientation. The implication here is that the Q of the sensor is altered strictly for the ferrite geometry alone. Therefore, if at a particular frequency, the Q for a particular coil in any of the ferrite geometries is known, then the same coil inserted into any of the displayed geometries will exhibit a Q given by the known value, scaled by the ratio of the respective inductances.

All the simulations were run at a frequency of 1 Hz. There were several reasons why such a low frequency had to be resorted to. These were chiefly concerned with software accuracy and limitations in computer memory. However, after the reference simulation had been run, this difficulty vanished since the concern then was not with absolute values but with ratios. The reference may be assigned a nominal sensing distance of 10 mm. This then permits an immediate prediction of the sensing distance of a design from either 2) or 3) above. This is done by multiplying the fourth root of the ratio of its $P_{eddy}$ to $P_{eddy}$ (reference) by 10 mm. As mentioned earlier, the square root of the ratio of the areas under the B versus axial distance (at a fixed sensing distance) may be used as well. This method of sensing distance determination is a decidedly legitimate practice since in actuality there is no fixed sensing distance for the reference sensor (the sensing distance can be varied about 10 mm by altering the detection threshold). All that this means is that if the reference sensor detects the target at 1.0 mm the new design will detect at a distance given by the ratio above. The absolute equivalent of this in practice is that as the target approaches, the Q of either sensor will drop by precisely the same ratio (compared with its target-at-infinity value) when the target reaches the point designated as the sensing distance by the ratio above. For example, suppose that when the target is 10 mm away the Q of the reference sensor is 0.75 of what it is without the target there. If the simulation predicts a sensing distance of 15 mm for a particular design then it would be expected that during measurement, the Q of this sensor with the target at 15 mm be also precisely 0.75 of what it is with the target removed.

With this discussion completed, then, some of the results of the simulation will be presented and discussed.

The ferrite geometries are represented by their respective cross-sections. Due to the cylindrical symmetry involved, the simulator performs all calculations on an rz plane (in cylindrical coordinates). Therefore only half of what is shown is actually fed into the simulator. For each geometry, the inductance and Sensing Distance Factor (SDF) is given. Also supplied is a B versus radial displacement graph, plotted at the target location (30 mm). The SDF is simply the ratio of the design's sensing distance to that of the references (FIG. 2A), calculated as per the method furnished above, that is, with the fourth root of the ratio of the target eddy current power loss. Calculation of the SDF based on the square root of the ratio of the on-axis B-magnitude has not been documented but it is easily verified to be approximately equal to the documented SDF.

DROPPING THE OUTER WALL

Beginning with the reference geometry, the first endeavor was to investigate the effects of dropping the outer wall. The results are presented in FIGS. 3A through 3H. From these it is obvious that the ability to shield (in the lateral sense) runs counter to the ability to direct more flux in the forward direction. An explanation for this is that the ferrite on the sides causes some of the flux to be radiated out in the radial direction (dictated by the boundary conditions for the B field at the ferrite/air interface). But even though there is a definite trend, the gain in sensing distance is not substantial. It is interesting to note here that even though the reluctance is being steadily increased (decreasing inductance), the sensing distance is increasing. This is one of those situations that appears to depart from theory.

DISC ON SENSOR'S FRONT FACE

Progressing again from the reference, the effect of placing a disk of steadily increasing radius on the sensor's front face was investigated; these results are presented in FIGS. 4A through 4H. The thickness of the disc is equal to that of the ferrite forming the base of the sensor. Boundary conditions for the continuity of the normal component of B (which happens to be the axial component in this case) dictate that the flux lines leave the ferrite directed almost fully axially; this is due to the high permeability of the ferrite. The improvement here is chiefly due to the flux being spread out over successively wider ares. Cursory inspection of the accompanying flux density plots makes this clear. Here the improvements are more pronounced than the runs in the case of dropping the outer wall, up to 55% improvement. The effect of an extremely pronounced magnetic short circuit comes into play when the ferrite disc starts to overlap the outer wall (radii greater than 9.4 mm). The flux then becomes constrained to circulate around the sensor to the detriment of the axial component. Note the identical trend followed by both the inductance and the sensing distance.

THICKNESS OF FERRITE FRONT DISC

Next, the effect of the thickness of the ferrite front disc was investigated for the best case from B above. This logical progression was done for two other thicknesses, one less and the other greater than that shown in B. These cases are documented in FIGS. 5A through 5D. Here also, the results are intuitively satisfying. The advantage, though is in being able to judge sensitivities. The extremely high inductance accompanying sensing distance may be objectionable though, since it may possibly render the device unstable. The reason for this, of course, is the correspondingly high quality factor. Compared with the reference, the Q for this geometry (FIG. 5C) is increased by a factor in excess of 5.

BENEFITS OF SENSING DISTANCE

Figure 6E:
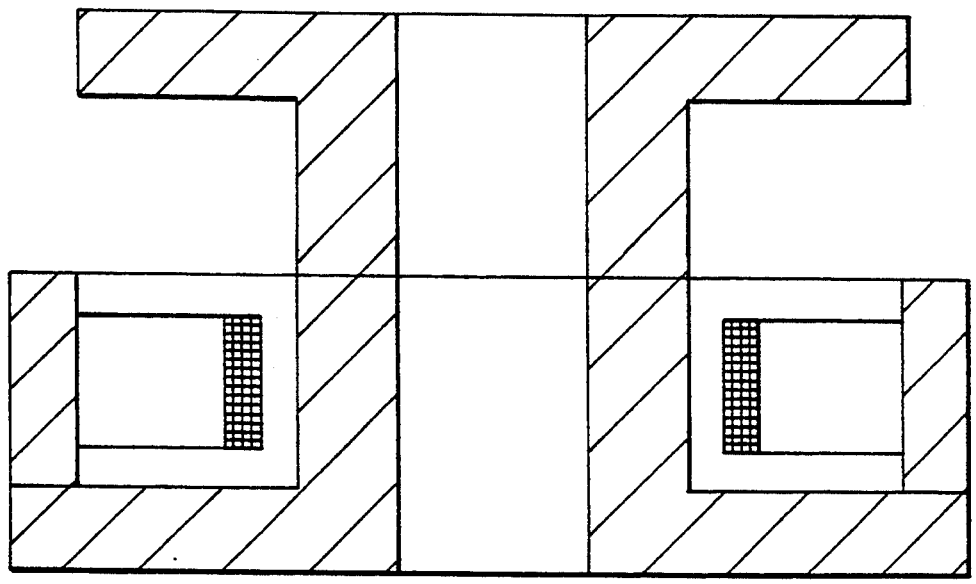
FIG. 6E is a schematic illustration of a ferrite core geometry with a top disc of greater displacement than in FIG. 6C.
Figure 6F:
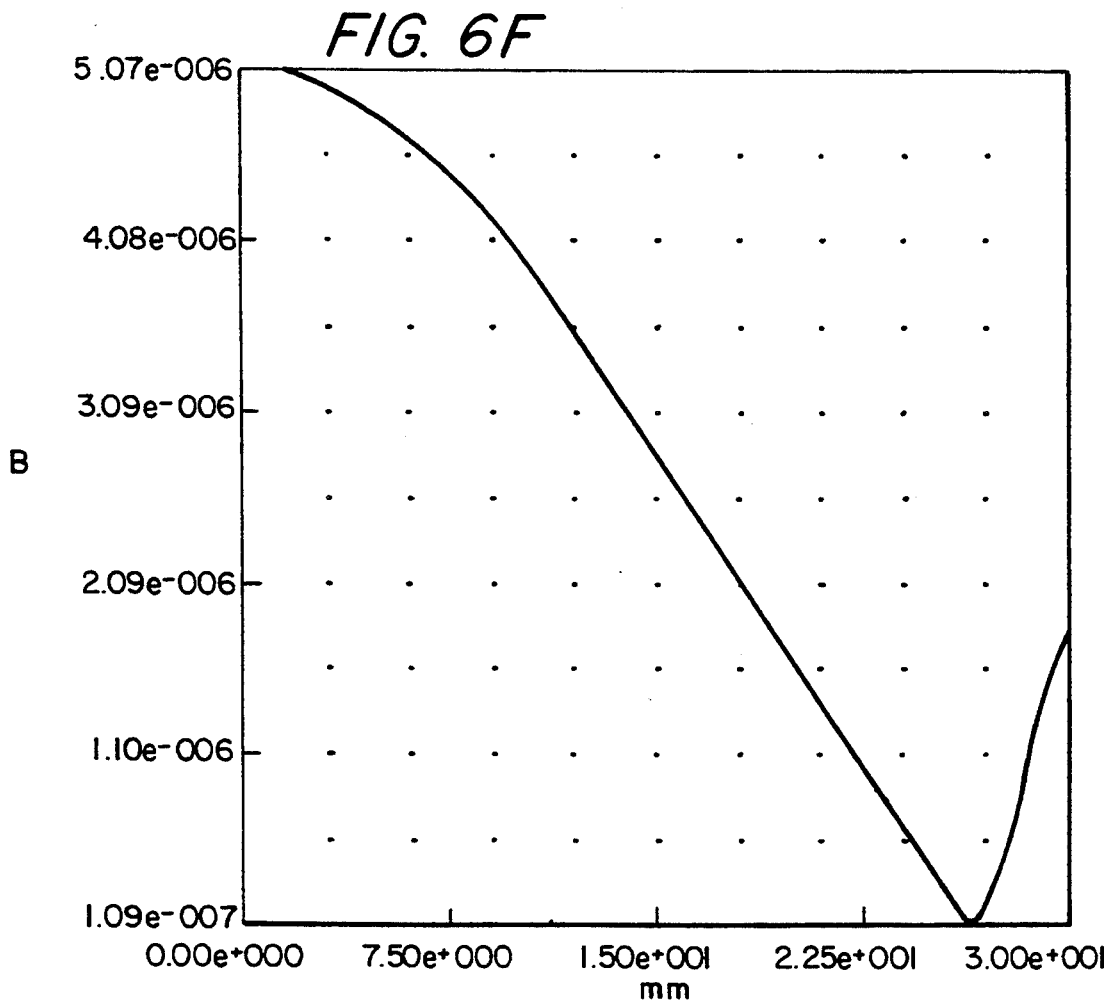
FIG. 6F is a graph showing B vs. radial distance for the core geometry of FIG. 6E.

The next investigation was aimed at providing the benefits in sensing distance associated with the geometries of B but at reduced inductance levels. Logically, an extension of the sensor's height ought to lead towards this (increasing the reluctance). The cases are documented in FIGS. 6A through 6H. Here, all the significant improvement occurs within the first 2 mm after which the performance levels off. However, for additions greater than 2 mm, there is still the expected decrease in inductance. These geometries resemble hybrids of shielded and unshielded cores but would function well as unshielded sensors. Note the very marked reduction in inductance with seemingly modest increases in reluctance. FIG. 6G is a case that has two different changes compared with FIG. 6E; it is the case for which the radius of the top disc has been increased to that of the sensor (unlike FIG. 6A through 6D) with the top disk raised by 3 mm. The improvement in sensing distance attains a figure of about 78% over the reference.

VERTICAL SCALING

The ferrite geometry shown in FIGS. 7A and 7B is a scaled-down version of FIG. 6E. The scaling is only in the vertical dimension and was done to reduce the total height of the geometry of FIG. 6E to precisely that of the reference (approximately 6.7 mm) instead of the 11.6 mm of FIG. 6G. The inductance remains essentially the same and a little over a millimeter in sensing distance is lost (on the basis of a 10 mm reference) compared with the larger geometry. Note however, that even though the number of turns has still been preserved at 60, the physical length of wire being represented by this simulation is greater than that of the coil of the reference sensor. The implication of this that for this particular run, the ratio of the quality factors is not the ratio of the inductances; the former ratio is in fact a bit less than the latter. This is understandable when it is realized that a greater mean radius is obtained by having to compress the same 60 turns into less vertical space.

BI-DIRECTIONAL GEOMETRIES

The geometries in FIGS. 8A through 8F are attempts at studying bidirectional geometries. On account of their symmetry, they possess identical radiation patterns "behind" and "in front of" them. These geometries would be suitable only for use as unshielded sensors. The progression documents the effects of increasing sidewalls, i.e., a progression towards shielded geometries. The trend, although of very minor variation, is nevertheless once again intuitively satisfying. The real usefulness of these symmetrical geometries is their amenity to treatment somewhat reminiscent of reflection in dipole elements in the study of antenna theory. This is the subject of the next discussion.

Figure 9C:
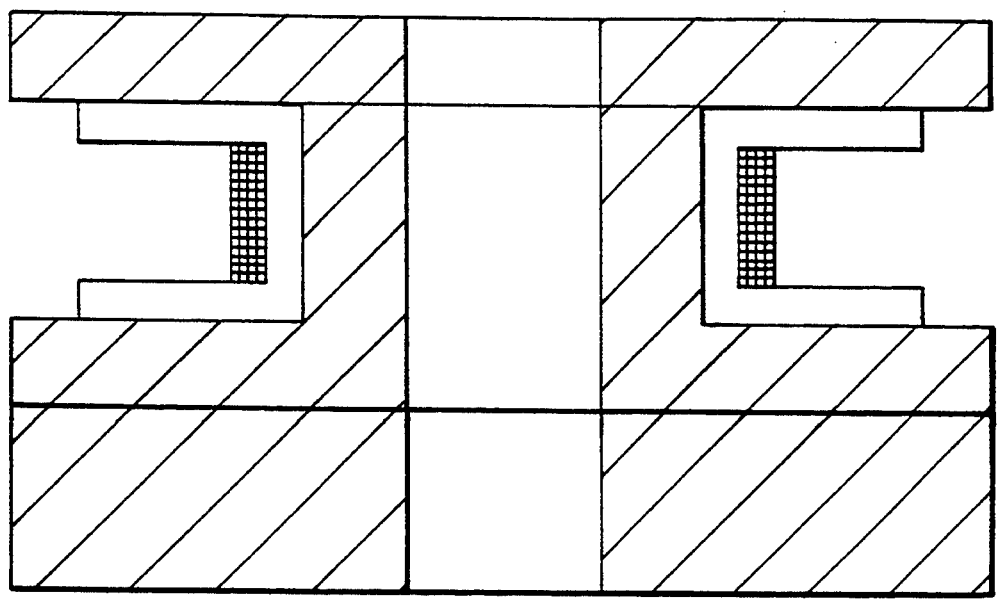
FIG. 9C is a schematic illustration of a ferrite core geometry with a bottom thickness twice that of FIG. 9A.
Figure 9D:
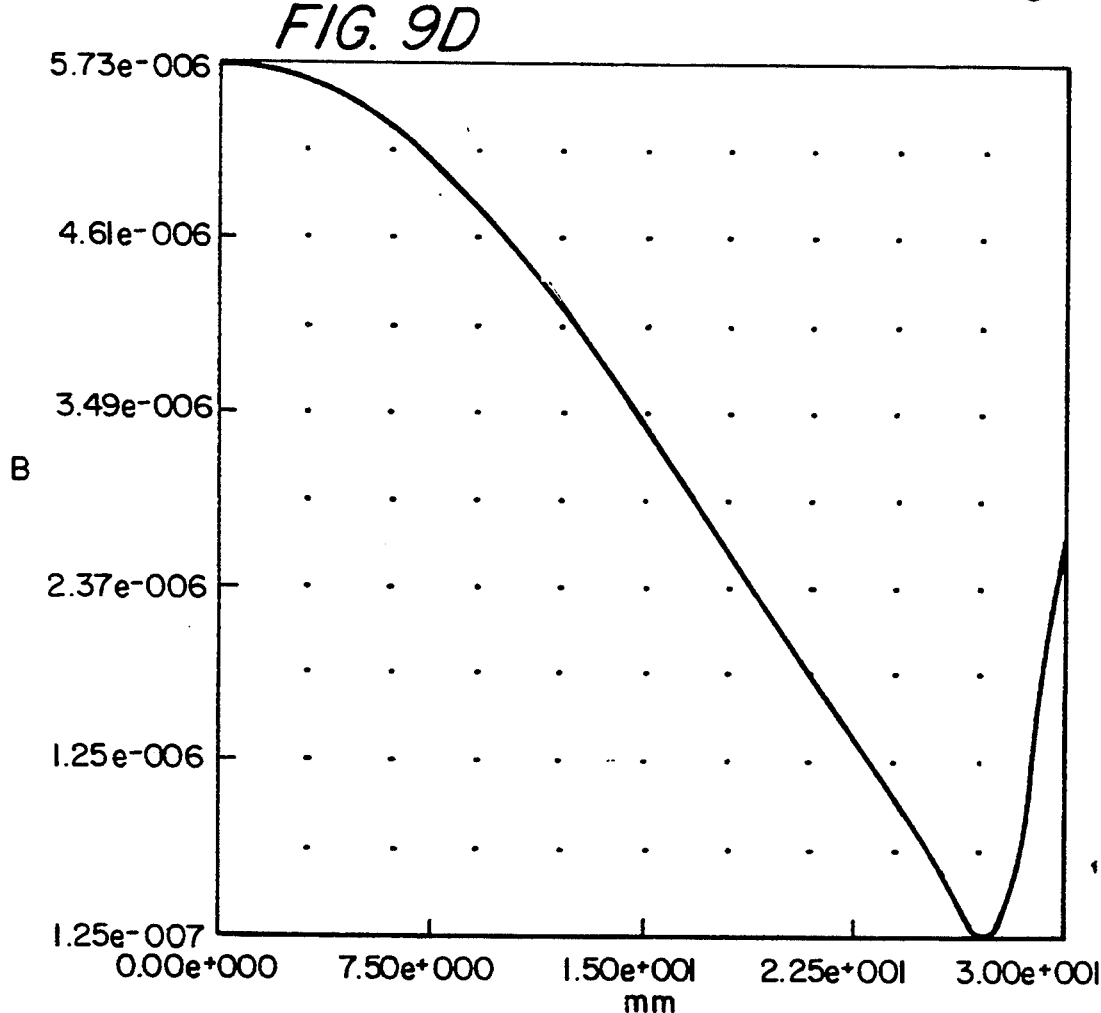
FIG. 9D is a graph showing B vs. radial distance for the core geometry of FIG. 9C.

FIGS. 9A and 9F investigate the implementation of a technique which may be regarded as bearing a lot of resemblance to reflection. Continuing from the best-performing geometry from the efforts of E above, successively less amounts of flux are restricted from radiating in one direction. This is done by steadily increasing the thickness of the ferrite at the "rear" of the sensor. The result of this is to increase the flux radiated in the opposite direction with concomitant improvements in sensing distance.

The effectiveness of this treatment depends entirely on the device being symmetric in the sense depicted by the geometries in FIGS. 8A through 8F. To show the importance of this point, the same treatment was given to the reference geometry, the corresponding results are given in FIGS. 10A through 10D. As can be seen, there is little or no improvement and the reason for this lies in the unidirectional nature of this geometry to begin with.

The effect of filling (with ferrite) the hole in the center of an arbitrarily chosen geometry (that of FIG. 8A) was studied. The diameter of the (now) solid center "leg" was then progressively reduced and its effect on the SDF noted. Filling the hollow in the center with identical-$\mu$ ferrite had absolutely no effect on the sensing distance, the increase in inductance was also insignificant. A plausible reason for this is as follows; the cross-sectional area of the hole in the center is less than thrice that of the surrounding ferrite. The existing ferrite therefore is the chief determinant of the reluctance in this part of the magnetic circuit. Hence the extra ferrite has insignificant bearing on the reluctance, and hence, on the flux radiated from this part of the sensor.

Reducing the diameter of the now solid center "leg" did yield degradation of the sensing distance as expected. The diameter was reduced from the full 9.0 mm, where the SDF is 1.69, down to 4.0 mm with a corresponding SDF of 1.41, i.e., a 17% reduction in SDF for a 56% reduction in diameter. Note that the sensing distance varies almost exactly as the fourth root of the diameter as suggested earlier. As would be expected from theory, the inductance decreased steadily from about 506 $\mu$H (at 9.0 mm diameter) down to about 330 $\mu$H (at 4.0 mm diameter).

The effect of the permeability of the ferrite on the sensing distance was also investigated. This was done, again, for the geometry of 8A. The results showed that the sensing distance suffered by only about 6% by reducing the permeability from 1200 to 150. For the same decrease in permeability, the inductance was lowered by 16%. These results show that the sensing distance is not at all sensitive to the permeability of the ferrite core above values of roughly 150. This value of $\mu$ appears to mark the onset of saturation effects.

From the preceding, it can be seen that if certain factors are held invariant, (total number of windings, excitation current magnitude, target distance and target surface area) then the sensing distance is proportional to either the fourth root of the eddy current power loss within the target, or the square root of the total flux intercepted by the target. The development of the theory has been based on the assumption that for sufficiently small excursions in target proximity, the change in Q of the source coil is directly proportional to the change in target proximity. These results are stated by Equations (18) and (22) respectively. A further approximation to Equation (18) is given by Equation (23).

The theory has been employed in the use of a finite-element-based magnetics software simulator to study, mainly, the effects of different ferrite geometries on the sensing distance capability of inductive proximity sensors. The ultimate aim of these simulations has been to identify geometries (both shielded and unshielded) associated with the highest sensing distance capabilities. These has been the additional constraint that all of the test geometries have precisely the same diameter. From all the simulations runs, the two best performing geometries of shielded and unshielded, respectively, are given by FIGS. 15A and 16A, respectively.

In order to judge the effectiveness of the simulation, it was necessary to obtain some of the core shapes reviewed in the previous section and measure their relevant parameters. The geometries that were chosen for measurement are not necessarily the highest performing ones; they were actually made first, measured (both physically and electrically) and then simulated. The reason for this is the relative inaccuracy to which the cores could be cut with a circular diamond saw. Some of the simulation dimensions are given to the nearest tenth of a millimeter; this degree of accuracy is quite impossible to achieve when cutting the cores.

The measurements were performed for four different geometries including the reference sensor. The other three geometries, together with their respective B-versus-radial-distance plots, are shown in FIGS. 11A through 13B. The radius of the top disc in FIG. 12A is identical to that in FIG. 13A and equal to 7.8 mm. In terms of simulated performance this places FIG. 12A somewhere midway between FIGS. 4G and 4E. The top disc in FIG. 13A is raised by 4.8 mm of ferrite above the plastic former; its performance is expected to be somewhat inferior to that of FIG. 6G on account of the smaller disc.

These geometries were all constructed by modifying some of the reference core samples of FIG. 2A. All three samples consist of two separate pieces held together by a plastic screw and nut to ensure inertness to the electromagnetic fields. The ferrite in all four samples is of exactly the same magnetic characteristics.

Sensing distance sensitivity to the joint in the ferrite mentioned above was also studied with the simulator; this was performed on the geometry of FIG. 11A. There was some concern that the air gap accompanying the crack or joint would degrade the sensor's performance by the introduction of extra reluctance into the magnetic circuit. Therefore sensing distance was monitored versus crack widths between 0.5 and 10 mils (thousandths of an inch). The crack was placed across the entire width of the center "leg" and running parallel to the sensing face of the sensor. The results show that there is essentially no significant degradation in sensing distance for joint widths less than 2 mils.

Three different coils of wire were used in each core shape; two of these were ordinary 35 and 36 gauge copper wire wile the third was Litzwire. FIGS. 11A, 12A and 13A give the predicted inductance and sensing distance factor for each core shape. Some scaling needs to be done with the inductances since the simulations were all run for 60 turns whereas each of the three test coils had a different number of windings. The coils are designated as follows:

i) coil #1 - 57 turns copper wire, #35 gauge,
ii) coil #2 - 47 turns copper wire, #36 gauge,
iii) coil #3 - 60 turns, Litzwire (no scaling necessary).

The scaling factors that need to be applied to the coils are easily obtained from Equation 8. The inductance is observed to vary as the square of the number of turns, therefore for each sample, the scaled (from the simulation results) expected inductance is given below for each coil in each core. The scale factor for each coil is simply the square of the ratio of the number of turns comprising that coil to 60.

i) Reference: (L=183 $\mu$H for 60 turns by simulation) (FIG. 2A)
   coil #1: scale factor=0.9025, →expected L=0.9025×183=165 $\mu$H
   coil #2: scale factor=0.6136, →expected L=0.6136×183=112 $\mu$H
   Litzwire: scale factor=1.0000, →expected L=1.0000×183=183 $\mu$H ii) Sample 1: (L=338 $\mu$H for 60 turns by simulation) (FIG. 11A)
   coil #1: scale factor=0.9025, →expected L=0.9025×338=305 $\mu$H
   coil #2: scale factor=0.6136, →expected L=0.6136×338=207 $\mu$H
   Litzwire: scale factor=1.0000, →expected L=1.0000×338=338 $\mu$H iii) Sample 2: (L=430 $\mu$H for 60 turns by simulation) (FIG. 12A)
   coil #1: scale factor=0.9025, →expected L=0.9025×430=388 $\mu$H
   coil #2: scale factor=0.6136, →expected L=0.6136×430=264 $\mu$H
   Litzwire: scale factor=1.0000, →expected L=1.0000×430=430 $\mu$H iv) Sample 3: (L=527 $\mu$H for 60 turns by simulation) (FIG. 13A)
   coil #1: scale factor=0.9025, →expected L=0.9025×527=476 $\mu$H
   coil #2: scale factor=0.6136, →expected L=0.6136×527=323 $\mu$H
   Litzwire: scale factor=1.0000, →expected L=1.0000×527=527 $\mu$H The combination of the three windings above was chosen to evaluate tow factors: the effect on sensing distance of the number of windings on the former (47, 57 and 60 turns, respectively), and secondly, the merits of stranded wire (Litzwire). As will be discussed in due course, this second factor is frequency-related.

It is appropriate at this point to dwell a bit more on this parameter before presentation of measurement findings is made.

From Equation 25 we have:

$$Q = \frac{2\pi f L}{R_s}$$

Actually, $R_s$ is a composite quantity, which may be modeled as comprising the "isolated" resistance of the wire, $R_{is}$, and the eddy current-induced resistance $R_T$. With this stipulation, Equation 25 can be rewritten as $$Q = \frac{2\pi f L}{R_{is} + R_l} \quad (1.1)$$

The expression in Equation (1.1) makes certain things clear. It must be understood that $R_l$ represents the loading of the sensor by the target; when the target is absent (or practically sufficiently far away) $R_l = 0$; $R_l$ is solely determined by target proximity and sensor geometry and increases in some manner as the target is brought nearer to the sensor. For a particular geometry, the exact manner in which this increase in $R_l$ occurs is not yet understood well enough, but it is readily observable upon measurement. Thus, as the target approaches, $R_l$ increases correspondingly. $R_{is}$ itself is defined to include frequency-related resistance (related to skin-depth phenomena) and is not simply the low frequency (d.c.) resistance of the winding. More generally, then, Equation (1.1) may be written as, $$Q = \frac{2\pi f L}{[R_{dc} + R_{ac}(f)] + R_l} \quad (1.2)$$

with the frequency dependent part of $R_{is}$, $R_{ac}(f)$, isolated for clarity. $R_{ac}(f)$ is solely the effect of skin effect phenomena and will also be discussed in due course. At relatively low frequencies, $R_{ac}(f)$ can be considered to vanish so that the "isolated" resistance of the conductor returns to $R_{dc}$. The "relatively" in the preceding sentence refers to frequencies so low that the magnitude of $R_{ac}(f)$ is insignificant compared to $R_{dc}$.

In the operation of inductive proximity sensors high Q is indeed desirable but it must be achieved correctly. Increasing the quality factor of the sensor by simply increasing either of the variables in the numerator of the RHS of Equation (1.2) (either $f$ or $L$) does not necessarily yield significant increases in sensing distance. These factors have been discussed at length above. Neither of these two factors significantly amplifies the effect of the target on the source coil which is what is necessary to obtain greater sensing distances. Some increase in sensing distance may be observed to accompany increases in inductance but these increases should not be attributed to the mere increase in inductance (and therefore Q) alone; other factors which are geometry-related are usually more responsible for this increase. 25 * On the other hand decreasing $R_{is}$ achieves higher values of quality factor with quite different effect. Decreasing, may be accomplished by decreasing $R_{dc}$ or $R_{ac}(f)$ or both. This effect is one that causes Q to depend more and more heavily on $R_l$; that is, the sensor becomes more sensitive to the target's position. This action on its own would guarantee an increase in sensing distance. In fact, the ratio of $R_{is}$ to $R_l$ will contribute significantly in determining the characteristic shape of the Q versus distance curve. If $R_{is}$ dominates the denominator of Equation (1.1) the sensor will have to "wait" for the target to draw nearer before $R_l$ increases to a value that is large enough (in comparison with $R_{is}$) to being altering the Q perceptibly.

It may be recalled that inductance varies as the square of the number of turns (Equation (11)); this is almost equivalent to stating that the inductance varies as the square of total winding length. Now if $R_{is}$ is decreased by simply shortening the length of the winding (i.e., decreasing $R_{dc}$) then it must be borne in mind that $R_{dc}$ varies linearly with the length of the winding. Hence by employing a physically shorter length of wire for the winding, Q decreases quadratically on the one hand, while on the other it increases linearly. Thus Q must be sacrificed in order to render the sensor more sensitive to the target. Practically, though, there is a limit on how low winding length can go before the sensor begins to experience degradation from related factors.

Another solution is to seek better conductivity without altering the length of the winding. Thicker wire appears to hold promise but its effect would only be positive at relatively low frequency (where skin depth phenomena have not yet come into play); because of skin depth phenomena it would not yield any significant improvements at higher frequencies. The solution at higher frequencies is stranded wire; this is capable of providing simultaneous high Q and high target sensitivity.

Therefore, from the foregoing arguments, an optimization needs to be struck between low winding length for high target sensitivity (but low quality factor) and sufficiently high winding length for adequate inductance (and high quality factor). Analytically, this is not a trivial task; it would probably be preferable to do this empirically.

Lastly, the attempt to restrict the magnitude of $R_{ac}(f)$ could be made. Since this factor is entirely frequency-determined the question immediately raised is at what frequency the sensor operates best. Plausible arguments in connection with this may be proffered after a brief introduction on the skin effect has been made.

From the theory of plane waves in the study of electromagnetics comes the fact that both E and H traveling plane waves in a conducting medium experience attenuation as they advance into the medium. Thus the electric and magnetic fields tend to have presence only in a thin layer at the surface of the medium. This phenomenon is known as the skin effect. It is customary to define the skin depth, $\delta$, as that distance of propagation in which H and E (and therefore J) have decreased by the factor $1/e$ from their value at the surface of the medium. For good conductors, the skin depth is approximately the reciprocal of the attenuation factor, $\alpha$, from plane wave theory. In view of this we have, $$\delta = \sqrt{\frac{2}{\omega \sigma \mu}} \quad (1.3)$$

with $\omega$, $\sigma$ and $\mu$ the radian frequency ($2\pi f$), electrical conductivity and magnetic permeability, respectively. The frequency dependence of $\delta$ is clear from Equation (1.3). The implication of this is that the electrical properties of the medium depend on the frequency of operation, for one.

It must be understood from the foregoing paragraph that, at a particular frequency, the resistance of the conductor only has meaning within the volume in which current flows. Usually, the current density, J, is assumed to be equal to zero at a depth of $5\delta$ (the magnitude of J at $5\delta$ is 0.67% of its initial value at the surface of the medium). Therefore, if it is recalled that resistance is inversely proportional to conductor surface area, then the alternating current (a.c.) resistance of the medium is seen to increase with frequency $\delta$ is directly proportional to the surface area in question).

The significance of the skin effect to the magnitude of $R_{ac}(f)$ in Equation (1.2) is that, as frequency is increased, the skin effect causes $R_{ac}(f)$ to increase (slowly at first and then rapidly) from relative insignificance to the point where it could be at least an order of magnitude greater than $R_{ac}$. Therefore, as far as frequency is concerned, quality factor cannot continually increase with frequency due to the eventually rapid growth of $R_{ac}(f)$. It should be clear, also, that induced eddy currents in a conductor will also only exist, essentially, in the top $5\delta$ of a conductor.

It can be seen that the skin effect forces alternating current to travel through successively smaller cross-sectional areas (with attendant increases in resistance) as frequency is increased. Therefore, for the most part at high frequencies, most of a conductor's cross-sectional area is unused if its radius is much greater than a few skin-depth.

If a solid conductor is "sliced" up into a bundle of thinner parallel conductors such that the sum of their respective cross-sectional areas equals the solid conductor which they replace, then we obtain a stranded conductor.

If the radius of each individual strand is of the order of a few $\delta$'s (or even smaller), then the high-frequency current is unable to discriminate, as it could before, on the basis of a thin layer of the conductor of thickness $5\delta$ on the periphery. Thus, still depending on the frequency, the high-frequency current travels through a much, much larger portion of the total area of the total stranded conductor than it would for the solid case. If the frequency is such that the radius of an individual strand is less than $5\delta$, then the entire cross-sectional area of the conductor is used by the high-frequency current. The implication of this is that at all frequencies below that referred to above, $R_{ac}(f)$ is essentially insignificantly minute. The total resistance, then, of the stranded conductor to the transit of high-frequency current is almost identical to the low-frequency (d.c.) value, $R_{dc}$. The advantage of this is very real at very high frequencies where the a.c. resistance of solid conductors substantially dominates their d.c. value.

In terms of Q versus frequency then, the use of stranded conductors will delay the onset of falling Q to a much higher frequency. Therefore Q varies linearly with frequency (Equation (24)) up to higher frequencies. With regards to the quality factor of the sensor, stranded wire achieves simultaneously high Q and high sensor sensitivity to the presence of a target as already discussed. This translates directly into high Q and extended sensing range for suitably stranded wire; suitable in the sense that the dimensions of the wire and the frequency of operation are properly related as per the forgoing discussion. Presentation of experimental results and further discussion will now follow.

In conducting tests on the samples of FIGS. 11A, 12A and 13A, a Schlumberger Solartron Gain/Phase Analyzer was used for all primary impedance measurements with verification provided by a Hewlett Packard HP 4192A and HP 4194. Distance measurement was made with a composite fixture consisting of a micrometer with a circular standard target (mild steel) attached to the traveling shaft.

Q versus Frequency (coils only)

Figure 14A:
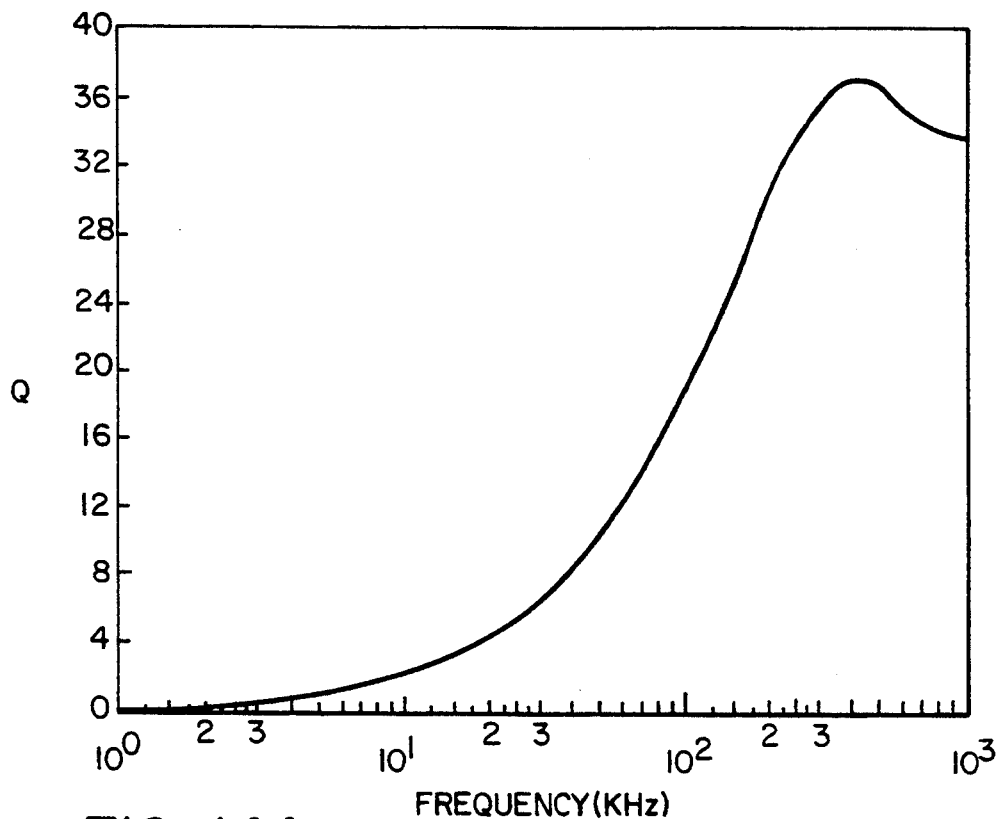
FIG. 14A is a graph showing Q vs. frequency coil #1.
Figure 14B:
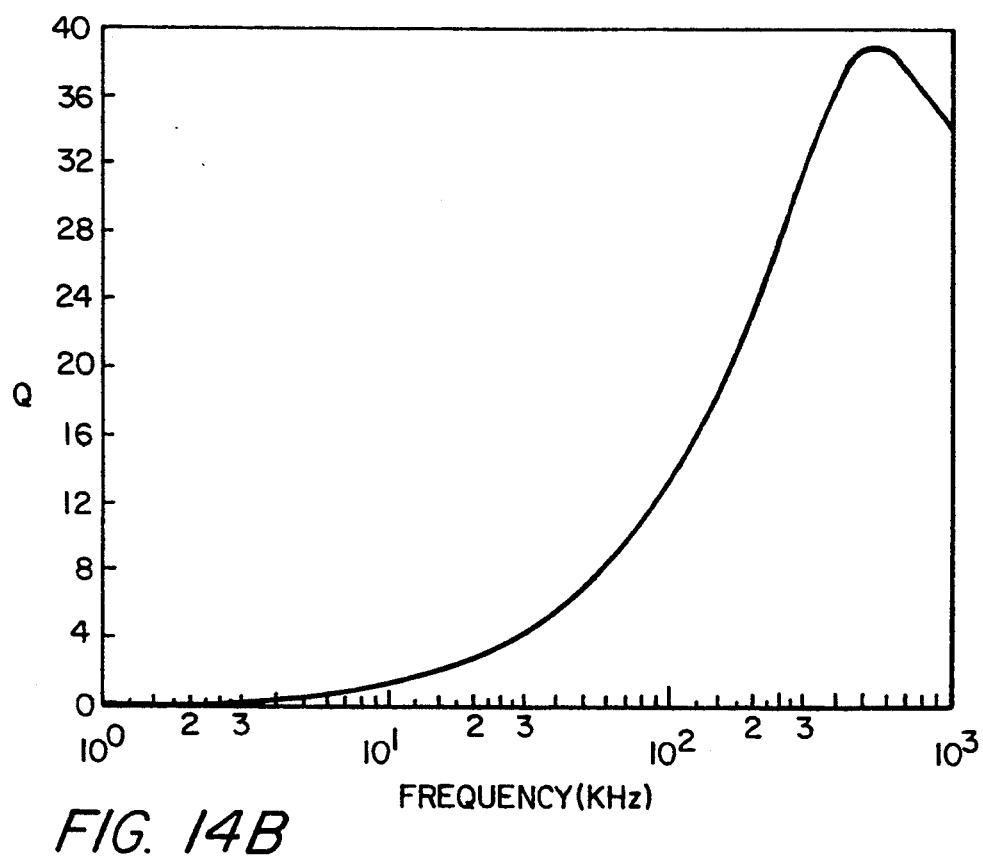
FIG. 14B is a graph showing Q vs. frequency coil #2.
Figure 14C:
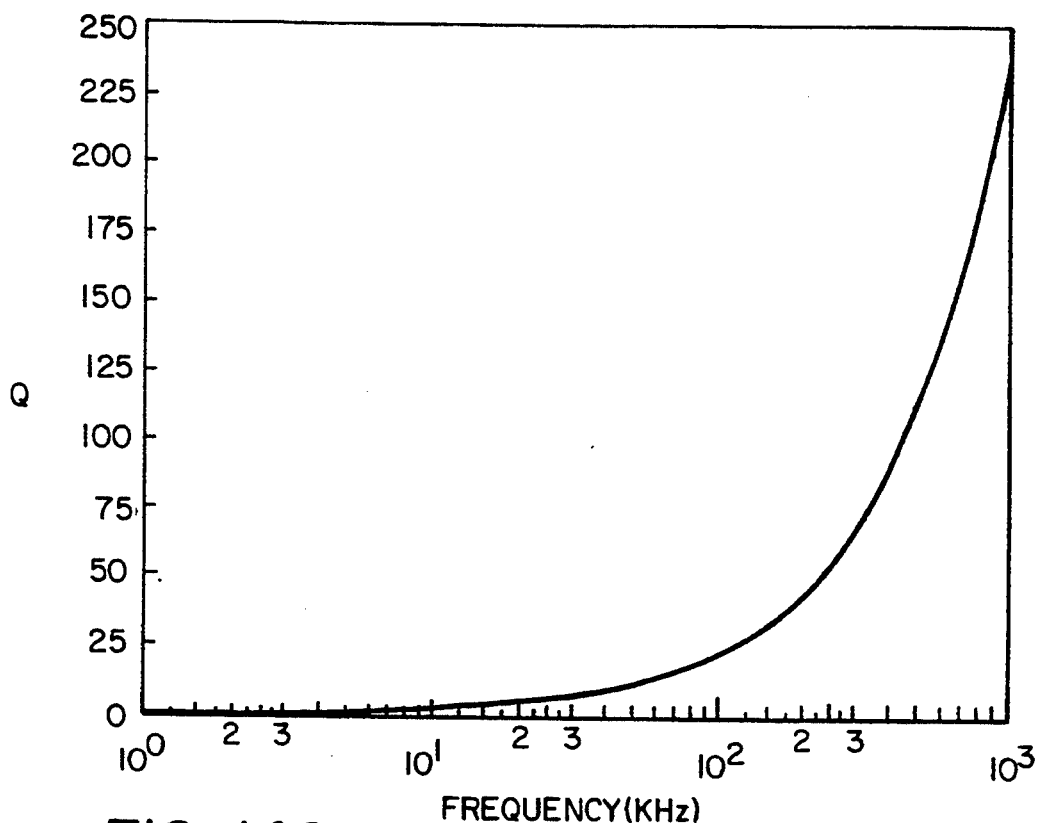
FIG. 14C is a graph showing Q vs. frequency coil #3.

One of the first measurements made was a series of Q and inductance versus frequency sweeps for the windings alone (no ferrite core). Tables 1 through 3 present the data for the three coils. The graphs for these data are also supplied in FIGS. 14A through 14C, respectively.

For the two solid conductors (coils #1 and #2), the accompanying tables and graphs show the initial linear relationship between Q and frequency and then the departure from linearity as frequency is increased. This clearly demonstrates the build-up of $R_{ac}(f)$ from Equation (1.3) and its limiting effect on the Q. #36 gauge copper wire has a radius of roughly 0.1 mm; copper has an electrical conductivity of about $6.0 \times 10^7$ Sm$^{-1}$ and the permeability of free space ($4\pi \times 10^{-7}$ Hm$^{-1}$). With these figures, a skin depth of 0.1 mm in copper occurs at a frequency of about 400 KHz. It will be observed that, for coils #1 and #2, peak Q occurs in the neighborhood of this frequency.

On the other hand, the Litzwire (coil #3) maintains an almost linear Q versus frequency plot up to the upper limit of the frequency sweep (1 MHz). Also obvious (and expected) is its significantly higher quality factor; that this is not because of the greater number of turns it has (i.e., higher inductance) is easily verified by observing that it has almost identical inductance to coil #1. Its Q, therefore, is a result of significantly lower $R_{ac}(f)$ at the higher frequencies.

Q versus Frequency (coils with ferrite cores)

Figure 14D:
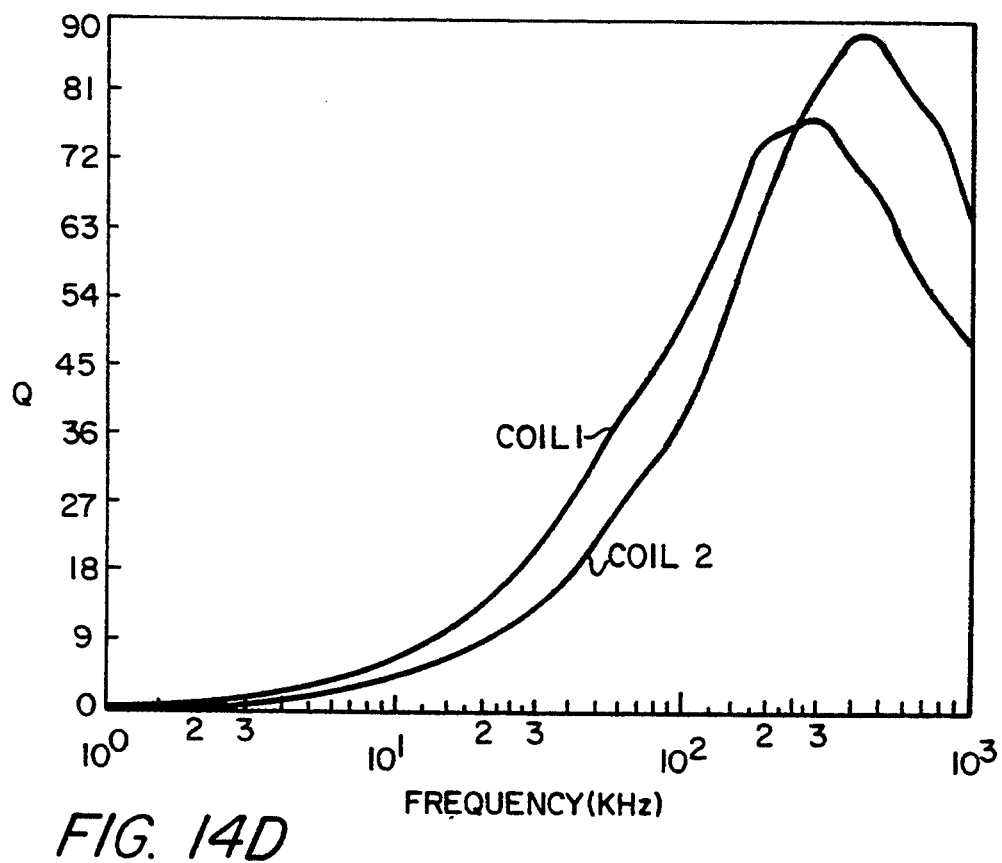
FIG. 14D is a graph showing Q vs. frequency for coils 1 and 2 placed in the reference core of FIG. 2A.
Figure 14E:
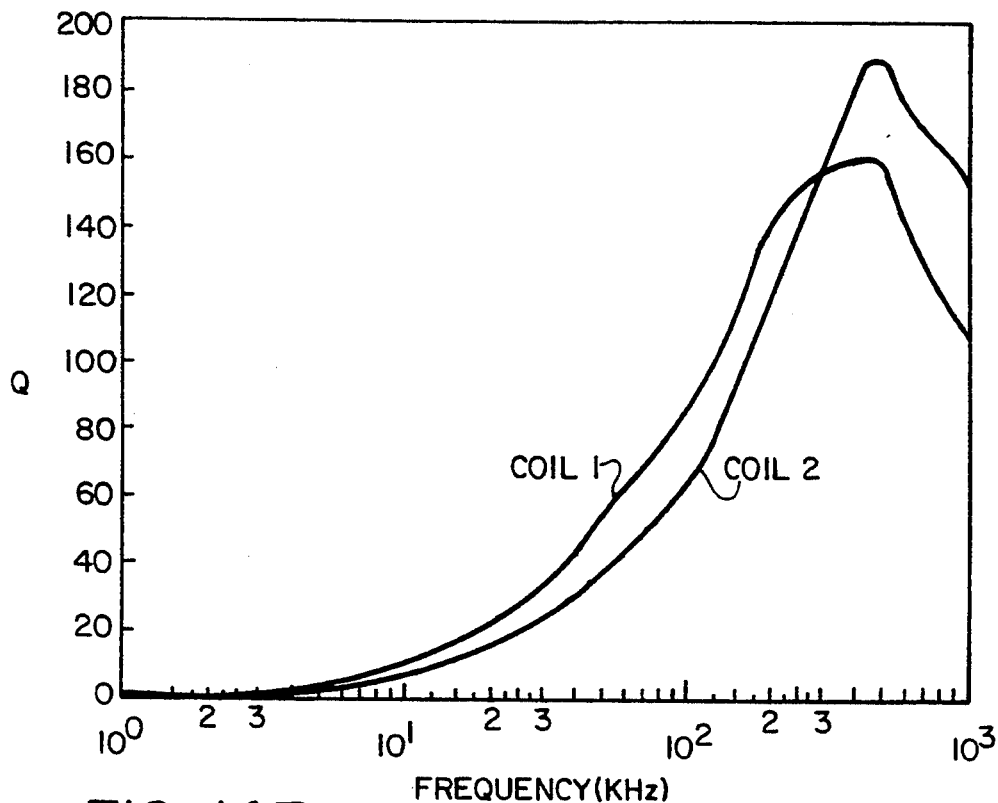
FIG. 14E is a graph showing Q vs. frequency for coils 1 and 2 placed in the core of FIG. 11A.
Figure 14F:
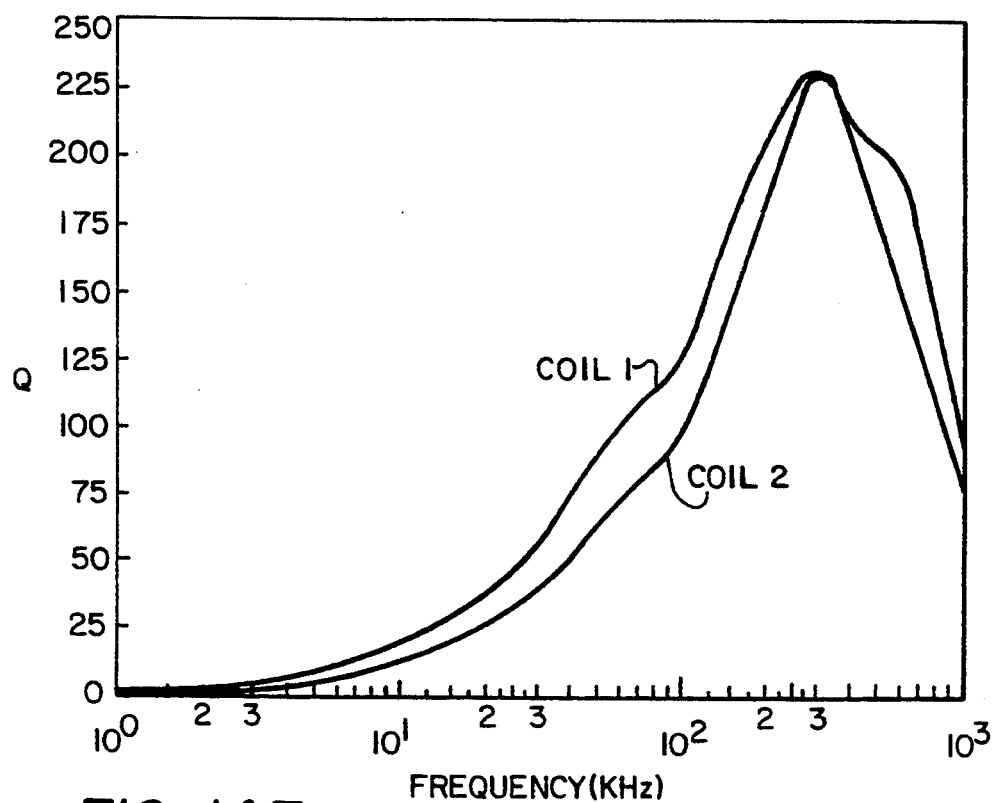
FIG. 14F is a graph showing Q vs. frequency for coils 1 and 2 placed in the core of FIG. 12A.
Figure 14G:
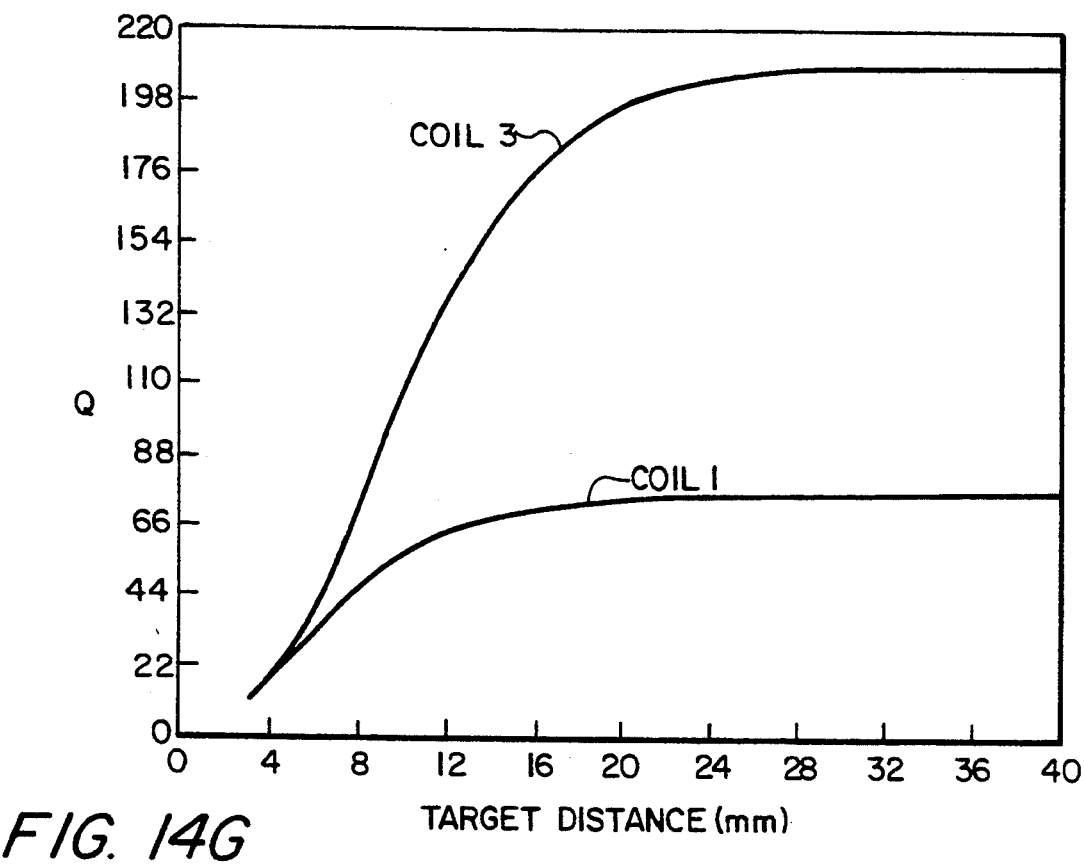
FIG. 14G is a graph showing Q vs. target distance for coils 1 and 3 placed in the ferrite core geometry of FIG. 2A.
Figure 14H:
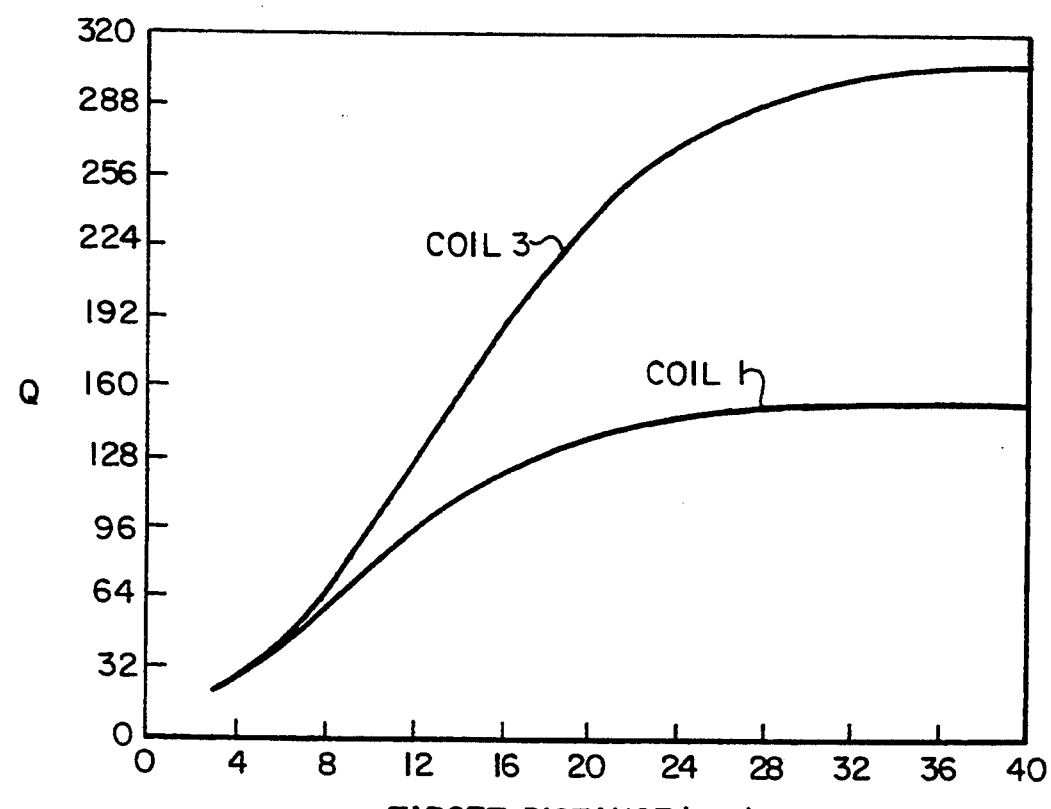
FIG. 14H is a graph showing the Q. vs. target distance for coils 1 and 3 core geometry of FIG. 2A.
Figure 14I:
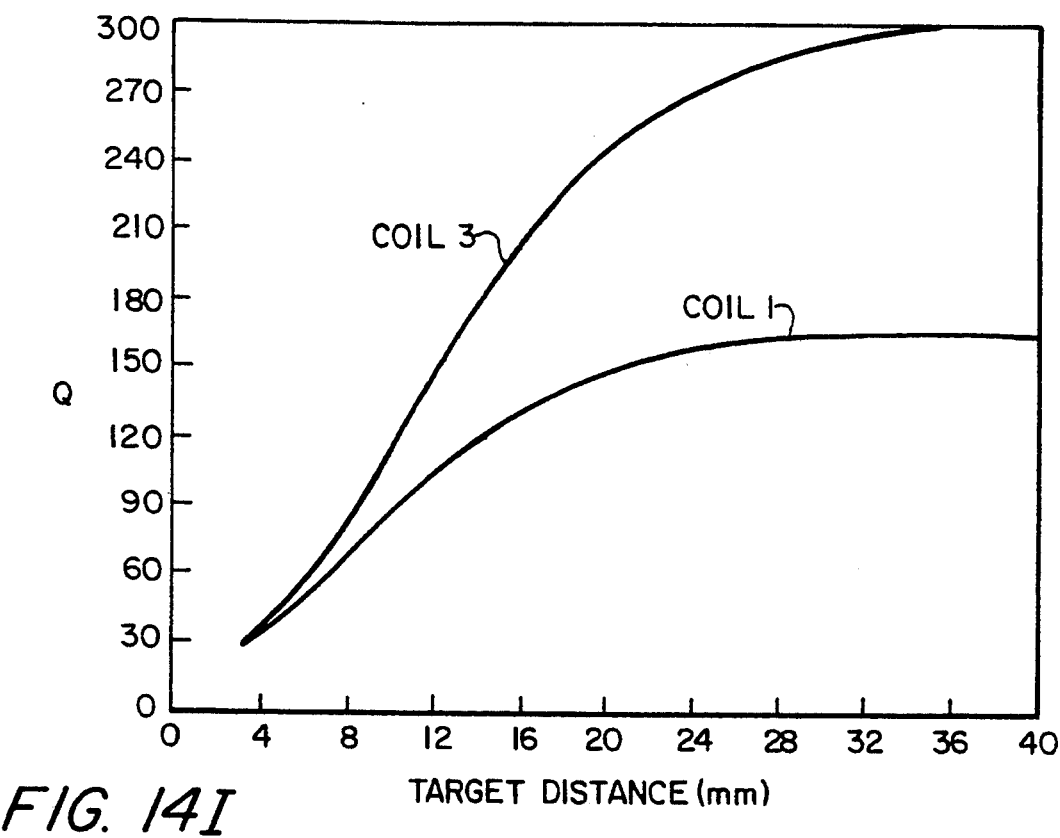
FIG. 14I is a graph showing the Q. vs. target distance for coils 1 and 3 placed in the ferrite core geometry of FIG. 12A.
Figure 14J:
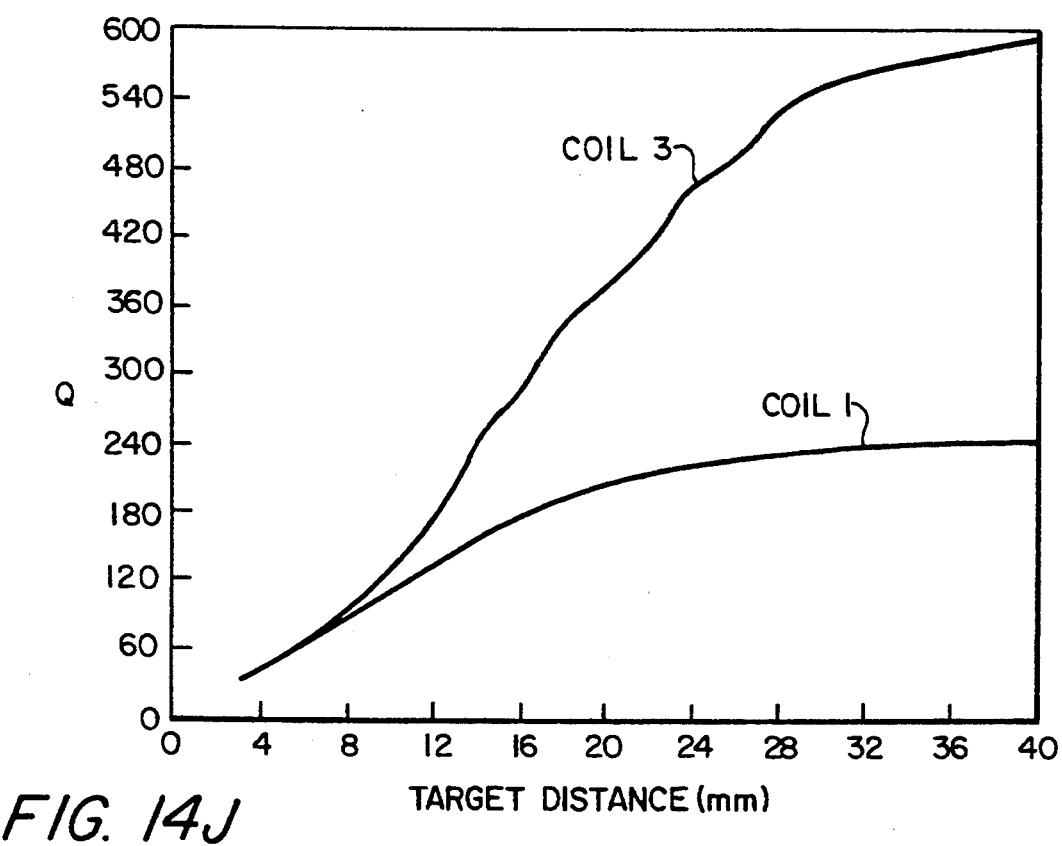
FIG. 14J is a graph showing the Q. vs. target distance for coils 1 and 3 placed in the ferrite core geometry of FIG. 13A.

The measurements of the preceding section were repeated for two of the coils (coils #1 and #2) in three of the four different core shapes (reference, sample 1 and sample 3). These frequency sweeps were performed to determine the frequency at which to perform the Q versus sensing distance measurements of the next section; the frequency at which this is done is that where peak Q occurs. The results are presented in tables 4 through 6 and the corresponding graphs appear in FIGS. 14D through 14F.

Sensing Distance Determination

This subsection documents the actual evaluation of sensing distance for all combinations of the four different core shapes and the three different coils.

It has previously been shown that the sensing distance for a particular coil/core combination is proportional to the fourth root of the eddy current power loss in a target at a fixed distance from the sensor. Additional constants in the development of the theory were frequency of operation, winding length (and therefore total number of turns), excitation current level, and winding profile.

It was subsequently shown, also, that above a certain threshold, the level of current being supported by the sensor windings had no bearing on the sensing ability; this is equivalent to saying that, above a certain threshold, the terminal voltage across the windings is not a determining factor in the sensing ability of the sensor. These thresholds in current or voltage are not rigidly defined, being material determined.

Therefore the differences observed between the twelve or so different coil/core combinations are seen to be determined solely by ferrite geometry. In other words, any of the three coils, when inserted in turn into all four geometries under test, should maintain the ratio of the SDF's designated for the core shapes. This is because the SDF is strictly a function of geometry.

Sensing distance (and not the SDF, which term has been coined to compare different ferrite shapes exclusively) may be improved by other factors besides ferrite geometries; these measurement results show that stranded wire (Litzwire) accomplishes this.

For each coil/core combination, Q versus target distance data and the accompanying curve are provided (tables 7 through 10 and FIGS. 14G through 14J). Since maximum Q for all the sensors appears in the neighborhood of between 300 KHz and 400 KHz all sensing distances were obtained at 300 KHz and at a generator level of 1 Vrms. The data presented in tables 7 through 10 have been manipulated to extract the sensing distance for each of the 12 cases. The results are presented in simplified form in Tables 11 through 14. The sensing distance is derived from the data for each test run as follows: the reference sample was first run for all three (3) coils. These data were used as reference standards to evaluate the other core samples. The sensing distance for coil #1 in the reference geometry is the overall reference. The sensing distance for this combination was set to 10 mm by obtaining the ratio of the Q with the target at 10 mm to the Q with the target removed. This ratio is given overleaf as the Q ratio. This precise ratio is then applied to each Q versus sensing distance set of data to extract the sensing distance. For example, core sample #1 was compared to the reference core a total of three (3) times; one for each of the coils mentioned above. The same holds for core samples #2 and #3.

This set of runs were also designed to observe simultaneously, the effects of two other factors; (i) the effect on sensing distance of the number of turns and (ii) the merits of Litzwire. The Litzwire was evaluated against coils #1 and #2 for each core shape (a total of four times). To facilitate comparison the simulated sensing distance for each core sample is also supplied. And even though the measured entry of the sensing distance for the Litzwire coil in the reference geometry is marked "reference" the 14 mm was obtained by applying the Q ratio above to the data for the Litzwire. The "reference" is with respect to the Litzwire in the other cores. In other words, Litzwire sensing distances in the other three cores should be compared to 14 mm (and not 10 mm as for coils #1 and #2) in order to obtain the experimental SDF. This had to be done in order to judge the effectiveness of the Litzwire.

As stated earlier, the results presented in Tables 7 through 10 and subsequently summarized in Tables 11 through 14 document two factors; the verification of the SDF's obtained from simulation and the verification of the merits of stranded wire (Litzwire). Therefore the results obtained will be discussed in association with both of these factors.

The results show very good corroboration between the simulated inductance and sensing distance and the measured quantities. It is also quite clear that the SDF's for all the cores are absolutely maintained for all the 3 different test coils used in them; this result reinforces the assertion that the SDF's are indeed exclusively geometry-defined and independent of the winding. This is of course logical since the simulations were run for an arbitrary fixed coil.

The Litzwire, although providing very good agreement, did not display the exceptional agreement that the other two coils did. This was due to the difficulty in obtaining stable readings for the high Q geometries. In the reference core the Litzwire exhibited a 40% superiority to the solid conductor coils; it maintained this percentage almost exactly in all the other three cores. Again, the implication is that, irrespective of the core shape (or the SDF), the Litzwire displays a well-maintained improvement in performance over the single solid conductors.

Also, it is quite clear that, in this case, the number of turns on the former is not significant in terms of sensing distance; within the limits of experimental error there does not appear to be any between the 57-turn and the 47-turn coils. Practically, though, there is probably a certain threshold in terms of the number of windings below which the sensing distance will suffer degradation. But it appears that the threshold is less than 47 turns for this kind and size of sensor.

The inductance measurements were, in almost all cases, within 10% of the simulation results; in one case the agreement deteriorated to about 20% (Litzwire with sample #1).

Sensing distance versus oscillator level

From the prior theoretical discussion it has been shown that after the development of the sensing distance equations, that the results were theoretically independent of either current through, or voltage across the coil. This section presents the results obtained from some measurements at two other voltage levels (100 mVrms and 300 mVrms). All previous measurements were taken at a coil terminal voltage of 1 Vrms. Table 15 makes it clear that no difference in the sensor's performance exists between terminal voltages of 0.1 Vrms and 1 Vrms. Voltages greater than 1 Vrms were unattainable from the test equipment without current overload and subsequent protective shutdown.

Sensing distance versus frequency

The theoretical relationship between sensing distance and frequency of operation was discussed hereinbefore. Arguments were presented to show that, under theoretically ideal conditions, the frequency of operation is of no significance to the sensing operation. It was also mentioned that practical considerations rendered this not entirely correct.

In a practical sensor, frequency will indeed affect the capability of the sensor. Firstly, at sufficiently high frequencies $R_{ac}(f)$ (Equation (1.3)) will become sufficiently large to seriously depress the quality factor of the sensor with attendant crippling of its sensing ability. On the other hand, at low frequencies the quality factor is also too low for optimum performance. Therefore, in actuality, there is a "passband" of frequencies within which the sensor will exhibit maximum (and frequency-independent) sensing distance. Notwithstanding this, it must still be understood that the frequency character of the sensing distance is exclusively material related (ferrite permeability variations with frequency and skin effect phenomena in the windings). This is so because the lower and upper limits of the "passband" are determined by the ferrite permeability, kind of winding and size of winding. Table 16 shows the results of some measurements of sensing distance versus frequency taken for one coil/core combination. The measurements verify the frequency characteristics of sensing distance in the manner just discussed.

Based on the theoretical discussion, the simulation, and the actual tests, preferred embodiments for shielded and unshielded core geometries were developed. These geometries in FIGS. 15A, 15B, 16A, and 16B with like reference numerals showing like elements.

Figure 15A:
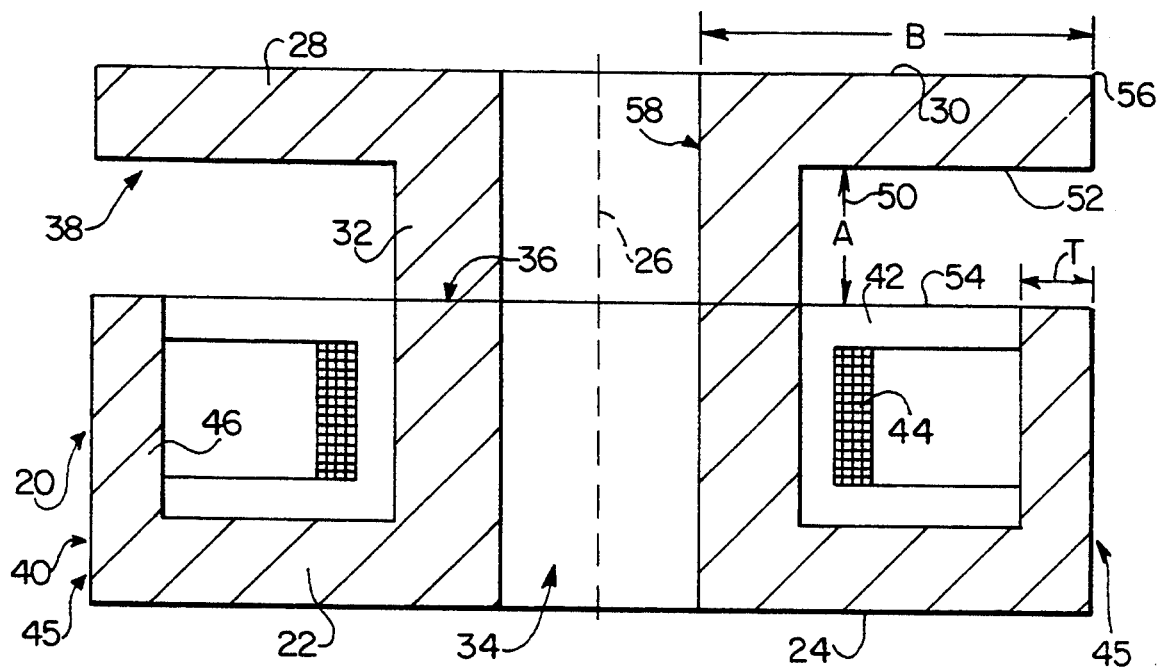
FIGS. 15A and 15B schematically illustrate the cross-section of preferred ferrite core geometries similar to that shown in FIG. 6G for shielded applications.

FIG. 15A schematically illustrates the cross-section of a ferrite core similar to that shown in FIG. 6G. The core 20 contains a base portion 22 that has a bottom surface 24. The core 20 is generally in the shape of a cylinder having a longitudinal axis 26.

The core geometry 20 also contains a top portion 28 that has a face surface 30. The top portion 28 is generally disc shaped to complement the disc shape of bottom portion 22.

Joining the portions 22 and 28 is a central core portion 32 which is cylindrically shaped about the axis 26. Positioned within the core portion and extending along the axis 26 throughout the entire length of the core geometry is an open bore 34.

The ferrite core geometry in FIG. 15A contains a joint crack 36 to join the top portion 38 of the geometry to the lower portion 40. This is provided to facilitate insertion of a bobbin 42 that contains a coil of wire 44 in order to create a workable proximity transducer. It is to be understood that the crack may be located anywhere in the core geometry to allow insertion of the bobbin 42 on the central portion 32.

With the bobbin and coil in place, the spaces provided about the top periphery 45 of the bottom portion 22 to include a cylindrically shaped ring 46 that is positioned about and encircling the entire bobbin. In a preferred embodiment, the ring 46 and the bottom portion 22 are formed from a single piece of ferrite. A space 50 is provided between the underside 52 of the upper portion 28 and the top 54 of the bobbin.

In a preferred embodiment, the base 22 has a diameter of 21.8 mm. The thickness of the central portion 32 is 2.3 mm. At the same time, the bottom portion 22 has a thickness of 1.9 mm.

The top portion has a thickness of 1.9 mm. The hollow interior bore 34 has a diameter of 4.4 mm and the top surface 30 is 8.4 mm from its tip 56 to the interior 58 of the hollow bore 34.

In a preferred embodiment, the distance 50 is 3.0 mm. With the height of the walls 46 being 4.8 mm. The thickness of the ring portion 46 is 1.5 mm.

Figure 15B:
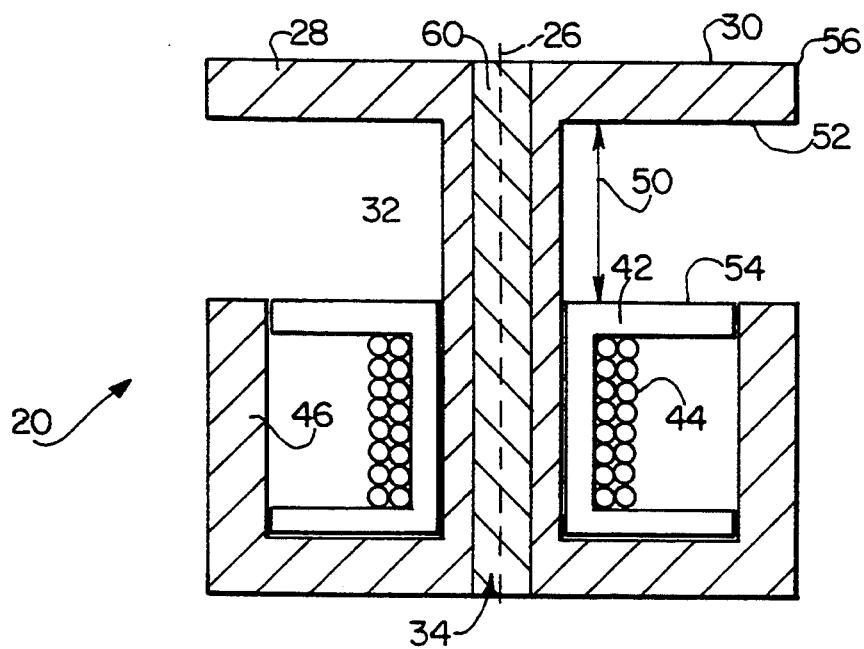

An alternative embodiment for the embodiment of FIG. 15A is shown in FIG. 15B, where like reference numerals denote like elements. This embodiment is essentially the same with the exception that the open bore 34 of FIG. 15B is filled with a ferrite slug 60. This filled embodiment represents the preferred embodiment for a shielded geometry.

For the embodiments in FIGS. 15A and 15B, the vertical space 50, A, may be equal to or greater than 0. At the same time, the distance B from the tip 56 to the interior 58 for the top bore 34 may be equal to or greater than 0. However, when one of these dimensions, A or B, is equal to 0, the other cannot be equal to 0. Further, when A=0, the diameter of the top portion 28 must be less than the diameter of the bottom portion 22. In a preferred embodiment, the diameter of the top portion 28 plus the thickness T of wall 46 equal the diameter of the bottom portion 22. In other words, for the embodiment in FIG. 15A, distance B cannot exceed 6.9 mm. It should also be appreciated that any scale factor may be used to alter these dimensions to accommodate 12 and 18 mm sensors because the embodiments in FIGS. 15A and 15B are shown in the context of a 30 mm sensor.

Figure 16A:
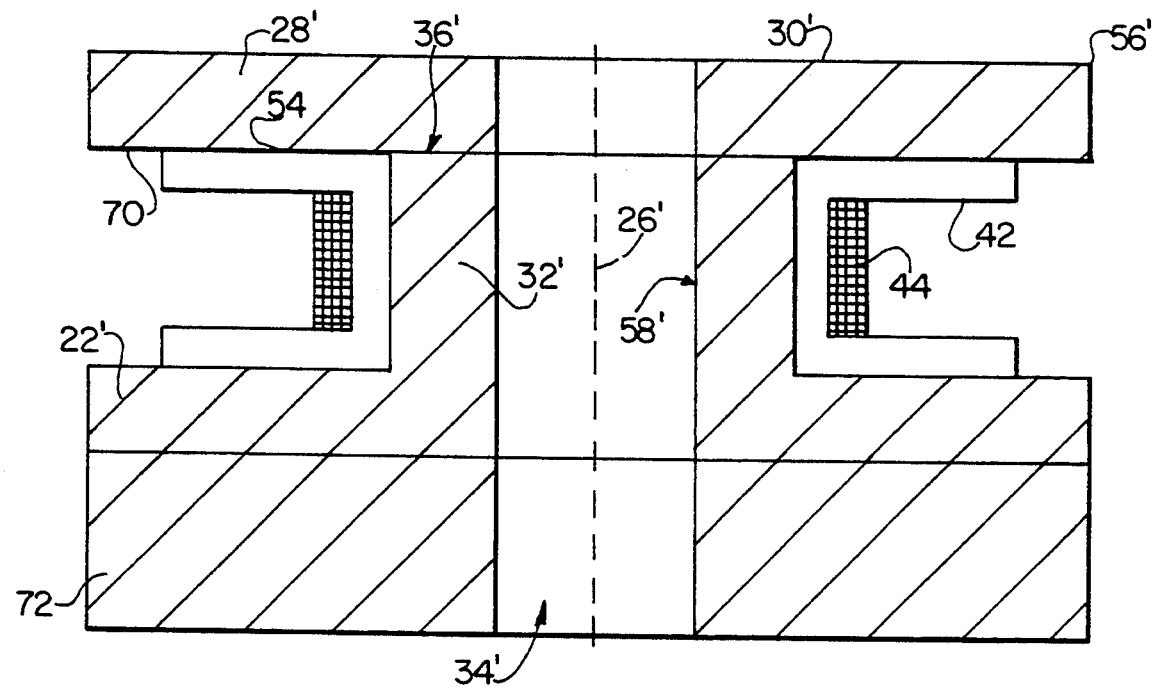
FIGS. 16A and 16B schematically illustrate the cross-section of ferrite core geometries similar to that shown in FIG. 9E for unshielded applications.
Figure 16B:
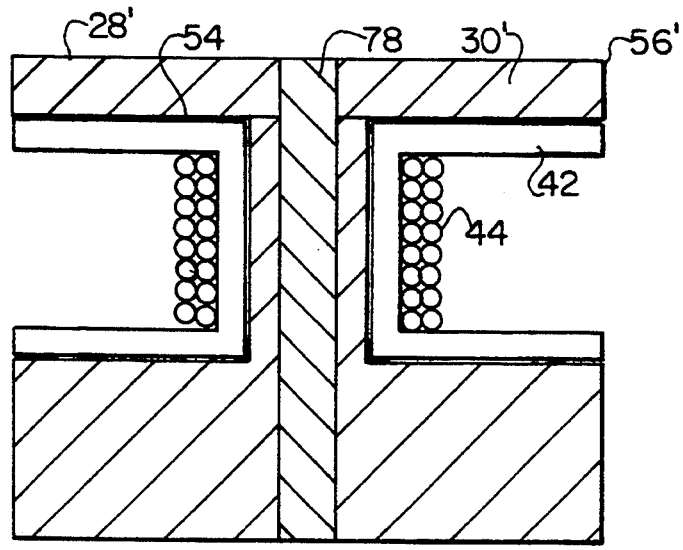

FIG. 16A shows a preferred unshielded geometry with a more preferred unshielded geometry shown in FIG. 16B. In FIGS. 16A and 16B, elements comparable to those shown in FIGS. 15A and 15B use primed numbers. As can be seen, FIG. 16A contains a top portion 28' and a bottom portion 22' being joined by a central core portion 32'. In this arrangement, the dimensions of the top portion 28' and the bottom portion 22' are the same as their unprimed counterparts in FIG. 15A.

FIG. 16A differs from FIG. 15A in that there is no space 50 provided between the bottom surface 70 of the upper portion 28' and the top 54 of the bobbin 42. Also, there is provided an additional base portion 72 to provide an overall base of a much greater thickness than that provided for in FIG. 15A. In fact, in a preferred embodiment, the thickness of the overall base made up of portions 22' and 72 is 5.7 mm. In the embodiment of FIG. 16A, the thickness of the base may be equal to or greater than the thickness of the top portion 28'. Also the base and the central core 32' may be a single piece of ferrite.

With regard to the embodiment in FIG. 16B, this embodiment is essentially the same as that of FIG. 16A, but differs in that the open bore 34' of FIG. 16A is filled with a ferrite core 78. In all other respects, the dimensions and size of the core geometry of FIG. 16B is the same as that of FIG. 16A.

As with the embodiment in FIG. 15A, the embodiment in FIG. 16A has a crack 36' to allow insertion of the bobbin 42 on the central portion 32'. As before, the crack may be located anywhere.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

TABLE 1

| L & Q versus frequency for coil #1 | | |
|---|---|---|
| frequency/KHz | inductance/μH | Q |
| 1.00 | 54 | .21 |
| 10.8 | 54 | 2.3 |
| 17.4 | 54 | 3.7 |
| 35.6 | 54 | 7.5 |
| 57.4 | 54 | 12 |
| 117 | 54 | 21 |
| 149 | 54 | 25 |
| 189 | 54 | 30 |
| 240 | 54 | 33 |
| 304 | 54 | 36 |
| 386 | 54 | 37 |
| 489 | 54 | 37 |
| 621 | 54 | 35 |
| 788 | 54 | 34 |
| 1000 | 54 | 33 |

TABLE 2

| L & Q versus frequency for coil #2 | | |
|---|---|---|
| frequency/KHz | inductance/μH | Q |
| 1.00 | 37 | .14 |
| 10.8 | 37 | 1.6 |
| 17.4 | 37 | 2.5 |
| 35.6 | 37 | 5.1 |
| 57.4 | 37 | 8.2 |
| 117 | 37 | 16 |
| 149 | 37 | 19 |
| 189 | 37 | 23 |
| 240 | 37 | 27 |
| 304 | 37 | 32 |
| 386 | 37 | 36 |
| 489 | 37 | 39 |
| 621 | 37 | 39 |
| 788 | 37 | 37 |
| 1000 | 37 | 35 |

TABLE 3

L & Q versus frequency for coil #3

| frequency/KHz | inductance/μH | Q |
|---|---|---|
| 1.00 | 58 | .23 |
| 10.8 | 58 | 2.5 |
| 17.4 | 58 | 4.0 |
| 35.6 | 58 | 8.1 |
| 57.4 | 58 | 13 |
| 117 | 58 | 26 |
| 149 | 58 | 31 |
| 189 | 58 | 41 |
| 240 | 58 | 52 |
| 304 | 58 | 66 |
| 386 | 58 | 86 |
| 489 | 58 | 112 |
| 621 | 58 | 140 |
| 788 | 58 | 180 |
| 1000 | 58 | 230 |

TABLE 4

L & Q versus Frequency for coils #1 & #2 in Reference core

| | inductance/μH | | Q | |
|---|---|---|---|---|
| frequency/KHz | coil #1 | coil #2 | coil #1 | coil #2 |
| 1.00 | 175 | 120 | .68 | .46 |
| 10.8 | 175 | 121 | 7.4 | 5.0 |
| 17.4 | 175 | 121 | 12 | 8.0 |
| 35.6 | 175 | 121 | 24 | 16 |
| 57.4 | 175 | 121 | 37 | 26 |
| 117 | 175 | 121 | 57 | 45 |
| 149 | 175 | 121 | 67 | 56 |
| 189 | 175 | 121 | 74 | 66 |
| 240 | 176 | 121 | 76 | 76 |
| 304 | 176 | 121 | 77 | 82 |
| 386 | 176 | 121 | 72 | 88 |
| 489 | 177 | 122 | 67 | 87 |
| 621 | 178 | 123 | 59 | 81 |
| 788 | 179 | 124 | 53 | 76 |
| 1000 | 183 | 126 | 48 | 64 |

TABLE 5

L & Q versus frequency for coils #1 & #2 in sample 1

| | inductance/μH | | Q | |
|---|---|---|---|---|
| frequency/KHz | coil #1 | coil #2 | coil #1 | coil #2 |
| 1.00 | 292 | 205 | 1.1 | .8 |
| 10.8 | 292 | 205 | 12 | 8.6 |
| 17.4 | 292 | 205 | 20 | 14 |
| 35.6 | 292 | 205 | 40 | 28 |
| 57.4 | 292 | 205 | 62 | 44 |
| 117 | 293 | 205 | 96 | 75 |
| 149 | 293 | 205 | 117 | 95 |
| 189 | 293 | 205 | 137 | 116 |
| 240 | 294 | 205 | 149 | 138 |
| 304 | 295 | 206 | 157 | 157 |
| 386 | 296 | 207 | 159 | 180 |
| 489 | 298 | 209 | 160 | 190 |
| 621 | 302 | 212 | 140 | 175 |
| 788 | 309 | 216 | 124 | 165 |
| 1000 | 320 | 224 | 108 | 155 |

TABLE 6

L & Q versus frequency for coils #1 & #2 in Sample 3

| | inductance/μH | | Q | |
|---|---|---|---|---|
| frequency/KHz | coil #1 | coil #2 | coil #1 | coil #2 |
| 1.00 | 479 | 337 | 1.9 | 1.3 |
| 10.8 | 479 | 337 | 20 | 14 |
| 17.4 | 479 | 337 | 33 | 22 |
| 35.6 | 479 | 337 | 64 | 45 |
| 57.4 | 479 | 337 | 98 | 70 |
| 117 | 479 | 337 | 173 | 144 |
| 149 | 480 | 337 | 173 | 144 |

TABLE 6-continued

L & Q versus frequency for coils #1 & #2 in Sample 3

| | inductance/μH | | Q | |
|---|---|---|---|---|
| frequency/KHz | coil #1 | coil #2 | coil #1 | coil #2 |
| 189 | 481 | 338 | 200 | 175 |
| 240 | 482 | 339 | 220 | 207 |
| 304 | 485 | 341 | 233 | 231 |
| 386 | 489 | 344 | 215 | 218 |
| 489 | 496 | 349 | 178 | 204 |
| 621 | 507 | 357 | 147 | 187 |
| 788 | 527 | 371 | 111 | 146 |
| 1000 | 562 | 396 | 81 | 100 |

TABLE 7

L & Q versus target distance for Reference core (all three coils)

| Target dist./mm | Inductance/μH | | | Q | | |
|---|---|---|---|---|---|---|
| | coil #1 | coil #2 | coil #3 | coil #1 | coil #2 | coil #3 |
| 3 | 166 | 113 | 172 | 12.2 | 12.3 | 12.8 |
| 4 | 169 | 115 | 176 | 18.0 | 18.3 | 19.9 |
| 5 | 172 | 117 | 179 | 24.8 | 25.4 | 29.5 |
| 6 | 173 | 118 | 180 | 32.6 | 33.7 | 42.1 |
| 7 | 175 | 119 | 182 | 39.7 | 41.4 | 56.4 |
| 8 | 175 | 119 | 183 | 46.8 | 48.9 | 73.2 |
| 9 | 176 | 120 | 183 | 52.7 | 55.4 | 90.2 |
| 10 | 176 | 120 | 184 | 57.6 | 60.6 | 107 |
| 12 | 177 | 120 | 184 | 64.8 | 68.5 | 137 |
| 14 | 177 | 120 | 185 | 69.0 | 73.3 | 161 |
| 16 | 178 | 121 | 185 | 71.9 | 76.3 | 177 |
| 18 | 178 | 121 | 185 | 73.5 | 78.2 | 189 |
| 20 | 178 | 121 | 185 | 74.7 | 79.2 | 198 |
| 22 | 178 | 121 | 185 | 75.3 | 80.0 | 202 |
| 24 | 178 | 121 | 185 | 76.0 | 80.6 | 205 |
| 26 | 178 | 121 | 185 | 76.0 | 80.9 | 208 |
| 28 | 178 | 121 | 185 | 76.5 | 81.4 | 209 |
| 30 | 178 | 121 | 185 | 76.5 | 81.5 | 209 |
| 35 | 178 | 121 | 186 | 76.5 | 81.5 | 209 |
| 40 | 179 | 121 | 186 | 76.6 | 81.6 | 210 |

TABLE 8

L & Q versus sensing distance for Core Sample #1 (all three coils)

| Target distance/mm | Inductance/μH | | | Q | | |
|---|---|---|---|---|---|---|
| | coil #1 | coil #2 | coil #3 | coil #1 | coil #2 | coil #3 |
| 3 | 274 | 192 | 252 | 20.8 | 23.3 | 20.0 |
| 4 | 279 | 195 | 258 | 26.6 | 29.8 | 26.3 |
| 5 | 283 | 198 | 262 | 33.4 | 37.0 | 33.8 |
| 6 | 286 | 200 | 265 | 41.1 | 45.2 | 43.1 |
| 7 | 288 | 201 | 267 | 49.3 | 53.9 | 53.4 |
| 8 | 290 | 202 | 269 | 58.2 | 63.2 | 65.5 |
| 9 | 291 | 203 | 271 | 67.1 | 72.2 | 79.0 |
| 10 | 293 | 204 | 272 | 76.2 | 81.3 | 93.0 |
| 12 | 294 | 205 | 274 | 93.0 | 98.0 | 123 |
| 14 | 295 | 206 | 275 | 106 | 112 | 154 |
| 16 | 296 | 206 | 276 | 119 | 124 | 184 |
| 18 | 297 | 207 | 276 | 128 | 133 | 210 |
| 20 | 297 | 207 | 277 | 135 | 139 | 232 |
| 22 | 297 | 207 | 277 | 140 | 145 | 253 |
| 24 | 297 | 207 | 277 | 144 | 149 | 265 |
| 26 | 298 | 207 | 277 | 147 | 152 | 277 |
| 28 | 298 | 207 | 277 | 149 | 154 | 288 |
| 30 | 298 | 207 | 278 | 150 | 155 | 295 |
| 35 | 298 | 207 | 278 | 152 | 157 | 303 |
| 40 | 298 | 208 | 278 | 152 | 158 | 305 |

TABLE 9

L & Q versus target distance for Core Sample #2 (all three coils)

| Target distance/mm | Inductance/μH | | | Q | | |
|---|---|---|---|---|---|---|
| | coil #1 | coil #2 | coil #3 | coil #1 | coil #2 | coil #3 |
| 3 | 387 | 268 | 401 | 27 | 28 | 29 |
| 4 | 393 | 272 | 407 | 33 | 36 | 37 |

TABLE 9-continued

L & Q versus target distance for Core Sample #2
(all three coils)

| Target distance/mm | Inductance/μH coil #1 | coil #2 | coil #3 | Q coil #1 | coil #2 | coil #3 |
|---|---|---|---|---|---|---|
| 5 | 397 | 275 | 411 | 41 | 43 | 46 |
| 6 | 400 | 277 | 415 | 49 | 52 | 57 |
| 7 | 403 | 279 | 418 | 58 | 63 | 69 |
| 8 | 405 | 280 | 420 | 67 | 72 | 82 |
| 9 | 407 | 281 | 422 | 77 | 84 | 97 |
| 10 | 408 | 282 | 423 | 86 | 94 | 112 |
| 12 | 411 | 284 | 426 | 103 | 115 | 143 |
| 14 | 412 | 284 | 427 | 118 | 133 | 172 |
| 16 | 413 | 285 | 428 | 131 | 148 | 203 |
| 18 | 414 | 286 | 429 | 141 | 160 | 225 |
| 20 | 414 | 286 | 429 | 149 | 169 | 245 |
| 22 | 414 | 286 | 430 | 154 | 175 | 260 |
| 24 | 415 | 286 | 430 | 158 | 181 | 270 |
| 26 | 415 | 286 | 430 | 162 | 185 | 280 |
| 28 | 415 | 286 | 430 | 164 | 188 | 285 |
| 30 | 415 | 286 | 430 | 165 | 191 | 290 |
| 35 | 415 | 287 | 430 | 166 | 193 | 300 |
| 40 | 415 | 287 | 430 | 166 | 193 | 300 |

TABLE 10

L & Q versus target distance for Core Sample #3
(all three coils)

| Target dist./mm | Inductance/μH coil #1 | coil #2 | coil #3 | Q coil #1 | coil #2 | coil #3 |
|---|---|---|---|---|---|---|
| 3 | 461 | 323 | 444 | 34 | 36 | 34 |
| 4 | 466 | 327 | 449 | 42 | 45 | 43 |
| 5 | 471 | 329 | 453 | 53 | 54 | 52 |
| 6 | 474 | 332 | 457 | 63 | 65 | 65 |
| 7 | 477 | 334 | 460 | 74 | 75 | 79 |
| 8 | 479 | 335 | 462 | 85 | 86 | 95 |
| 9 | 481 | 336 | 464 | 97 | 98 | 111 |
| 10 | 482 | 337 | 466 | 110 | 110 | 129 |
| 12 | 484 | 339 | 468 | 134 | 134 | 170 |
| 14 | 486 | 340 | 470 | 155 | 155 | 235 |
| 16 | 487 | 341 | 471 | 175 | 175 | 285 |
| 18 | 488 | 341 | 472 | 190 | 190 | 340 |
| 20 | 488 | 342 | 472 | 205 | 200 | 375 |
| 22 | 489 | 342 | 473 | 215 | 212 | 415 |
| 24 | 489 | 342 | 473 | 220 | 219 | 460 |
| 26 | 489 | 342 | 473 | 225 | 225 | 485 |
| 28 | 489 | 342 | 473 | 230 | 230 | 525 |
| 30 | 489 | 342 | 474 | 235 | 233 | 550 |
| 35 | 490 | 343 | 474 | 242 | 236 | 570 |
| 40 | 490 | 343 | 474 | 243 | 240 | 590 |

TABLE 11

Sensing distance comparison for simulation vs. measurement
(Reference Core)

| | inductance/μH | sensing distance/mm |
|---|---|---|
| a) coil #1 | | |
| simulation | 165 | 10 (set) |
| measured | 176 | 10 (set) |
| b) coil #2 | | |
| simulation | 112 | 10 |
| measured | 121 | 10 |
| c) Litz wire | | |
| simulation | 183 | N/A |
| measured | 185 | 14 (reference) |

NOTE:
The ratio of Q's that is used to calculate sensing distance is 0.7529. This is the Q ratio obtained for a 10 mm sensing distance for coil #1 in the reference core. There is no simulated sensing distance for the Litzwire because its performance was not explicitly simulated.

TABLE 12

Sensing distance comparison for simulation vs. measurement
(Sample #1)

| | inductance/μH | sensing distance/mm |
|---|---|---|
| a) coil #1 | | |
| simulation | 305 | 15 |
| measured | 298 | 15 |
| b) coil #2 | | |
| simulation | 207 | 15 |
| measured | 207 | 15 |
| c) Litz wire* | | |
| simulation | 338 | 21 |
| measured | 278 | 20 |

*The predicted sensing distance is based on a reference of 14 mm rather than 10 mm, since this is what was obtained with the Litzwire in the reference geometry. Thus $1.53 \times 14 \approx 21$.

TABLE 13

Sensing distance comparison for simulation vs. measurement
(Sample #2)

| | inductance/μH | sensing distance/mm |
|---|---|---|
| a) coil #1 | | |
| simulation | 388 | 16 |
| measured | 415 | 15 |
| b) coil #2 | | |
| simulation | 264 | 16 |
| measured | 287 | 16 |
| c) Litz wire* | | |
| simulation | 430 | 22 |
| measured | 430 | 19 |

TABLE 14

Sensing distance comparison for simulation vs. measurement
(Sample #3)

| | inductance/μH | sensing distance/mm |
|---|---|---|
| a) coil #1 | | |
| simulation | 476 | 17 |
| measured | 489 | 17 |
| b) coil #2 | | |
| simulation | 323 | 17 |
| measured | 343 | 17 |
| c) Litz wire* | | |
| simulation | 527 | 23 |
| measured | 474 | 23 |

TABLE 15

Sensing distance vs. oscillator level
(some coil/core combinations)

| | Sensing Distance/mm | | |
|---|---|---|---|
| Oscillator level => | 100m Vrms | 300m Vrms | 1 Vrms |
| Reference/coil #2 | 10 | 10 | 10 |
| Sample 1/coil #1 | 15 | 15 | 15 |
| Sample 2/coil #1 | 16 | 16 | 16 |

TABLE 16

Sensing distance versus frequency
(Core Sample 2/coil #2)

| Frequency/KHz | Sensing Distance/mm |
|---|---|
| 50 | 10 |
| 100 | 13 |
| 200 | 15 |
| 300 | 15 |
| 500 | 15 |
| 700 | 15 |
| 900 | 14 |
| 1000 | 13 |

What is claimed is:

1. A non-symmetrical ferrite core for use in an inductive sensor that concentrates and focuses a magnetic field produced by a current-carrying winding, said core comprising:
   a disk shaped base portion;
   a disk shaped top portion; and
   an intermediate portion of reduced diameter to define a coil receiving location for receiving the current-carrying winding, said intermediate portion joining said base and top portions in a spaced essentially parallel relationship, said tip portion having a diameter equal to or less than the diameter of said base portion, and said base portion being thicker than said top portion.

2. The ferrite core of claim 1, wherein said thickness of said base portion is greater than twice the thickness of said top portion.

3. The ferrite core of claim 1, further comprising a longitudinal bore extending throughout the entire length of said intermediate portion.

4. A non-symmetrical ferrite core for use in an inductive sensor that concentrates and focuses a magnetic field produced by a current-carrying winding, said core comprising:
   a disk shaped base portion having an upper peripheral edge;
   a disk shaped top portion;
   an intermediate portion of reduced diameter to define a coil receiving location for receiving the current-carrying winding, said intermediate portion joining said base and top portions in a spaced essentially parallel relationship, said top portion having a diameter less than the diameter of said base portion; and
   a circumferential ring portion positioned about the peripheral edge of said base portion to provide a side shield about said coil receiving portion.

5. The ferrite core of claim 4, wherein said intermediate portion is sized to provide a space between said top portion and said coil receiving location.

6. The ferrite core of claim 5, wherein, when the dimension of sad space is reduced to zero, the diameter of said top portion is less than the diameter of said base portion by at least the thickness of said ring portion.

7. A non-symmetrical inductive proximity sensor that concentrates and focuses a magnetic field produced by a current-carrying winding, said sensor comprising:
   a disk shaped base portion;
   a disk shaped top portion;
   an intermediate portion of reduced diameter to define a coil receiving location, said intermediate portion joining said base and top portions in a spaced essentially parallel relationship, said top portion having a diameter less than the diameter of said base portion; and
   current-carrying winding means operatively positioned within said coil receiving portion.

8. The inductive proximity sensor or claim 7, wherein said base portion is thicker than said top portion.

9. The inductive proximity sensor of claim 7, further comprising a longitudinal bore extending throughout the entire length of said intermediate portion.

10. The inductive proximity sensor of claim 7, wherein said base portion has an upper peripheral edge, and said sensor further comprises:
    a circumferential ring portion positioned about the peripheral edge of said base portion to provide a side shield about said coil receiving portion.

11. The inductive proximity sensor of claim 7, wherein said intermediate portion is sized to provide a space between said top portion and said coil receiving location.

12. The inductive proximity sensor of claim 10 wherein, when the dimension of said space is reduced to zero, the diameter of said top portion is less than the diameter of said base portion by at least the thickness of sad ring portion. said top portion

* * * * *